(12) United States Patent
Felton

(10) Patent No.: US 10,764,700 B1
(45) Date of Patent: Sep. 1, 2020

(54) USER INTERFACES FOR MONITORING NOISE EXPOSURE LEVELS

(71) Applicant: Apple Inc., Cupertino, CA (US)

(72) Inventor: Nicholas Felton, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/584,186

(22) Filed: Sep. 26, 2019

Related U.S. Application Data

(60) Provisional application No. 62/856,016, filed on Jun. 1, 2019.

(51) Int. Cl.
*H04R 29/00* (2006.01)
*G01H 3/14* (2006.01)
*G01D 7/00* (2006.01)

(52) U.S. Cl.
CPC ........... *H04R 29/008* (2013.01); *G01D 7/005* (2013.01); *G01H 3/14* (2013.01); *H04R 2225/41* (2013.01); *H04R 2499/11* (2013.01)

(58) Field of Classification Search
CPC .. H04R 29/008; H04R 29/00; H04R 2225/41; H04R 2499/11; H04R 2499/15; H04R 3/005; G01D 7/005; G01H 3/14; H04N 11/00; H04S 7/40
USPC .......................................................... 381/56
See application file for complete search history.

(56) References Cited

U.S. PATENT DOCUMENTS

| | | | |
|---|---|---|---|
| 5,515,344 A | 5/1996 | Ng | |
| 5,642,731 A | 7/1997 | Kehr | |
| 6,416,471 B1 | 7/2002 | Kumar et al. | |
| 6,600,696 B1 | 7/2003 | Lynn | |
| 6,705,972 B1 | 3/2004 | Takano et al. | |
| 6,950,839 B1 | 9/2005 | Green et al. | |
| 7,020,514 B1 | 3/2006 | Wiesel | |

(Continued)

FOREIGN PATENT DOCUMENTS

| | | |
|---|---|---|
| CA | 2815518 A1 | 5/2012 |
| CN | 102448555 A | 5/2012 |

(Continued)

OTHER PUBLICATIONS

StudioSixDigital, "Dosimeter", 2017, retrieved from the internet Nov. 8, 2019.*

(Continued)

*Primary Examiner* — Ahmad F. Matar
*Assistant Examiner* — Sabrina Diaz
(74) *Attorney, Agent, or Firm* — Dentons US LLP

(57) ABSTRACT

The present disclosure generally relates to user interfaces and techniques for monitoring noise exposure levels using an electronic device. In accordance with some embodiments, the electronic device displays a graphical indication of a noise exposure level over a first period of time with an area of the graphical indication that is colored to represent the noise exposure level, the color of the area transitioning from a first color to a second color when the noise exposure level exceeds a first threshold. In accordance with some embodiments, the electronic device displays noise exposure levels attributable to a first output device type and a second output device type and, in response to selecting a filtering affordance, visually distinguishes a set of noise exposure levels attributable to the second output device type.

30 Claims, 69 Drawing Sheets

(56) References Cited

U.S. PATENT DOCUMENTS

| | | | |
|---|---|---|---|
| 7,166,078 B2 | 1/2007 | Saini et al. | |
| 8,321,006 B1 | 11/2012 | Snyder et al. | |
| 8,475,339 B2 | 7/2013 | Hwang et al. | |
| 8,676,170 B2 | 3/2014 | Porrati et al. | |
| 8,784,115 B1 | 7/2014 | Chuang | |
| 9,026,927 B2 | 5/2015 | Brumback et al. | |
| 9,224,291 B2 | 12/2015 | Moll-Carrillo et al. | |
| 9,589,445 B2 | 3/2017 | White et al. | |
| 9,712,629 B2 | 7/2017 | Molettiere et al. | |
| 9,801,562 B1 | 10/2017 | Host-Madsen | |
| 9,813,642 B1 | 11/2017 | Chen et al. | |
| 9,940,682 B2 | 4/2018 | Hoffman et al. | |
| 10,175,781 B2 | 1/2019 | Karagozler et al. | |
| 2003/0181291 A1 | 9/2003 | Ogawa | |
| 2003/0191609 A1* | 10/2003 | Bernardi | G01H 3/14 |
| | | | 702/191 |
| 2003/0226695 A1 | 12/2003 | Mault | |
| 2004/0017300 A1 | 1/2004 | Kotzin et al. | |
| 2004/0193069 A1 | 9/2004 | Takehara | |
| 2005/0010117 A1 | 1/2005 | Agutter et al. | |
| 2005/0027208 A1 | 2/2005 | Shiraishi et al. | |
| 2005/0079905 A1 | 4/2005 | Martens | |
| 2005/0149362 A1 | 7/2005 | Peterson et al. | |
| 2005/0272564 A1 | 12/2005 | Pyles et al. | |
| 2006/0149144 A1 | 7/2006 | Lynn et al. | |
| 2006/0152372 A1 | 7/2006 | Stout | |
| 2006/0235319 A1 | 10/2006 | Belohlavek et al. | |
| 2008/0058626 A1 | 3/2008 | Miyata et al. | |
| 2008/0159547 A1 | 7/2008 | Schuler et al. | |
| 2008/0200312 A1 | 8/2008 | Tagliabue | |
| 2008/0240519 A1 | 10/2008 | Nagamitsu | |
| 2008/0300110 A1 | 12/2008 | Smith et al. | |
| 2009/0052677 A1* | 2/2009 | Smith | H04R 29/008 |
| | | | 381/56 |
| 2009/0118100 A1 | 5/2009 | Oliver et al. | |
| 2009/0180631 A1* | 7/2009 | Michael | H04R 29/008 |
| | | | 381/58 |
| 2009/0210078 A1 | 8/2009 | Crowley | |
| 2009/0216556 A1 | 8/2009 | Martin et al. | |
| 2009/0262088 A1 | 10/2009 | Moll-Carrillo et al. | |
| 2009/0287103 A1 | 11/2009 | Pillai | |
| 2010/0003951 A1 | 1/2010 | Ray et al. | |
| 2010/0010832 A1 | 1/2010 | Boute et al. | |
| 2010/0017489 A1 | 1/2010 | Birnbaum et al. | |
| 2010/0062905 A1 | 3/2010 | Rottler et al. | |
| 2010/0076331 A1 | 3/2010 | Chan et al. | |
| 2010/0312138 A1 | 12/2010 | Regas | |
| 2011/0066051 A1 | 3/2011 | Moon et al. | |
| 2011/0098928 A1 | 4/2011 | Hoffman et al. | |
| 2011/0166631 A1 | 7/2011 | Breining | |
| 2011/0245623 A1 | 10/2011 | Chutani et al. | |
| 2011/0307821 A1 | 12/2011 | Martens | |
| 2012/0029303 A1 | 2/2012 | Shaya | |
| 2012/0038651 A1 | 2/2012 | Case et al. | |
| 2012/0041767 A1 | 2/2012 | Hoffman et al. | |
| 2012/0065480 A1 | 3/2012 | Badilini et al. | |
| 2012/0116550 A1 | 5/2012 | Hoffman et al. | |
| 2012/0245447 A1 | 9/2012 | Karan et al. | |
| 2012/0283587 A1 | 11/2012 | Gosh et al. | |
| 2012/0317167 A1 | 12/2012 | Rahman et al. | |
| 2013/0002425 A1 | 1/2013 | Hatch et al. | |
| 2013/0065569 A1 | 3/2013 | Leipzig et al. | |
| 2013/0073960 A1* | 3/2013 | Eppolito | G11B 27/034 |
| | | | 715/716 |
| 2013/0110264 A1 | 5/2013 | Weast et al. | |
| 2013/0114100 A1 | 5/2013 | Torii et al. | |
| 2013/0115583 A1 | 5/2013 | Gordon et al. | |
| 2013/0158416 A1 | 6/2013 | Hatlestad et al. | |
| 2013/0197679 A1 | 8/2013 | Balakrishnan et al. | |
| 2013/0202121 A1* | 8/2013 | Georgiou | H03G 9/005 |
| | | | 381/56 |
| 2013/0215042 A1 | 8/2013 | Messerschmidt et al. | |
| 2013/0231575 A1 | 9/2013 | Erkkila et al. | |
| 2013/0231947 A1 | 9/2013 | Shusterman | |
| 2013/0268398 A1 | 10/2013 | Aganni et al. | |
| 2013/0317380 A1 | 11/2013 | Liley et al. | |
| 2013/0332286 A1 | 12/2013 | Medelius et al. | |
| 2014/0038781 A1 | 2/2014 | Foley et al. | |
| 2014/0081118 A1 | 3/2014 | Reinhold et al. | |
| 2014/0142403 A1 | 5/2014 | Brumback et al. | |
| 2014/0143678 A1 | 5/2014 | Mistry et al. | |
| 2014/0240122 A1 | 8/2014 | Roberts et al. | |
| 2014/0240349 A1 | 8/2014 | Tuukkanen | |
| 2014/0266776 A1 | 9/2014 | Miller et al. | |
| 2014/0275852 A1 | 9/2014 | Hong et al. | |
| 2014/0336796 A1 | 11/2014 | Agnew | |
| 2015/0081210 A1 | 3/2015 | Yeh et al. | |
| 2015/0099991 A1 | 4/2015 | Yamaguchi et al. | |
| 2015/0110277 A1 | 4/2015 | Pidgeon et al. | |
| 2015/0110279 A1 | 4/2015 | Tejerina | |
| 2015/0142689 A1 | 5/2015 | Squires | |
| 2015/0181314 A1 | 6/2015 | Swanson | |
| 2015/0185967 A1 | 7/2015 | Ly et al. | |
| 2015/0196804 A1 | 7/2015 | Koduri et al. | |
| 2015/0216448 A1 | 8/2015 | Lotan et al. | |
| 2015/0217163 A1 | 8/2015 | Amis et al. | |
| 2015/0220883 A1 | 8/2015 | B'far et al. | |
| 2015/0288944 A1 | 10/2015 | Nistico et al. | |
| 2015/0297134 A1 | 10/2015 | Albert et al. | |
| 2015/0347711 A1 | 12/2015 | Soli et al. | |
| 2016/0058313 A1 | 3/2016 | Sato | |
| 2016/0058336 A1 | 3/2016 | Blahnik et al. | |
| 2016/0058337 A1 | 3/2016 | Blahnik et al. | |
| 2016/0062582 A1 | 3/2016 | Wilson et al. | |
| 2016/0106398 A1 | 4/2016 | Kuppuswami | |
| 2016/0109961 A1 | 4/2016 | Parshionikar | |
| 2016/0132046 A1 | 5/2016 | Beoughter et al. | |
| 2016/0174857 A1 | 6/2016 | Eggers et al. | |
| 2016/0196635 A1 | 7/2016 | Cho et al. | |
| 2016/0235325 A1 | 8/2016 | Chou | |
| 2016/0235374 A1 | 8/2016 | Miller et al. | |
| 2016/0250517 A1 | 9/2016 | Tilvis et al. | |
| 2016/0275990 A1 | 9/2016 | Vassort | |
| 2016/0292373 A1 | 10/2016 | Spors et al. | |
| 2016/0299769 A1 | 10/2016 | Hunter et al. | |
| 2016/0301761 A1 | 10/2016 | Sanchez-sandoval et al. | |
| 2016/0301794 A1 | 10/2016 | Schlakman et al. | |
| 2016/0302666 A1 | 10/2016 | Shaya | |
| 2016/0346607 A1 | 12/2016 | Rapfogel | |
| 2017/0000359 A1 | 1/2017 | Kohli et al. | |
| 2017/0007159 A1 | 1/2017 | Dieffenderfer et al. | |
| 2017/0032168 A1 | 2/2017 | Kim | |
| 2017/0046024 A1 | 2/2017 | Dascola et al. | |
| 2017/0053542 A1 | 2/2017 | Wilson et al. | |
| 2017/0075551 A1 | 3/2017 | Robinson et al. | |
| 2017/0086693 A1 | 3/2017 | Peterson et al. | |
| 2017/0127997 A1 | 5/2017 | Hyde et al. | |
| 2017/0150917 A1 | 6/2017 | Brief et al. | |
| 2017/0172522 A1 | 6/2017 | Insler et al. | |
| 2017/0188841 A1 | 7/2017 | Ma et al. | |
| 2017/0202496 A1 | 7/2017 | Ramanathan | |
| 2017/0235443 A1 | 8/2017 | Suzuki | |
| 2017/0237694 A1 | 8/2017 | Choudhary et al. | |
| 2017/0243508 A1 | 8/2017 | Cheng et al. | |
| 2017/0258455 A1 | 9/2017 | Qi | |
| 2017/0274149 A1 | 9/2017 | Aeschlimann | |
| 2017/0274267 A1 | 9/2017 | Blahnik | |
| 2017/0300186 A1 | 10/2017 | Kuhar et al. | |
| 2017/0303844 A1 | 10/2017 | Baker et al. | |
| 2017/0319184 A1 | 11/2017 | Sano | |
| 2017/0330297 A1 | 11/2017 | Cronin et al. | |
| 2017/0354845 A1 | 12/2017 | Williams et al. | |
| 2017/0357520 A1 | 12/2017 | De vries et al. | |
| 2018/0000426 A1 | 1/2018 | Li | |
| 2018/0001184 A1 | 1/2018 | Tran et al. | |
| 2018/0011686 A1 | 1/2018 | Zhao et al. | |
| 2018/0049696 A1 | 2/2018 | Eom et al. | |
| 2018/0055490 A1 | 3/2018 | Lee et al. | |
| 2018/0064356 A1 | 3/2018 | Mendenhall et al. | |
| 2018/0074464 A1 | 3/2018 | Essery et al. | |
| 2018/0189077 A1 | 7/2018 | Gupta et al. | |
| 2019/0223843 A1 | 7/2019 | Vitti | |
| 2019/0274562 A1 | 9/2019 | Soli et al. | |

(56) References Cited

U.S. PATENT DOCUMENTS

| | | | |
|---|---|---|---|
| 2019/0274563 A1 | 9/2019 | Soli et al. |
| 2019/0274564 A1 | 9/2019 | Soli et al. |
| 2019/0274565 A1 | 9/2019 | Soli et al. |
| 2019/0336044 A1 | 11/2019 | Williams et al. |
| 2019/0336045 A1 | 11/2019 | Williams et al. |
| 2019/0339849 A1 | 11/2019 | Williams et al. |

FOREIGN PATENT DOCUMENTS

| | | |
|---|---|---|
| CN | 106537397 A | 3/2017 |
| EP | 3042606 A1 | 7/2016 |
| JP | 2012-524640 A | 10/2012 |
| JP | 2013-544140 A | 12/2013 |
| JP | 2016-502875 A | 2/2016 |
| JP | 2017-532069 A | 11/2017 |
| KR | 10-2012-0023657 A | 3/2012 |
| KR | 10-2013-0111569 A | 10/2013 |
| KR | 10-2017-0003608 A | 1/2017 |
| WO | 2003/067202 A2 | 8/2003 |
| WO | 2006/046648 A1 | 5/2006 |
| WO | 2010/126825 A1 | 11/2010 |
| WO | 2012/061440 A2 | 5/2012 |
| WO | 2013/109916 A1 | 7/2013 |
| WO | 2015/187799 A1 | 12/2015 |
| WO | 2016/036582 A2 | 3/2016 |
| WO | 2016/161152 A1 | 10/2016 |
| WO | 2017/037242 A1 | 3/2017 |
| WO | 2017/062621 A1 | 4/2017 |
| WO | 2017/090810 A1 | 6/2017 |
| WO | 2018/148356 A1 | 8/2018 |

OTHER PUBLICATIONS

Advisory Action received for U.S. Appl. No. 16/144,864, dated Jul. 29, 2019, 6 pages.
Advisory Action received for U.S. Appl. No. 16/144,849, dated Aug. 12, 2019, 5 pages.
amazon.com, "Extech SL130G Sound Level Alert with Alarm (Discontinued by Manufacturer)", Online available at: https://www.amazon.com/Extech-SL130G-Sound-Discontinued-Manufacturer/dp/B000L9PG4U, retrieved on Aug. 29, 2019, 8 pages.
Casella Cel Casella, "The Casella dBadge2—World's First Truly Wireless Noise Dosimeter and Airwave App!", Retrieved from URL: https://www.youtube.com/watch?v=Xvy2fl3cgYo, May 27, 2015, 3 pages.
Certificate of Examination received for Australian Patent Application No. 2019100222, dated Aug. 29, 2019, 2 pages.
CNET, "Google Fit's automatic activity tracking is getting smarter on Android Wear", Available online at: https://www.youtube.com/watch?v=IttzlCid_d8, May 18, 2016, 1 page.
Decision to Grant received for Danish Patent Application No. PA201870379, dated Jul. 5, 2019, 2 pages.
Evergreen et al., "Bar Chart, Better Evaluation", Available Online at: https://www.betterevaluation.org/en/evaluation-options/BarChart, Oct. 31, 2014, 8 pages.
Final Office Action received for U.S. Appl. No. 16/143,909, dated Aug. 28, 2019, 20 pages.
Final Office Action received for U.S. Appl. No. 16/143,997, dated Sep. 30, 2019, 16 pages.
Final Office Action received for U.S. Appl. No. 16/144,030, dated Oct. 1, 2019, 13 pages.
Final Office Action received for U.S. Appl. No. 16/144,849, dated Jun. 7, 2019, 29 pages.
Final Office Action received for U.S. Appl. No. 16/144,864, dated May 17, 2019, 24 pages.
"Fitbit App", Available online at: http://web.archive.org/web/20180114083150/https://www.fitbit.com/au/app, Jan. 14, 2018, 8 pages.
Garmin, "Fenix 5x Owner's Manual", Online Available at: https://web.archive.org/web/20180127170640/https://static.garmin.com/pumac/fenix5x_OM_EN.pdf, Jan. 27, 2018, 42 pages.
"Graphs and Charts", online available at: https://www.teachervision.com/lesson-planning/graph-chart-teacher-resources, retrieved on Dec. 12, 2018, 4 pages.
Intention to Grant received for Danish Patent Application No. PA201870379, dated May 2, 2019, 2 pages.
Intention to Grant received for Danish Patent Application No. PA201870600, dated Jul. 10, 2019, 2 pages.
International Search Report and Written Opinion received for PCT Patent Application No. PCT/US2019/019694, dated Sep. 2, 2019, 17 pages.
International Search Report and Written Opinion received for PCT Patent Application No. PCT/US2019/024570, dated Aug. 8, 2019, 18 pages.
Invitation to Pay Additional Fees received for PCT Patent Application No. PCT/US2019/019694, dated Jul. 10, 2019, 12 pages.
Megadepot, "Casella dBadge2 Noise Dosimeter", Retrieved from URL: https://www.youtube.com/watch?v=pHiHLiYCD08, Jun. 12, 2018, 3 pages.
Multi-Set Bar Chart, "The Data Visualization Catalogue", Available Online at: https://datavizcatalogue.com/methods/multiset_barchart.html, Feb. 8, 2014, 3 pages.
NIOSH, NIOSH "Sound Level Meter Application (app) for iOS devices", Hearing Loss Prevention Team Engineering and Physical Hazards Branch Division of Applied Research and Technology, retrieved on Aug. 29, 2019, 25 pages.
Non-Final Office Action Received for U.S. Appl. No. 16/144,864, dated Dec. 18, 2018, 19 pages.
Non-Final Office Action received for U.S. Appl. No. 16/143,909, dated Apr. 19, 2019, 16 pages.
Non-Final Office Action received for U.S. Appl. No. 16/143,959, dated Apr. 17, 2019, 15 pages.
Non-Final Office Action received for U.S. Appl. No. 16/143,997, dated May 21, 2019, 15 pages.
Non-Final Office Action received for U.S. Appl. No. 16/144,030, dated Apr. 12, 2019, 8 pages.
Non-Final Office Action received for U.S. Appl. No. 16/144,849, dated Dec. 31, 2018, 28 pages.
Non-Final Office Action received for U.S. Appl. No. 16/144,849, dated Sep. 17, 2019, 9 pages.
Office Action received for Australian Patent Application No. 2019100222, dated May 24, 2019, 6 pages.
Office Action received for Australian Patent Application No. 2019100495, dated Sep. 17, 2019, 7 pages.
Office Action received for Australian Patent Application No. 2019222943, dated Oct. 3, 2019, 3 pages.
Office Action received for Danish Patent Application No. PA201870378, dated Feb. 25, 2019, 3 pages.
Office Action received for Danish Patent Application No. PA201870379, dated Feb. 28, 2019, 3 pages.
Office Action received for Danish Patent Application No. PA201870380, dated Mar. 27, 2019, 4 pages.
Office Action received for Danish Patent Application No. PA201870380, dated Sep. 11, 2018, 9 pages.
Office Action received for Danish Patent Application No. PA201870600, dated May 8, 2019, 3 pages.
Office Action received for Danish Patent Application No. PA201870601, dated Dec. 13, 2018, 8 pages.
Office Action received for Danish Patent Application No. PA201870601, dated Jun. 25, 2019, 3 pages.
Office Action received for Danish Patent Application No. PA201870602, dated Jun. 26, 2019, 3 pages.
Office Action received for Danish Patent Application No. PA201970534, dated Sep. 23, 2019, 6 pages.
Polyanskiy, Vlad, "dB Meter & Spectrum Analyzer, Watch Aware", Online Available at: https://watchaware.com/watch-apps/733773616, Retrieved on Aug. 29, 2019, 2 pages.
Rainmaker, "Garmin Fenix3 New Auto Climb Functionality", Available online at: https://www.youtube.com/watch?v=iuavOSNpVRc, Feb. 19, 2015, 1 page.
Rizknows, "Tom Tom Multisport Cardio Review", Online available at: https://www.youtube.com/watch?v=WoVCzLrSN9A, Sep. 4, 2015, 1 page.

(56) References Cited

OTHER PUBLICATIONS

Search Report and Opinion received for Danish Patent Application No. PA201870378, dated Sep. 10, 2018, 9 pages.
Search Report and Opinion received for Danish Patent Application No. PA201870379, dated Sep. 14, 2018, 9 pages.
Search Report and Opinion received for Danish Patent Application No. PA201870599, dated Dec. 21, 2018, 9 pages.
Search Report and Opinion received for Danish Patent Application No. PA201870600, dated Jan. 31, 2019, 8 pages.
Search Report and Opinion received for Danish Patent Application No. PA201870602, dated Dec. 19, 2018, 8 pages.
Smith, "Garmin Fenix 5 Activity/Smart Watch Review", Online Available at: https://www.youtube.com/watch?v=6PkQxXQxpoU, Sep. 2, 2017, 1 page.
Sportstechguides, "Garmin Fenix 5: How to Add Power Data Fields", Online Available at: https://www.youtube.com/watch?v=ZkPptnnXEiQ, Apr. 29, 2017, 2 pages.
Sportstechguides, "Garmin Fenix 5: How to Set Up Run Alerts", Online Available at: https://www.youtube.com/watch?v=gSMwv8vlhB4, May 13, 2017, 2 pages.
Studiosixdigital, "Dosimeter", Retrieved from URL: https://www.youtube.com/watch?v=CZ4jkgutp3I, Mar. 3, 2017, 3 pages.
"Suunto Spartan Trainer Wrist HR 1.12", Online Available at: https://web.archive.org/web/20180127155200/https://ns.suunto.com/Manuals/Spartan_Trainer_WristHR/Userguides/Suunto_Spartan_Trainer_WristHR_UserGuide_EN.pdf, Jan. 17, 2018, 47 pages.
Suunto, "Suunto Spartan—Heart Rate Zones", Online Available at: https://www.youtube.com/watch?v=aixfoCnS0OU, Mar. 19, 2018, 2 pages.
Teunmo, "Data field: Visual Pace Alarm, Garmin Forum", Available online at: https://forums.garmin.com/forum/developers/connect-iq/connect-iq-showcase/115996-data-field-visual-pace-alarm, Nov. 17, 2015, 10 pages.
TomTom, "TomTom Runner & Multi-Sport Reference Guide", Online available at: https://web.archive.org/web/20150908075934/http://download.tomtom.com/open/manuals/Runner_Multi-Sport/refman/TomTom-Runner-Multi-Sport-RG-en-gb.pdf, Sep. 8, 2015, 44 pages.
"Visual Pace Alarm app", Available Online at: https://apps.garmin.com/en-US/apps/3940f3a2-4847-4078-a911-d77422966c82, Oct. 19, 2016, 1 page.
Zlelik, "Garmin Fenix 5 Open Water Swimming Activity Demo", Online Available at: https://www.youtube.com/watch?v=iSVhdvw2dcs, Jun. 9, 2017, 1 page.
Advisory Action received for U.S. Appl. No. 16/143,909, dated Nov. 7, 2019, 5 pages.
Decision to Grant received for Danish Patent Application No. PA201870600, dated Oct. 17, 2019, 2 pages.
Notice of Allowance received for U.S. Appl. No. 16/143,959, dated Oct. 31, 2019, 10 pages.
Corrected Notice of Allowance received for U.S. Appl. No. 16/143,909, dated Feb. 20, 2020, 3 pages.
Final Office Action received for U.S. Appl. No. 16/144,030, dated Feb. 13, 2020, 11 pages.
Invitation to Pay Search Fees received for European Patent Application No. 19726205.8, dated Feb. 14, 2020, 5 pages.
Non-Final Office Action received for U.S. Appl. No. 16/144,864, dated Jan. 31, 2020, 29 pages.
Office Action received for Danish Patent Application No. PA201870602, dated Feb. 5, 2020, 3 pages.
Applicant Initiated Interview Summary received for U.S. Appl. No. 16/144,849, dated Jan. 21, 2020, 6 pages.
Notice of Allowance received for U.S. Appl. No. 16/143,909, dated Jan. 21, 2020, 9 pages.
Office Action received for Danish Patent Application No. PA201870378, dated Jan. 6, 2020, 3 pages.
Office Action received for Danish Patent Application No. PA201870601, dated Jan. 14, 2020, 3 pages.
Office Action received for European Patent Application No. 19721883.7, dated Jan. 10, 2020, 4 pages.
Advisory Action received for U.S. Appl. No. 16/143,997, dated Dec. 26, 2019, 7 pages.
Corrected Notice of Allowance received for U.S. Appl. No. 16/143,959, dated Dec. 13, 2019, 2 pages.
Office Action received for Danish Patent Application No. PA201870599, dated Dec. 20, 2019, 5 pages.
MYFLO App, "Functional Medicine Period Tracker and Hormone Balancing App", Available online at <https://web.archive.org/web/20170127104125/https://myflotracker.com/>, Jan. 2017, 14 pages.
MYFLO Tutorial, "How to change the start date of your current period", Available online at <https://www.youtube.com/watch?v=uQQ-odIBJB4>, Jan. 23, 2017, 3 pages.
MYFLO Tutorial, "Setting and changing the end date of your period", Available online at <https://www.youtube.com/watch?v=UvAA4OgqL3E>, Jan. 23, 2017, 3 pages.
Corrected Notice of Allowance received for U.S. Appl. No. 16/143,909, dated Mar. 18, 2020, 3 pages.
Non-Final Office Action received for U.S. Appl. No. 16/138,809, dated Feb. 28, 2020, 22 pages.
Notice of Allowance received for U.S. Appl. No. 16/144,849, dated Mar. 6, 2020, 9 pages.
Office Action received for Australian Patent Application No. 2019100495, dated Mar. 6, 2020, 3 pages.
Office Action received for Danish Patent Application No. PA201870380, dated Mar. 5, 2020, 2 pages.
Office Action received for Japanese Patent Application No. 2019-162293, dated Jan. 31, 2020, 8 pages (4 pages of English Translation and 4 pages of Official Copy).
Office Action received for Korean Patent Application No. 10-2019-7025538, dated Feb. 17, 2020, 12 pages (6 pages of English Translation and 6 pages of Official Copy).
Wesley, "Apple Watch Series 1", Online available at: http://toolbox.info/blog/archives/1737-unknown.html, May 28, 2015, 5 pages (Official copy only) (See Communication under 37 CFR § 1.98(a) (3)).
Youtube, "Apple Watch Series 3", Online available at: https://www.youtube.com/watch?v=iBPr9gEfkK8, Nov. 21, 2017, 15 pages (Official copy only) (See Communication under 37 CFR § 1.98(a) (3)).

\* cited by examiner

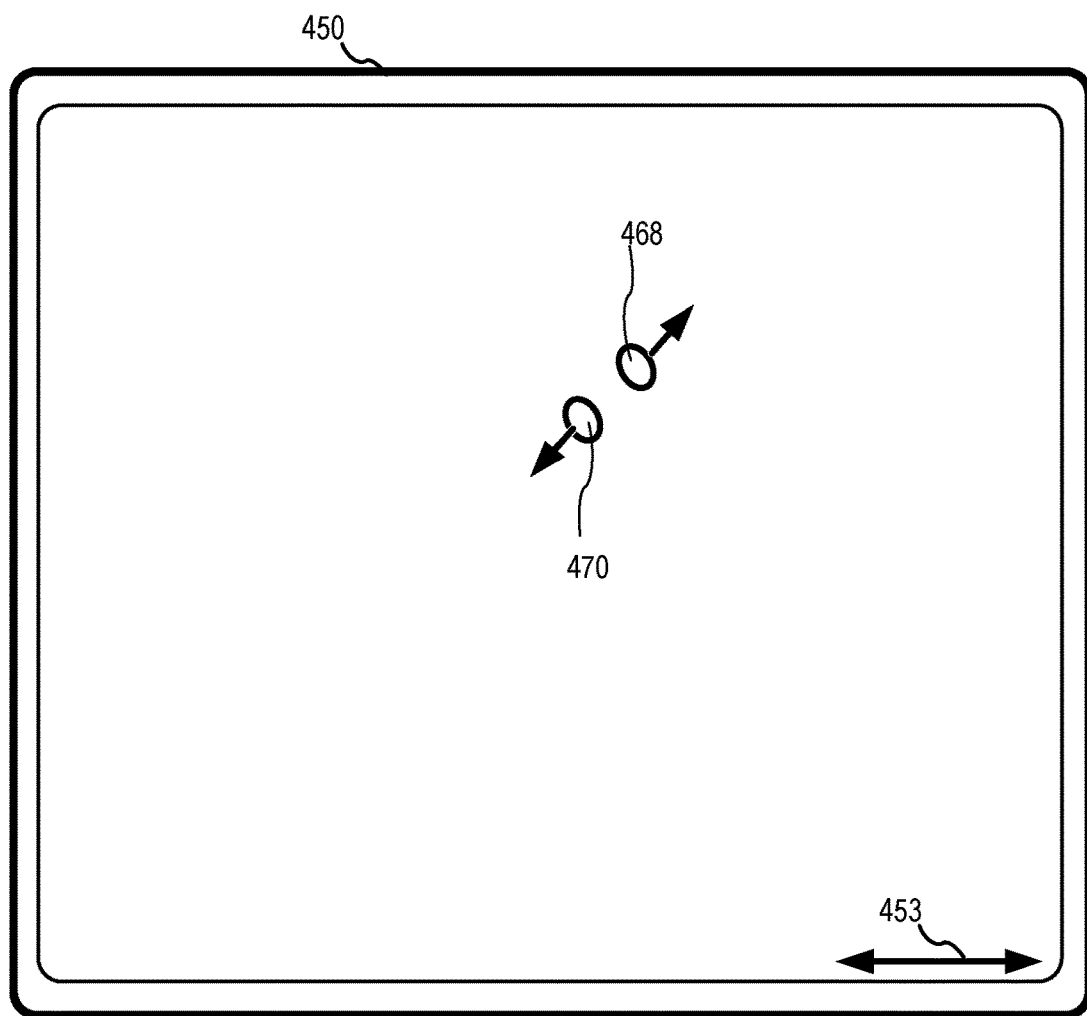
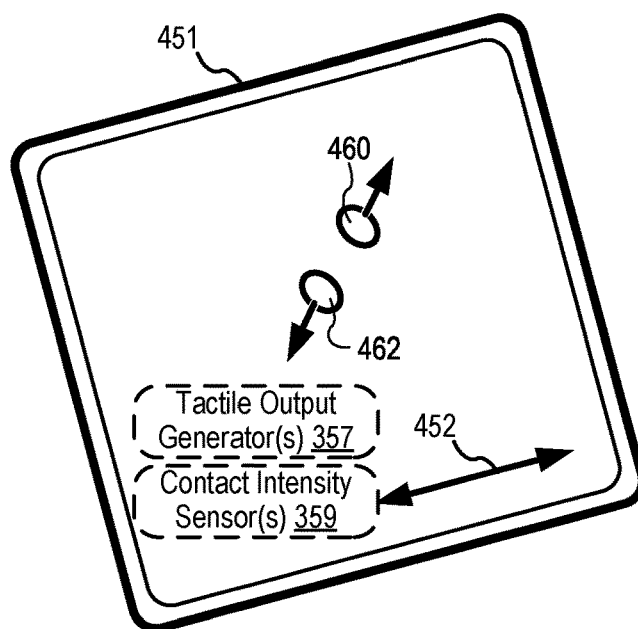
*FIG. 4B*

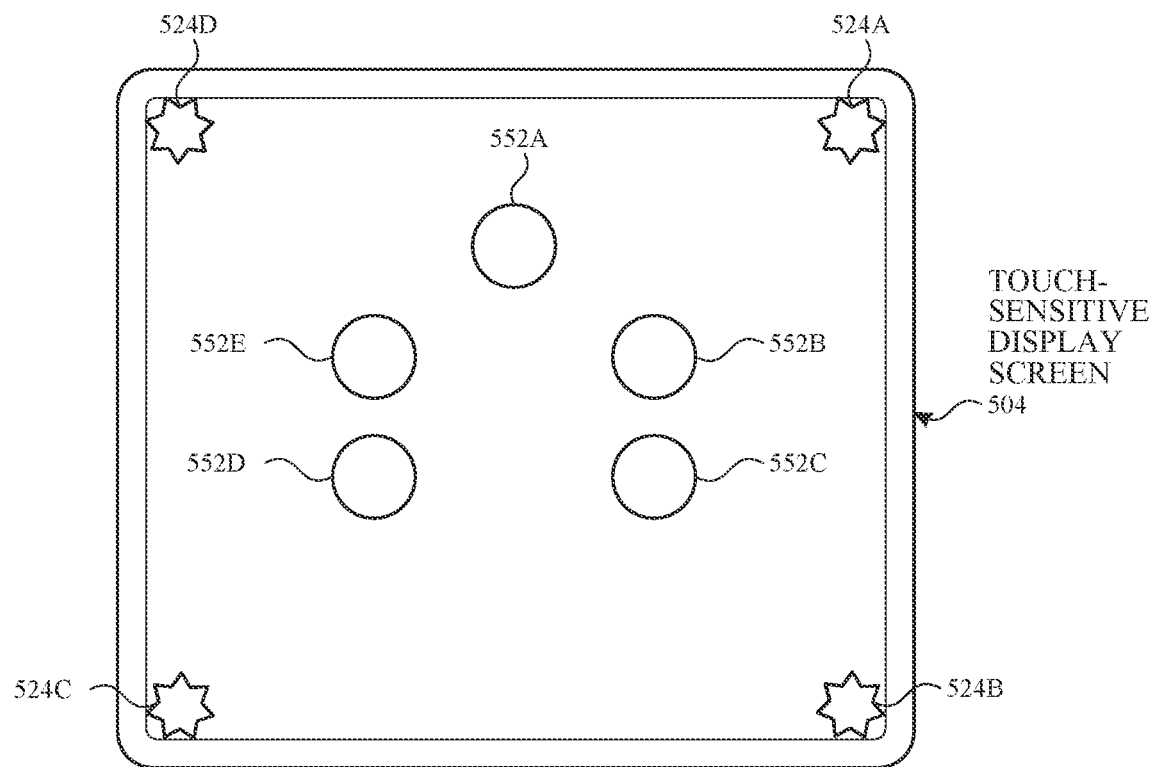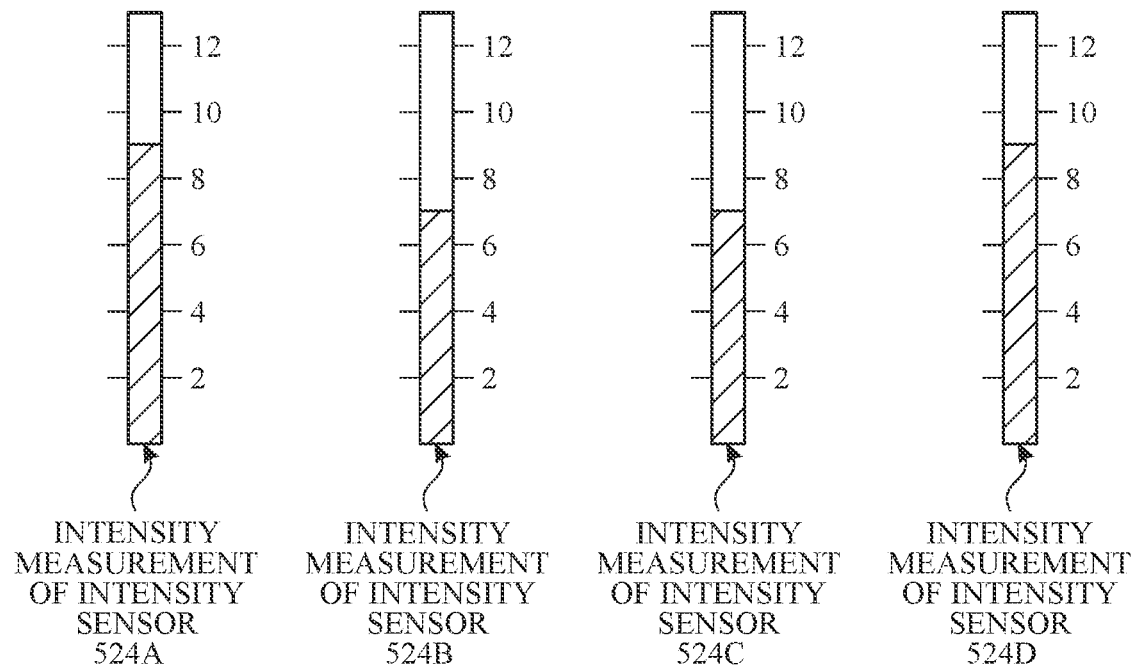
FIG. 5C

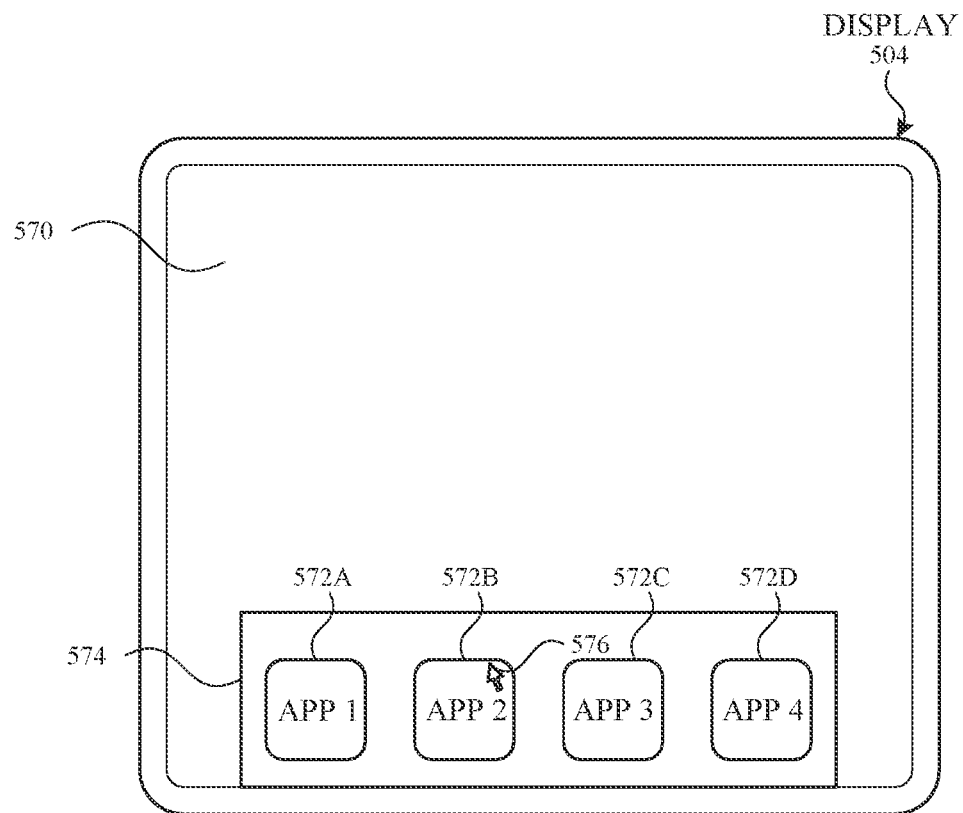
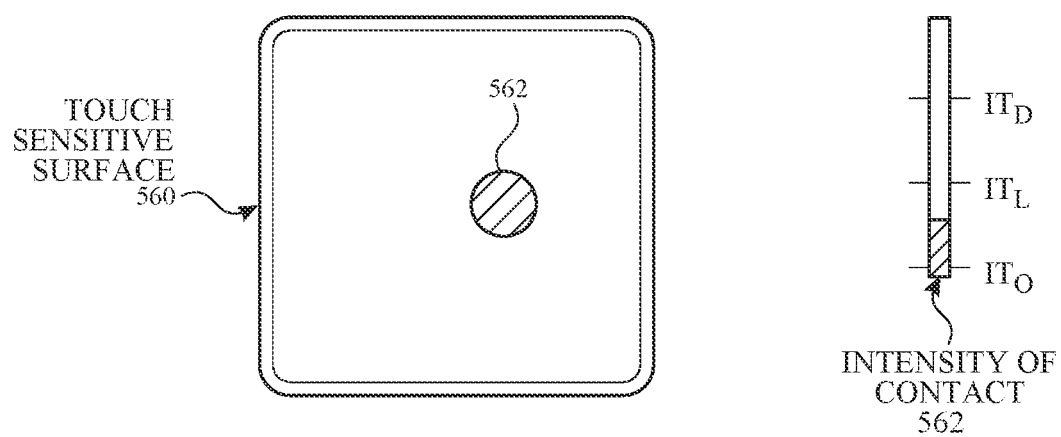
FIG. 5E

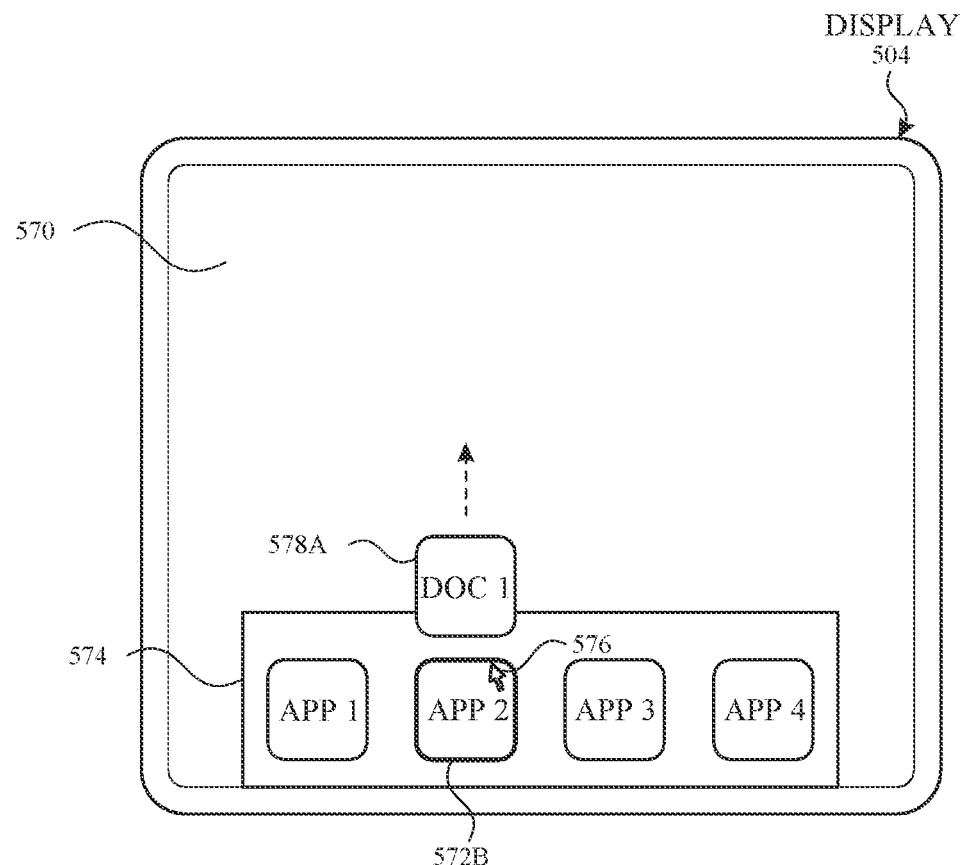
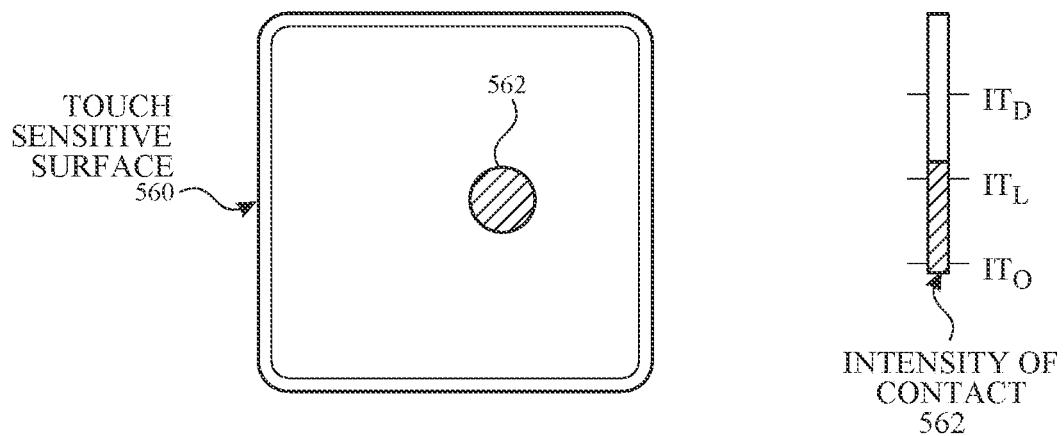
FIG. 5F

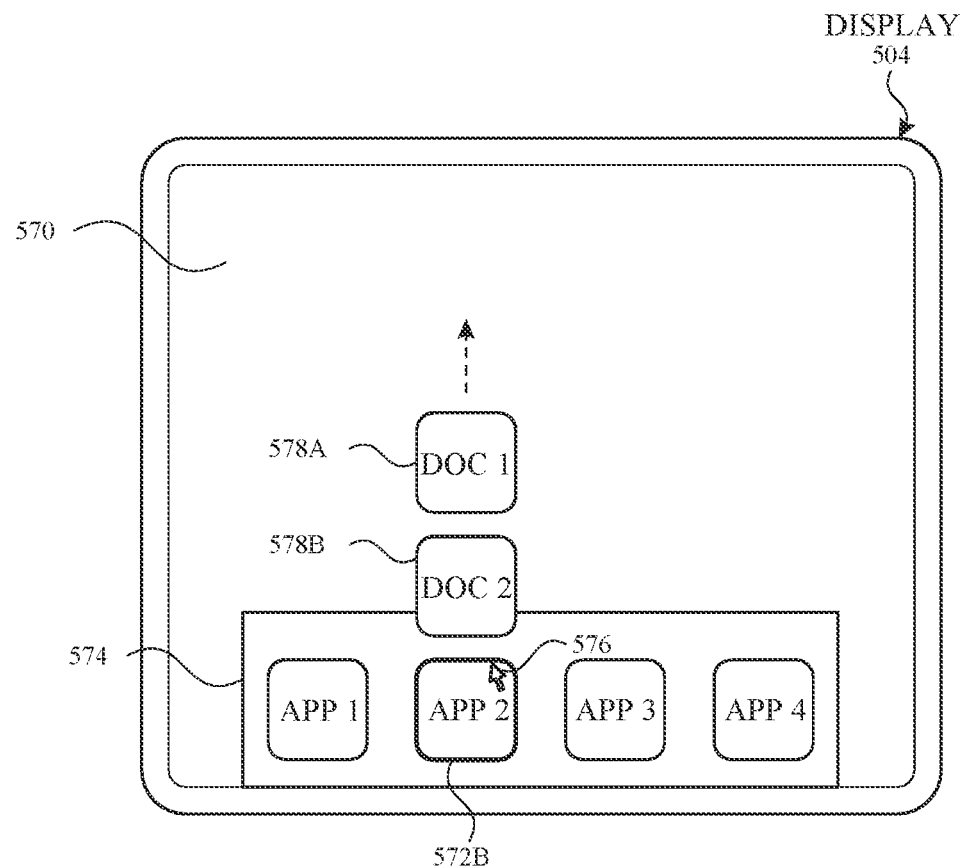
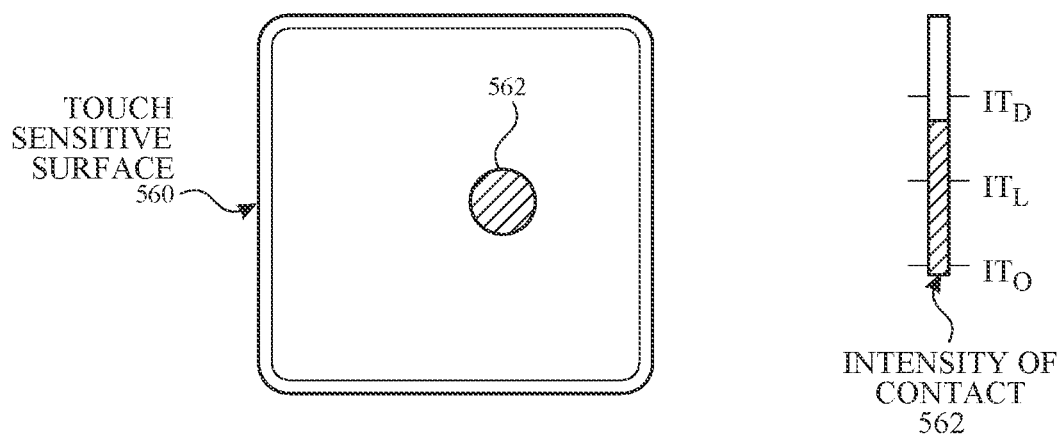
FIG. 5G

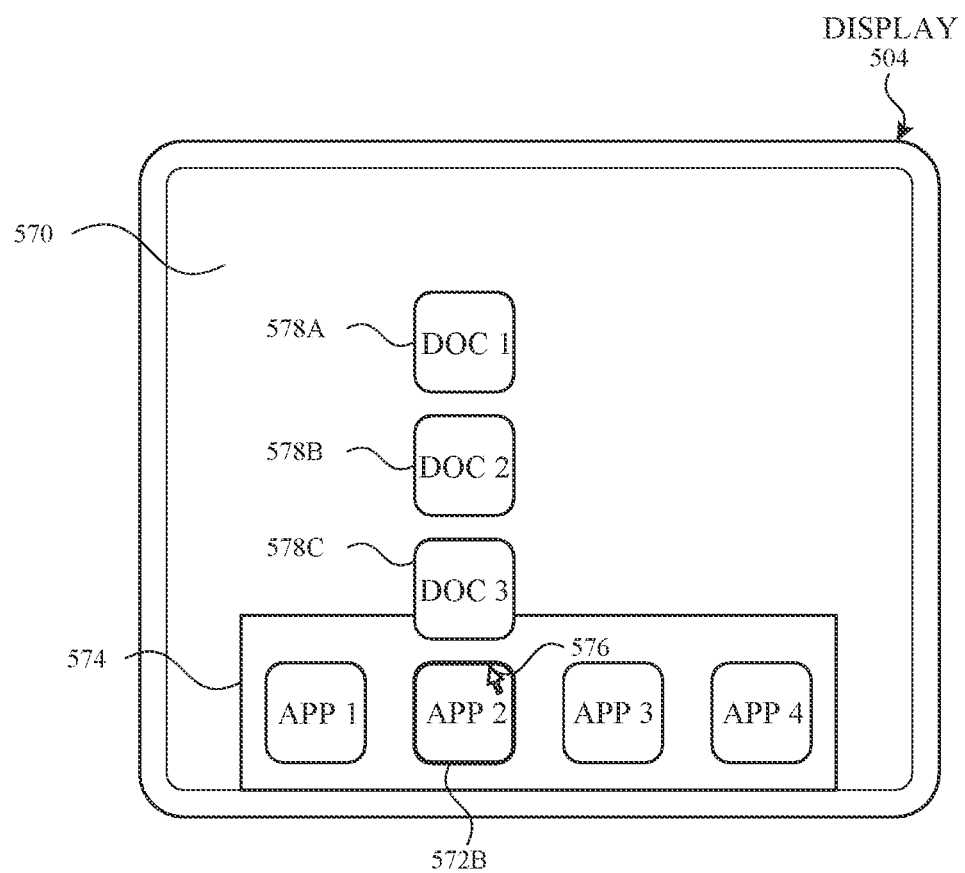
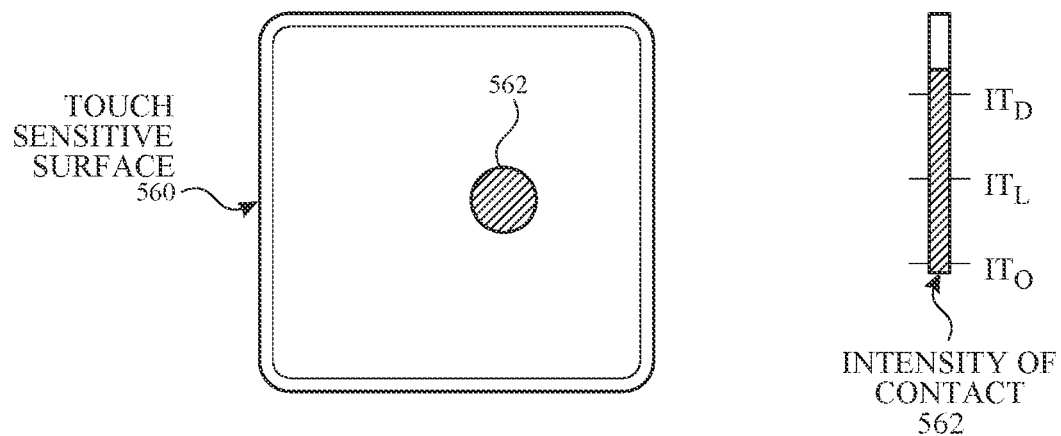
FIG. 5H

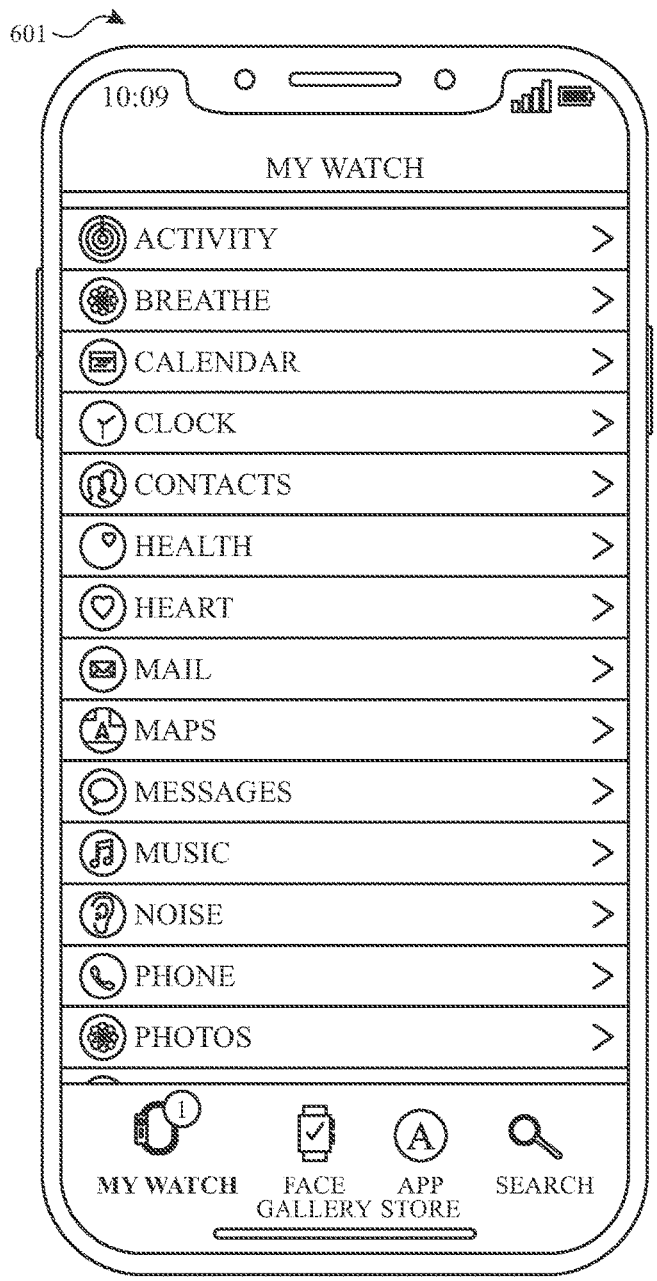
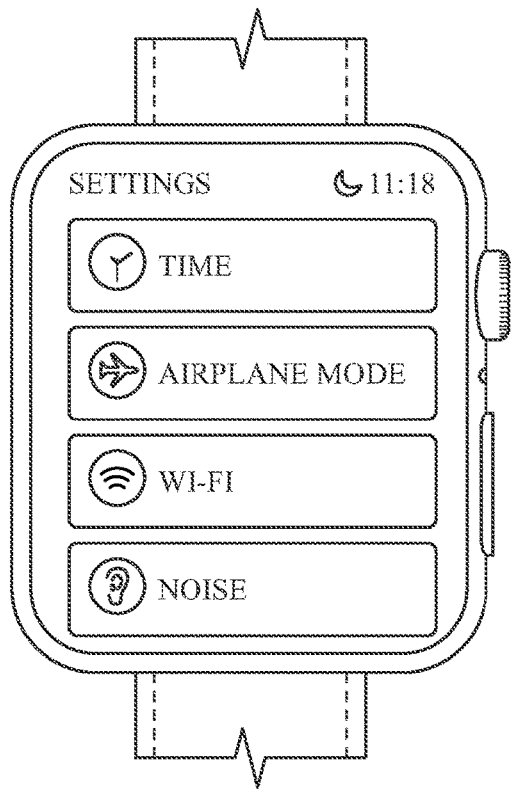
*FIG. 6AA*
*FIG. 6Z*

USER INTERFACES FOR MONITORING NOISE EXPOSURE LEVELS

CROSS-REFERENCE TO RELATED APPLICATIONS

This application claims priority to U.S. Provisional Application No. 62/856,016, filed Jun. 1, 2019, entitled "USER INTERFACES FOR MONITORING NOISE EXPOSURE LEVELS," the entire contents of which are hereby incorporated by reference.

FIELD

The present disclosure relates generally to computer user interfaces, and more specifically to user interfaces and techniques for monitoring noise exposure levels.

BACKGROUND

An electronic device can be used to monitor a level of noise that is exposed to a user of the electronic device. Information concerning the monitored noise exposure levels can be presented to the user on the electronic device.

BRIEF SUMMARY

Some techniques for monitoring noise exposure levels using electronic devices, however, are generally cumbersome and inefficient. For example, some existing techniques use a complex and time-consuming user interface, which may include multiple key presses or keystrokes. Existing techniques require more time than necessary, wasting user time and device energy. This latter consideration is particularly important in battery-operated devices.

Accordingly, the present technique provides electronic devices with faster, more efficient methods and interfaces for monitoring noise exposure levels. Such methods and interfaces optionally complement or replace other methods for monitoring noise exposure levels. Such methods and interfaces reduce the cognitive burden on a user and produce a more efficient human-machine interface. For battery-operated computing devices, such methods and interfaces conserve power and increase the time between battery charges.

In accordance with some embodiments, a method performed at an electronic device including a display device is described. The method comprises: displaying, via the display device, a first user interface including a graphical object that varies in appearance based on a noise level; receiving first noise level data corresponding to a first noise level, the first noise level below a threshold noise level; in response to receiving the first noise level data, displaying the graphical object with an active portion of a first size based on the first noise data and in a first color; while maintaining display of the first user interface, receiving second noise level data corresponding to a second noise level different from the first noise level; and in response to receiving the second noise level data: displaying the active portion in a second size based on the second noise level that that is different from the first size; in accordance with a determination that the second noise level exceeds the threshold noise level, displaying the active portion in a second color different from the first color; and in accordance with a determination that the second noise level does not exceed the threshold noise level, maintaining display of the graphical object in the first color.

In accordance with some embodiments, a non-transitory computer-readable storage medium storing one or more programs configured to be executed by one or more processors of an electronic device with a display device is described. The one or more programs include instructions for: displaying, via the display device, a first user interface including a graphical object that varies in appearance based on a noise level; receiving first noise level data corresponding to a first noise level, the first noise level below a threshold noise level; in response to receiving the first noise level data, displaying the graphical object with an active portion of a first size based on the first noise data and in a first color; while maintaining display of the first user interface, receiving second noise level data corresponding to a second noise level different from the first noise level; and in response to receiving the second noise level data: displaying the active portion in a second size based on the second noise level that that is different from the first size; in accordance with a determination that the second noise level exceeds the threshold noise level, displaying the active portion in a second color different from the first color; and in accordance with a determination that the second noise level does not exceed the threshold noise level, maintaining display of the graphical object in the first color.

In accordance with some embodiments, a transitory computer-readable storage medium storing one or more programs configured to be executed by one or more processors of an electronic device with a display device is described. The one or more programs include instructions for: displaying, via the display device, a first user interface including a graphical object that varies in appearance based on a noise level; receiving first noise level data corresponding to a first noise level, the first noise level below a threshold noise level; in response to receiving the first noise level data, displaying the graphical object with an active portion of a first size based on the first noise data and in a first color; while maintaining display of the first user interface, receiving second noise level data corresponding to a second noise level different from the first noise level; and in response to receiving the second noise level data: displaying the active portion in a second size based on the second noise level that that is different from the first size; in accordance with a determination that the second noise level exceeds the threshold noise level, displaying the active portion in a second color different from the first color; and in accordance with a determination that the second noise level does not exceed the threshold noise level, maintaining display of the graphical object in the first color.

In accordance with some embodiments, an electronic device is described. The electronic device comprises a display device; one or more processors; and memory storing one or more programs configured to be executed by the one or more processors, the one or more programs including instructions for: displaying, via the display device, a first user interface including a graphical object that varies in appearance based on a noise level; receiving first noise level data corresponding to a first noise level, the first noise level below a threshold noise level; in response to receiving the first noise level data, displaying the graphical object with an active portion of a first size based on the first noise data and in a first color; while maintaining display of the first user interface, receiving second noise level data corresponding to a second noise level different from the first noise level; and in response to receiving the second noise level data: displaying the active portion in a second size based on the second noise level that that is different from the first size; in accordance with a determination that the second noise level exceeds the threshold noise level, displaying the active portion in a second color different from the first color; and in accordance with a determination that the second noise level does not exceed the threshold noise level, maintaining display of the graphical object in the first color.

In accordance with some embodiments, an electronic device is described. The electronic device comprises a display device; means for displaying, via the display device, a first user interface including a graphical object that varies in appearance based on a noise level; means for receiving first noise level data corresponding to a first noise level, the first noise level below a threshold noise level; means for, in response to receiving the first noise level data, displaying the graphical object with an active portion of a first size based on the first noise data and in a first color; means for, while maintaining display of the first user interface, receiving second noise level data corresponding to a second noise level different from the first noise level; and means for, in response to receiving the second noise level data: displaying the active portion in a second size based on the second noise level that that is different from the first size; in accordance with a determination that the second noise level exceeds the threshold noise level, displaying the active portion in a second color different from the first color; and in accordance with a determination that the second noise level does not exceed the threshold noise level, maintaining display of the graphical object in the first color.

In accordance with some embodiments, a method performed at an electronic device including a display device and a touch sensitive surface is described. The method comprises: receiving: first noise level data attributable to a first device type; and second noise level data attributable to a second device type different from the first device type; displaying, via the display device, a first user interface, the first user interface including: a first representation of received noise level data that is based on the first noise level data and the second noise level data; and a first device type data filtering affordance; while displaying the first user interface, detecting a first user input corresponding to selection of the first device type data filtering affordance; and in response detecting the first user input, displaying a second representation of received noise level data that is based on the second noise level data and that is not based on the first noise level data.

In accordance with some embodiments, a non-transitory computer-readable storage medium storing one or more programs configured to be executed by one or more processors of an electronic device with a display device and a touch sensitive surface is described. The one or more programs include instructions for: receiving: first noise level data attributable to a first device type; and second noise level data attributable to a second device type different from the first device type; displaying, via the display device, a first user interface, the first user interface including: a first representation of received noise level data that is based on the first noise level data and the second noise level data; and a first device type data filtering affordance; while displaying the first user interface, detecting a first user input corresponding to selection of the first device type data filtering affordance; and in response detecting the first user input, displaying a second representation of received noise level data that is based on the second noise level data and that is not based on the first noise level data.

In accordance with some embodiments, a transitory computer-readable storage medium storing one or more programs configured to be executed by one or more processors of an electronic device with a display device and a touch sensitive surface is described. The one or more programs include instructions for: receiving: first noise level data attributable to a first device type; and second noise level data attributable to a second device type different from the first device type; displaying, via the display device, a first user interface, the first user interface including: a first representation of received noise level data that is based on the first noise level data and the second noise level data; and a first device type data filtering affordance; while displaying the first user interface, detecting a first user input corresponding to selection of the first device type data filtering affordance; and in response detecting the first user input, displaying a second representation of received noise level data that is based on the second noise level data and that is not based on the first noise level data.

In accordance with some embodiments, an electronic device is described. The electronic device comprises a display device; a touch sensitive surface; one or more processors; and memory storing one or more programs configured to be executed by the one or more processors, the one or more programs including instructions for: receiving: first noise level data attributable to a first device type; and second noise level data attributable to a second device type different from the first device type; displaying, via the display device, a first user interface, the first user interface including: a first representation of received noise level data that is based on the first noise level data and the second noise level data; and a first device type data filtering affordance; while displaying the first user interface, detecting a first user input corresponding to selection of the first device type data filtering affordance; and in response detecting the first user input, displaying a second representation of received noise level data that is based on the second noise level data and that is not based on the first noise level data.

In accordance with some embodiments, an electronic device is described. The electronic device comprises a display device; a touch sensitive surface; means for receiving: first noise level data attributable to a first device type; and second noise level data attributable to a second device type different from the first device type; means for displaying, via the display device, a first user interface, the first user interface including: a first representation of received noise level data that is based on the first noise level data and the second noise level data; and a first device type data filtering affordance; means for, while displaying the first user interface, detecting a first user input corresponding to selection of the first device type data filtering affordance; and means for, in response detecting the first user input, displaying a second representation of received noise level data that is based on the second noise level data and that is not based on the first noise level data.

Executable instructions for performing these functions are, optionally, included in a non-transitory computer-readable storage medium or other computer program product configured for execution by one or more processors. Executable instructions for performing these functions are, optionally, included in a transitory computer-readable storage medium or other computer program product configured for execution by one or more processors.

Thus, devices are provided with faster, more efficient methods and interfaces for monitoring noise exposure levels, thereby increasing the effectiveness, efficiency, and user satisfaction with such devices. Such methods and interfaces may complement or replace other methods for monitoring noise exposure levels.

DESCRIPTION OF THE FIGURES

For a better understanding of the various described embodiments, reference should be made to the Description of Embodiments below, in conjunction with the following drawings in which like reference numerals refer to corresponding parts throughout the figures.

FIG. 4B illustrates an exemplary user interface for a multifunction device with a touch-sensitive surface that is separate from the display in accordance with some embodiments.

FIGS. 5C-5D illustrate exemplary components of a personal electronic device having a touch-sensitive display and intensity sensors in accordance with some embodiments.

FIGS. 5E-5H illustrate exemplary components and user interfaces of a personal electronic device in accordance with some embodiments.

FIG. 11A-11L illustrates user interfaces in accordance with some embodiments.

DESCRIPTION OF EMBODIMENTS

Figure 1A:
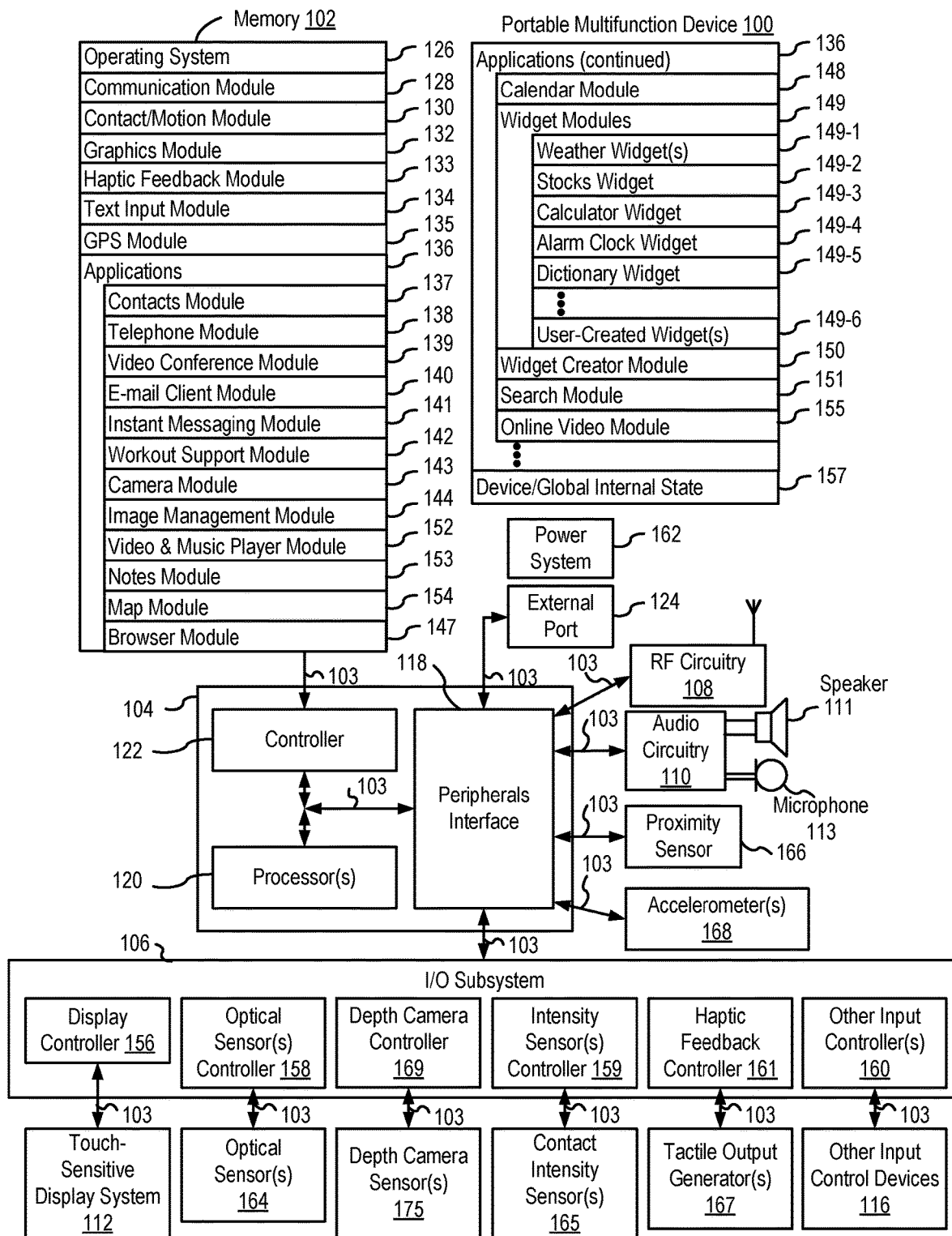
FIG. 1A is a block diagram illustrating a portable multifunction device with a touch-sensitive display in accordance with some embodiments.

The following description sets forth exemplary methods, parameters, and the like. It should be recognized, however, that such description is not intended as a limitation on the scope of the present disclosure but is instead provided as a description of exemplary embodiments.

There is a need for electronic devices that provide efficient methods and interfaces for monitoring noise exposure levels. For example, there is a need for an electronic device that provides a user with information about the level of noise the user is exposed to in an easily understandable and convenient manner. In another example, there is a need for an electronic device that effectively alerts the user of the electronic device when the noise level that the user is exposed to exceeds a certain threshold level. Such techniques can reduce the cognitive burden on a user who monitors noise exposure levels, thereby enhancing productivity. Further, such techniques can reduce processor and battery power otherwise wasted on redundant user inputs.

Below, FIGS. 1A-1B, 2, 3, 4A-4B, 5A-5H, 6A-6AL, 8A-8L, 9A-9G, and 11A-11L provide a description of exemplary devices for performing the techniques for monitoring noise exposure levels. FIGS. 6A-6L illustrate exemplary user interfaces for monitoring noise exposure levels. FIGS. 7A-7B are a flow diagram illustrating a method for monitoring noise exposure levels using an electronic device, in accordance with some embodiments. The user interfaces in FIGS. 6A-6L are used to illustrate the processes described below, including the processes in FIG. 7. FIGS. 8A-8L illustrate exemplary user interfaces for accessing and displaying environmental noise exposure data. FIGS. 9A-9G illustrate exemplary user interfaces for monitoring noise exposure levels. FIG. 10 is a flow diagram illustrating a method for monitoring noise exposure levels using an electronic device, in accordance with some embodiments. The user interfaces in FIGS. 9A-9G are used to illustrate the processes described below, including the processes in FIG. 10. FIGS. 11A-11F illustrate exemplary user interfaces accessing and displaying audiogram data and performing an audio device tuning process using audiogram data.

Although the following description uses terms "first," "second," etc. to describe various elements, these elements should not be limited by the terms. These terms are only used to distinguish one element from another. For example, a first touch could be termed a second touch, and, similarly, a second touch could be termed a first touch, without departing from the scope of the various described embodiments. The first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer with a touch-sensitive surface (e.g., a touch screen display and/or a touchpad).

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience and is sometimes known as or called a "touch-sensitive display system." Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data. In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, depth camera controller 169, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some alternate embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons are, optionally, user-customizable. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output optionally corresponds to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, Calif.

A touch-sensitive display in some embodiments of touch screen 112 is, optionally, analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more depth camera sensors 175. FIG. 1A shows a depth camera sensor coupled to depth camera controller 169 in I/O subsystem 106. Depth camera sensor 175 receives data from the environment to create a three dimensional model of an object (e.g., a face) within a scene from a viewpoint (e.g., a depth camera sensor). In some embodiments, in conjunction with imaging module 143 (also called a camera module), depth camera sensor 175 is optionally used to determine a depth map of different portions of an image captured by the imaging module 143. In some embodiments, a depth camera sensor is located on the front of device 100 so that the user's image with depth information is, optionally, obtained for video conferencing while the user views the other video conference participants on the touch screen display and to capture selfies with depth map data. In some embodiments, the depth camera sensor 175 is located on the back of device, or on the back and the front of the device 100. In some embodiments, the position of depth camera sensor 175 can be changed by the user (e.g., by rotating the lens and the sensor in the device housing) so that a depth camera sensor 175 is used along with the touch screen display for both video conferencing and still and/or video image acquisition.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. Accelerometer 168 optionally performs as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer and a GPS (or GLONASS or other global navigation system) receiver for obtaining information concerning the location and orientation (e.g., portrait or landscape) of device 100.

Figure 3:
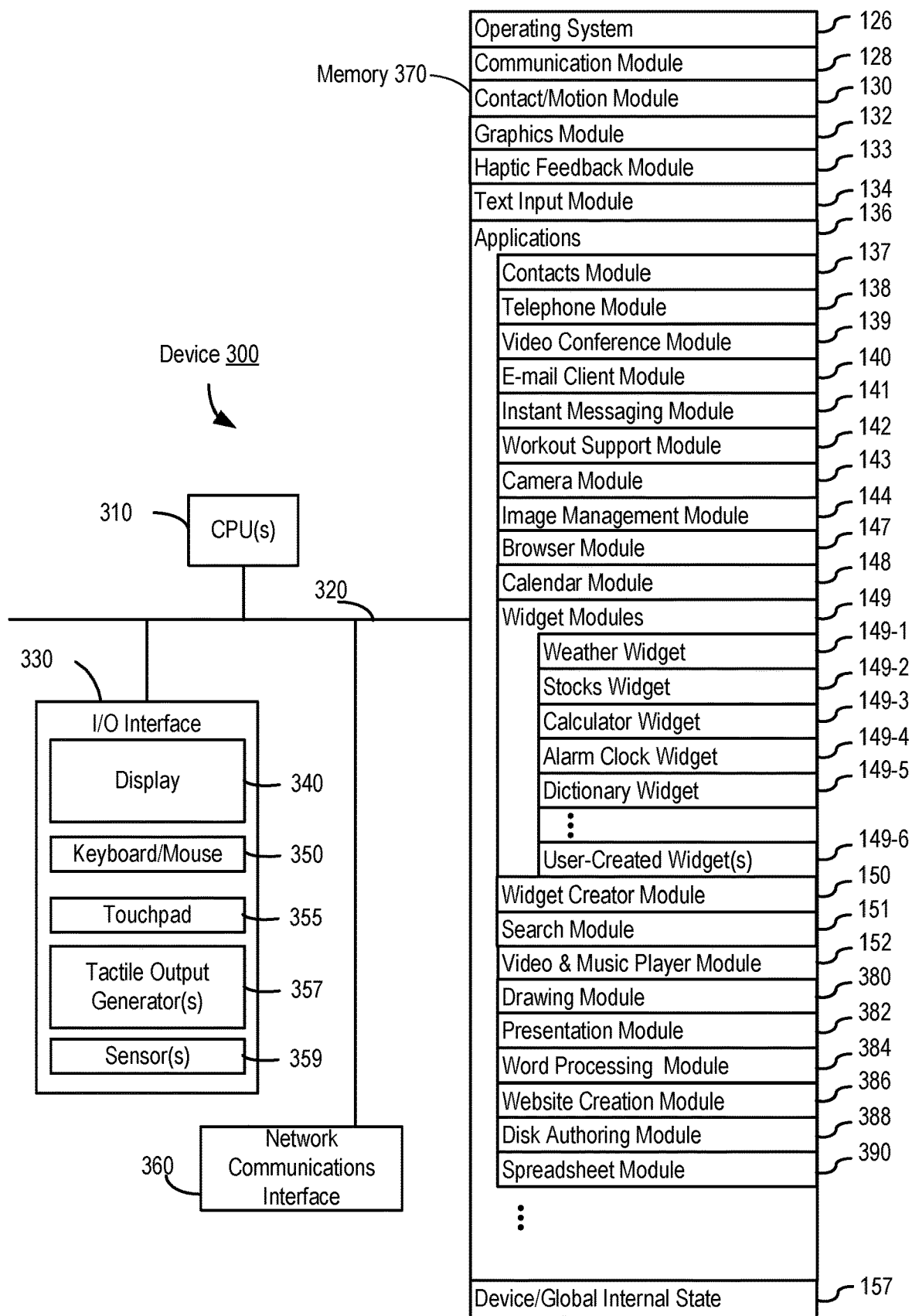
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing; to camera 143 as picture/video metadata; and to applications that provide location-based services such as weather widgets, local yellow page widgets, and map/navigation widgets).

Applications 136 optionally include the following modules (or sets of instructions), or a subset or superset thereof:
  Contacts module 137 (sometimes called an address book or contact list);
  Telephone module 138;
  Video conference module 139;
  E-mail client module 140;
  Instant messaging (IM) module 141;
  Workout support module 142;
  Camera module 143 for still and/or video images;
  Image management module 144;
  Video player module;
  Music player module;
  Browser module 147;
  Calendar module 148;
  Widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
  Widget creator module 150 for making user-created widgets 149-6;
  Search module 151;
  Video and music player module 152, which merges video player module and music player module;
  Notes module 153;
  Map module 154; and/or
  Online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference module 139, e-mail 140, or IM 141; and so forth.

In conjunction with RF circuitry 108, audio circuitry 110, speaker 111, microphone 113, touch screen 112, display controller 156, contact/motion module 130, graphics module 132, and text input module 134, telephone module 138 are optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MIMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XIVIPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs, procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
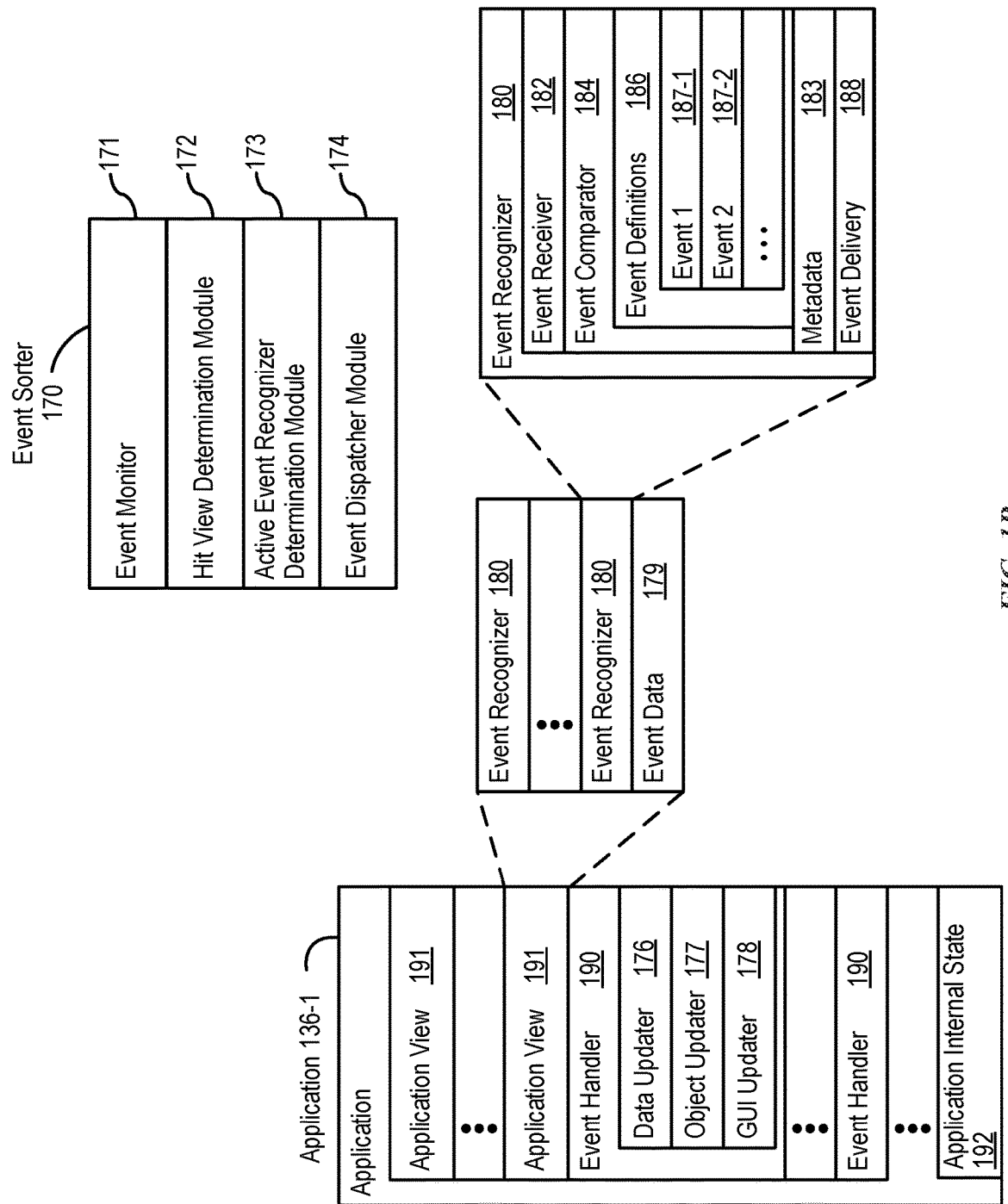
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (187) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
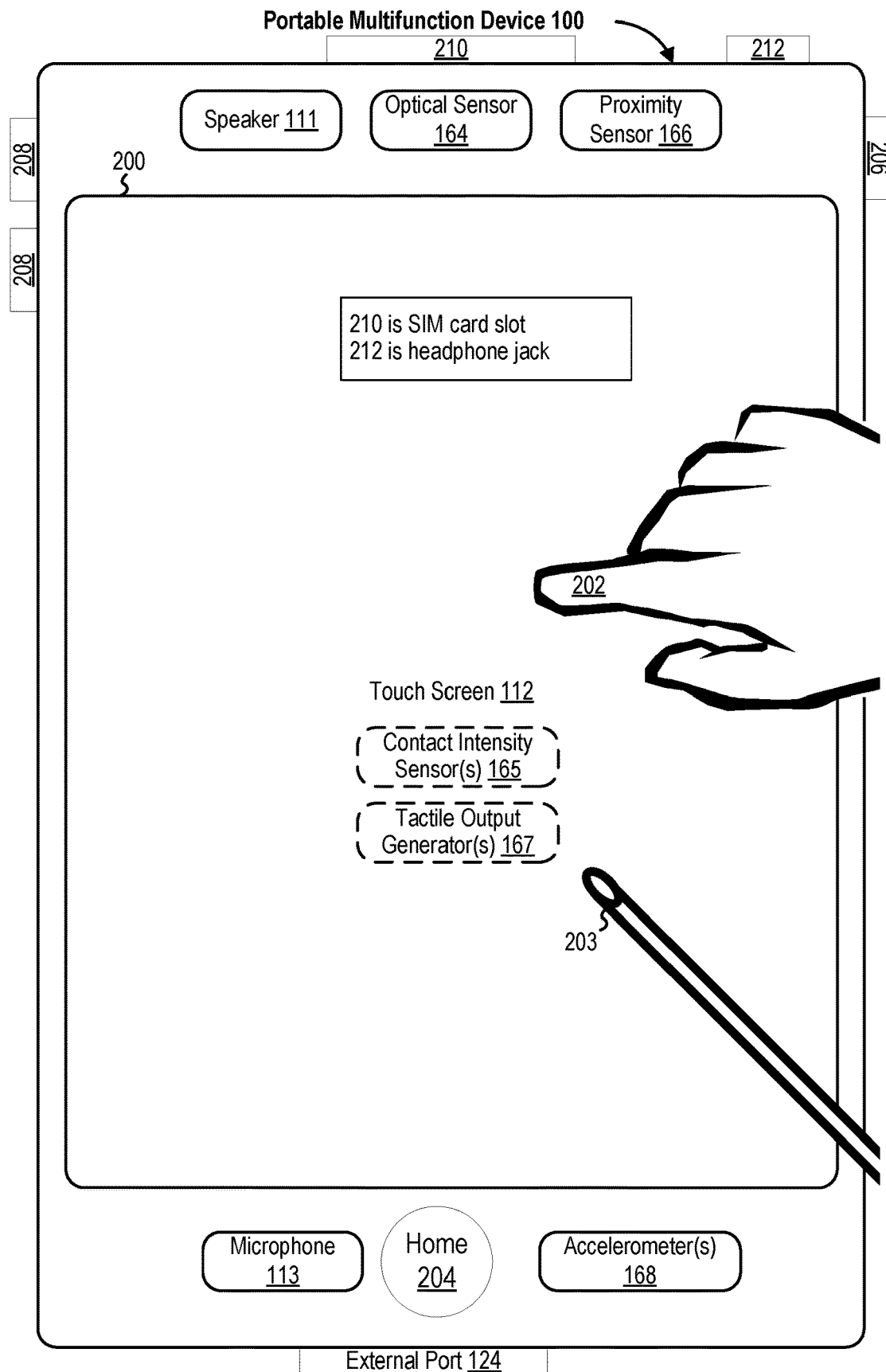
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also include one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on touch screen 112.

In some embodiments, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 is, optionally, stored in one or more of the previously mentioned memory devices. Each of the above-identified modules corresponds to a set of instructions for performing a function described above. The above-identified modules or programs (e.g., sets of instructions) need not be implemented as separate software programs, procedures, or modules, and thus various subsets of these modules are, optionally, combined or otherwise rearranged in various embodiments. In some embodiments, memory 370 optionally stores a subset of the modules and data structures identified above. Furthermore, memory 370 optionally stores additional modules and data structures not described above.

Attention is now directed towards embodiments of user interfaces that are, optionally, implemented on, for example, portable multifunction device 100.

Figure 4A:
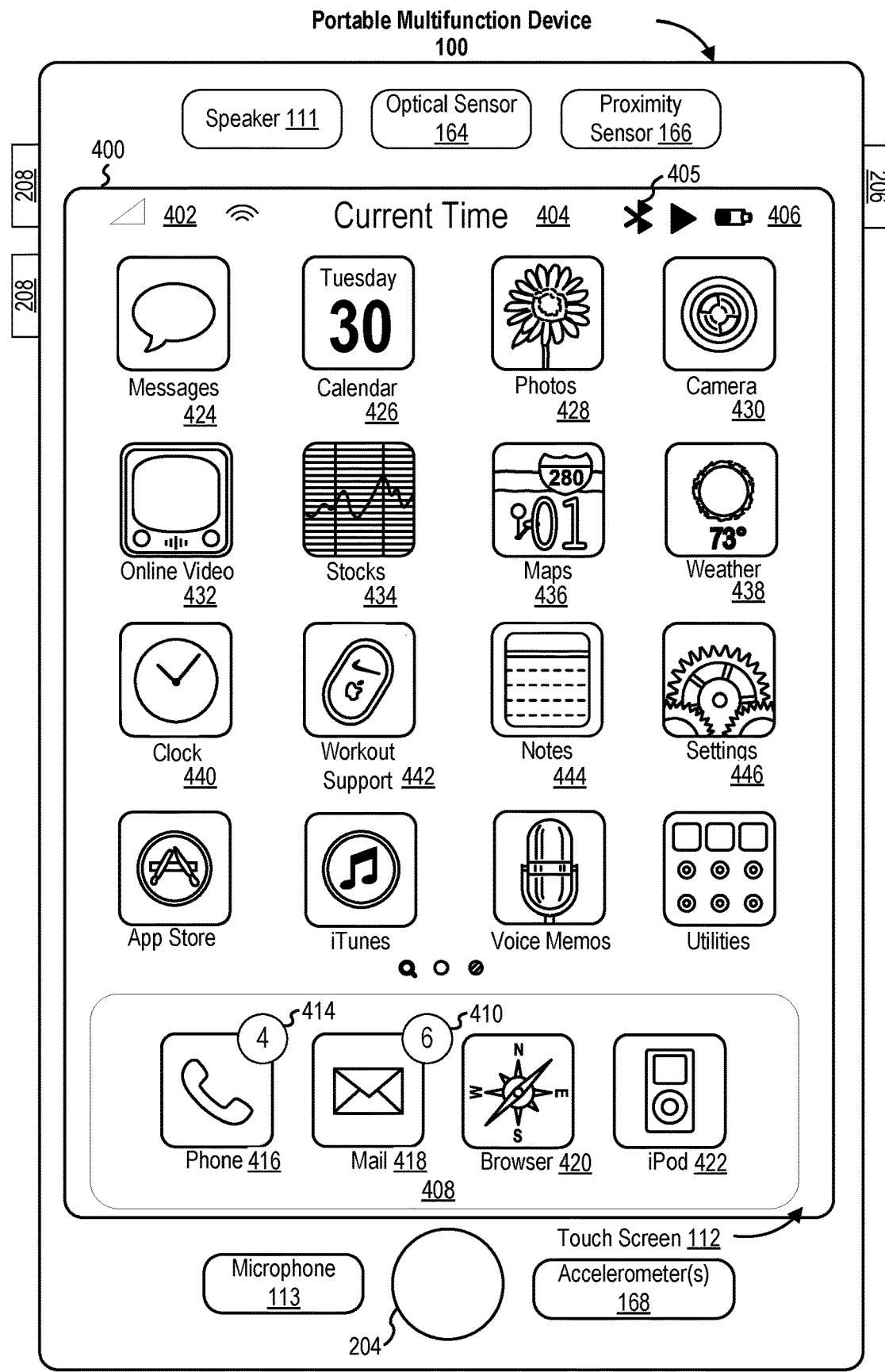
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) 402 for wireless communication(s), such as cellular and Wi-Fi signals;
Time 404;
Bluetooth indicator 405;
Battery status indicator 406;
Tray 408 with icons for frequently used applications, such as:
  Icon 416 for telephone module 138, labeled "Phone," which optionally includes an indicator 414 of the number of missed calls or voicemail messages;
  Icon 418 for e-mail client module 140, labeled "Mail," which optionally includes an indicator 410 of the number of unread e-mails;
  Icon 420 for browser module 147, labeled "Browser;" and
  Icon 422 for video and music player module 152, also referred to as iPod (trademark of Apple Inc.) module 152, labeled "iPod;" and
Icons for other applications, such as:
  Icon 424 for IM module 141, labeled "Messages;"
  Icon 426 for calendar module 148, labeled "Calendar;"
  Icon 428 for image management module 144, labeled "Photos;"
  Icon 430 for camera module 143, labeled "Camera;"
  Icon 432 for online video module 155, labeled "Online Video;"
  Icon 434 for stocks widget 149-2, labeled "Stocks;"
  Icon 436 for map module 154, labeled "Maps;"
  Icon 438 for weather widget 149-1, labeled "Weather;"
  Icon 440 for alarm clock widget 149-4, labeled "Clock;"
  Icon 442 for workout support module 142, labeled "Workout Support;"
  Icon 444 for notes module 153, labeled "Notes;" and
  Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 359) for detecting intensity of contacts on touch-sensitive surface 451 and/or one or more tactile output generators 357 for generating tactile outputs for a user of device 300.

Although some of the examples that follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
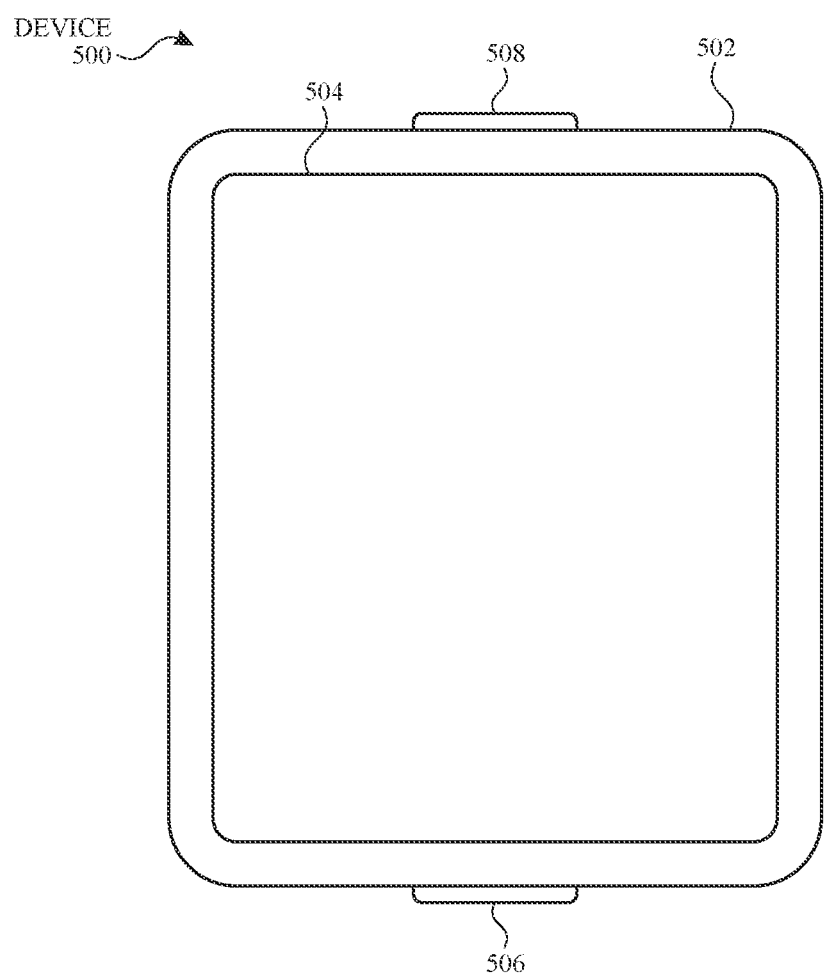
FIG. 5A illustrates a personal electronic device in accordance with some embodiments.

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch-sensitive display screen 504, hereafter touch screen 504. Alternatively, or in addition to touch screen 504, device 500 has a display and a touch-sensitive surface. As with devices 100 and 300, in some embodiments, touch screen 504 (or the touch-sensitive surface) optionally includes one or more intensity sensors for detecting intensity of contacts (e.g., touches) being applied. The one or more intensity sensors of touch screen 504 (or the touch-sensitive surface) can provide output data that represents the intensity of touches. The user interface of device 500 can respond to touches based on their intensity, meaning that touches of different intensities can invoke different user interface operations on device 500.

Exemplary techniques for detecting and processing touch intensity are found, for example, in related applications: International Patent Application Serial No. PCT/US2013/040061, titled "Device, Method, and Graphical User Interface for Displaying User Interface Objects Corresponding to an Application," filed May 8, 2013, published as WIPO Publication No. WO/2013/169849, and International Patent Application Serial No. PCT/US2013/069483, titled "Device, Method, and Graphical User Interface for Transitioning Between Touch Input to Display Output Relationships," filed Nov. 11, 2013, published as WIPO Publication No. WO/2014/105276, each of which is hereby incorporated by reference in their entirety.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms permit device 500 to be worn by a user.

Figure 5B:
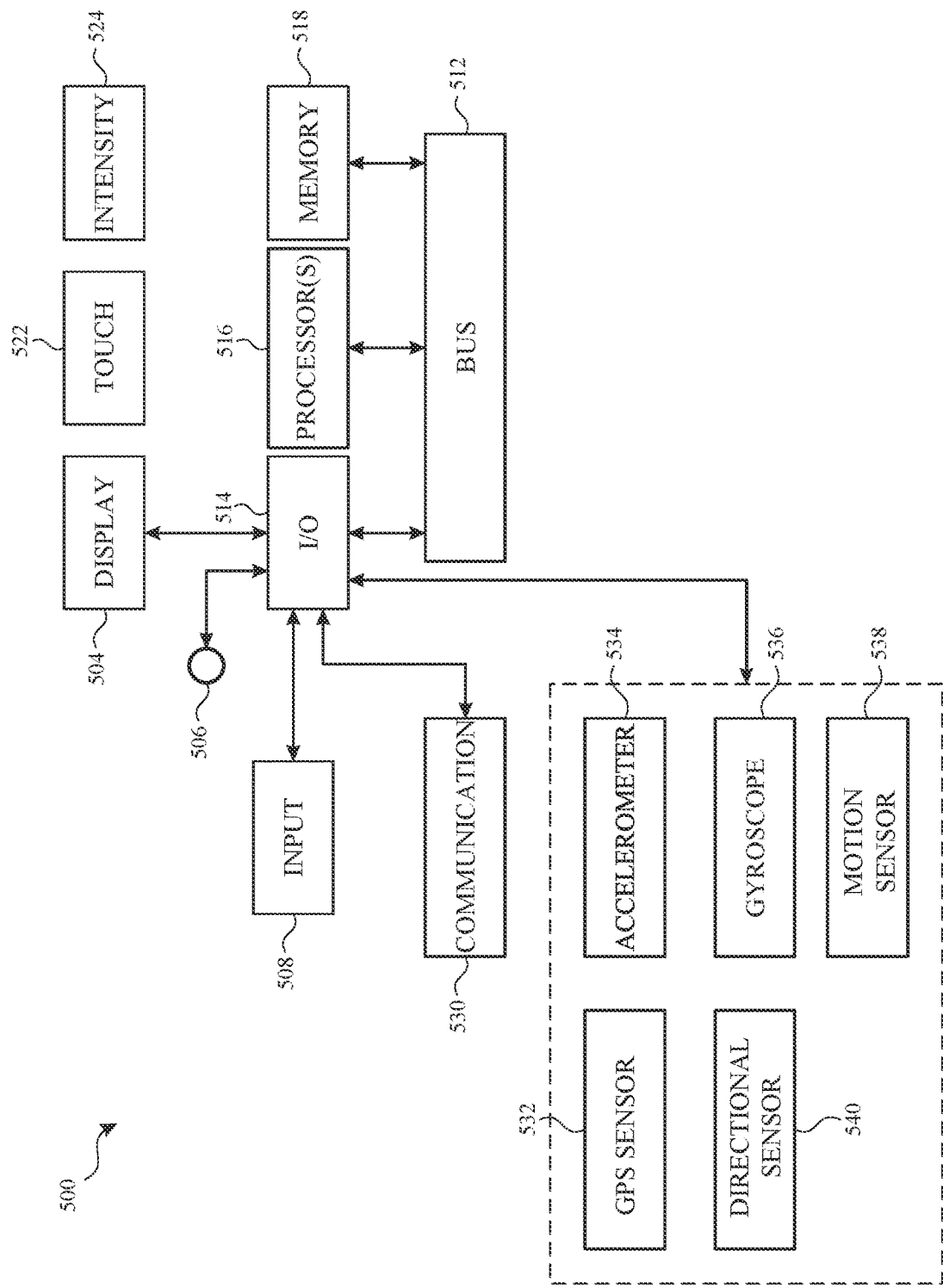
FIG. 5B is a block diagram illustrating a personal electronic device in accordance with some embodiments.

FIG. 5B depicts exemplary personal electronic device 500. In some embodiments, device 500 can include some or all of the components described with respect to FIGS. 1A, 1B, and 3. Device 500 has bus 512 that operatively couples I/O section 514 with one or more computer processors 516 and memory 518. I/O section 514 can be connected to display 504, which can have touch-sensitive component 522 and, optionally, intensity sensor 524 (e.g., contact intensity sensor). In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 is, optionally, a rotatable input device or a depressible and rotatable input device, for example. Input mechanism 508 is, optionally, a button, in some examples.

Input mechanism 508 is, optionally, a microphone, in some examples. Personal electronic device 500 optionally includes various sensors, such as GPS sensor 532, accelerometer 534, directional sensor 540 (e.g., compass), gyroscope 536, motion sensor 538, and/or a combination thereof, all of which can be operatively connected to I/O section 514.

Memory 518 of personal electronic device 500 can include one or more non-transitory computer-readable storage mediums, for storing computer-executable instructions, which, when executed by one or more computer processors 516, for example, can cause the computer processors to perform the techniques described below, including processes 700 and 1000 (FIGS. 7A-7B and 10). A computer-readable storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. 5B, but can include other or additional components in multiple configurations.

As used here, the term "affordance" refers to a user-interactive graphical user interface object that is, optionally, displayed on the display screen of devices 100, 300, and/or 500 (FIGS. 1A, 3, and 5A-5B). For example, an image (e.g., icon), a button, and text (e.g., hyperlink) each optionally constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider, or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation), rather than being used to determine whether to perform a first operation or a second operation.

Figure 5D:
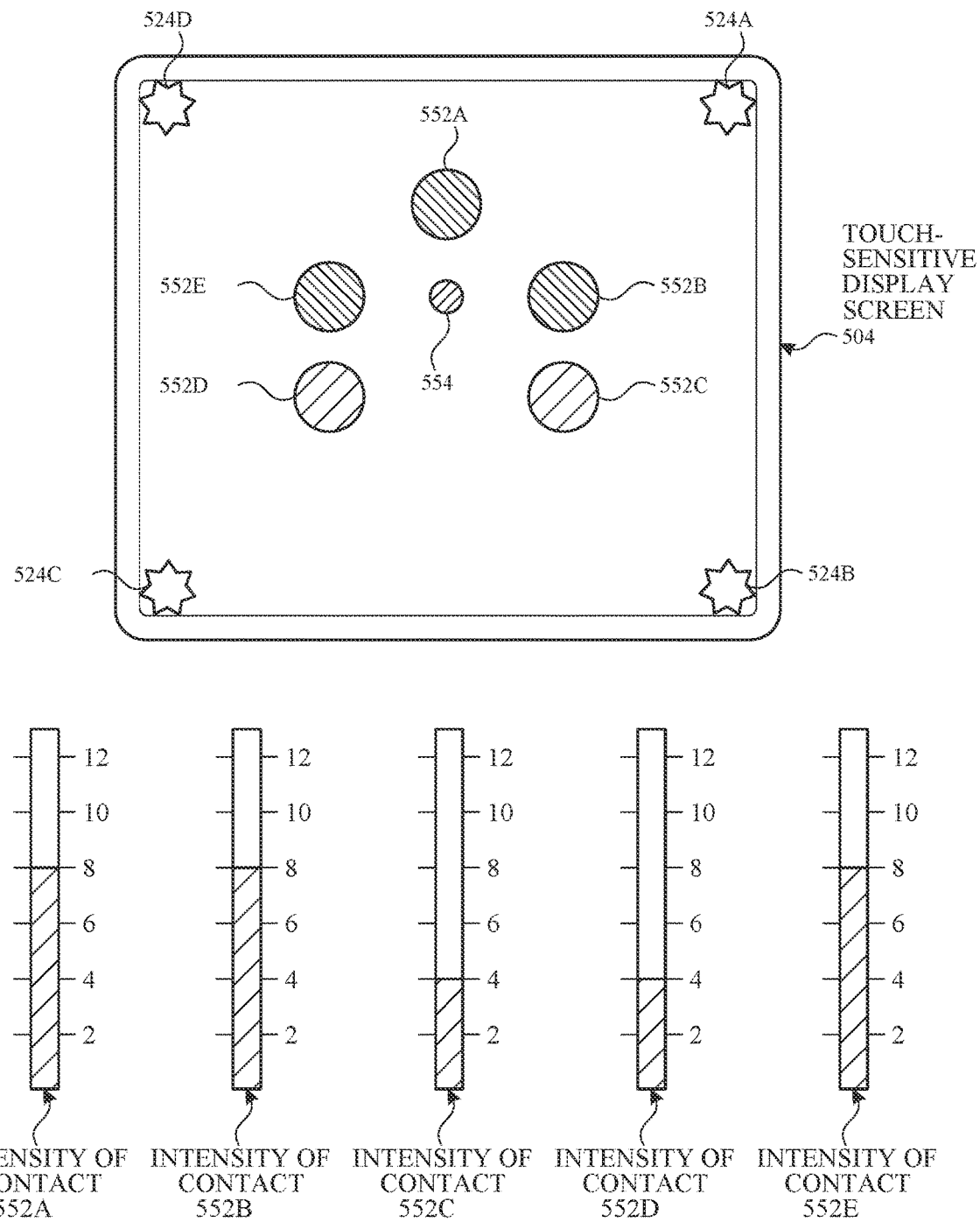

FIG. 5C illustrates detecting a plurality of contacts 552A-552E on touch-sensitive display screen 504 with a plurality of intensity sensors 524A-524D. FIG. 5C additionally includes intensity diagrams that show the current intensity measurements of the intensity sensors 524A-524D relative to units of intensity. In this example, the intensity measurements of intensity sensors 524A and 524D are each 9 units of intensity, and the intensity measurements of intensity sensors 524B and 524C are each 7 units of intensity. In some implementations, an aggregate intensity is the sum of the intensity measurements of the plurality of intensity sensors 524A-524D, which in this example is 32 intensity units. In some embodiments, each contact is assigned a respective intensity that is a portion of the aggregate intensity. FIG. 5D illustrates assigning the aggregate intensity to contacts 552A-552E based on their distance from the center of force 554. In this example, each of contacts 552A, 552B, and 552E are assigned an intensity of contact of 8 intensity units of the aggregate intensity, and each of contacts 552C and 552D are assigned an intensity of contact of 4 intensity units of the aggregate intensity. More generally, in some implementations, each contact j is assigned a respective intensity Ij that is a portion of the aggregate intensity, A, in accordance with a predefined mathematical function, $Ij = A \cdot (Dj/\Sigma Di)$, where Dj is the distance of the respective contact j to the center of force, and $\Sigma Di$ is the sum of the distances of all the respective contacts (e.g., i=1 to last) to the center of force. The operations described with reference to FIGS. 5C-5D can be performed using an electronic device similar or identical to device 100, 300, or 500. In some embodiments, a characteristic intensity of a contact is based on one or more intensities of the contact. In some embodiments, the intensity sensors are used to determine a single characteristic intensity (e.g., a single characteristic intensity of a single contact). It should be noted that the intensity diagrams are not part of a displayed user interface, but are included in FIGS. 5C-5D to aid the reader.

In some embodiments, a portion of a gesture is identified for purposes of determining a characteristic intensity. For example, a touch-sensitive surface optionally receives a continuous swipe contact transitioning from a start location and reaching an end location, at which point the intensity of the contact increases. In this example, the characteristic intensity of the contact at the end location is, optionally, based on only a portion of the continuous swipe contact, and not the entire swipe contact (e.g., only the portion of the swipe contact at the end location). In some embodiments, a smoothing algorithm is, optionally, applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The intensity of a contact on the touch-sensitive surface is, optionally, characterized relative to one or more intensity thresholds, such as a contact-detection intensity threshold, a light press intensity threshold, a deep press intensity threshold, and/or one or more other intensity thresholds. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

An increase of characteristic intensity of the contact from an intensity below the light press intensity threshold to an intensity between the light press intensity threshold and the deep press intensity threshold is sometimes referred to as a "light press" input. An increase of characteristic intensity of the contact from an intensity below the deep press intensity threshold to an intensity above the deep press intensity threshold is sometimes referred to as a "deep press" input. An increase of characteristic intensity of the contact from an intensity below the contact-detection intensity threshold to an intensity between the contact-detection intensity threshold and the light press intensity threshold is sometimes referred to as detecting the contact on the touch-surface. A decrease of characteristic intensity of the contact from an intensity above the contact-detection intensity threshold to an intensity below the contact-detection intensity threshold is sometimes referred to as detecting liftoff of the contact from the touch-surface. In some embodiments, the contact-detection intensity threshold is zero. In some embodiments, the contact-detection intensity threshold is greater than zero.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts)

above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

FIGS. 5E-5H illustrate detection of a gesture that includes a press input that corresponds to an increase in intensity of a contact 562 from an intensity below a light press intensity threshold (e.g., "$IT_L$") in FIG. 5E, to an intensity above a deep press intensity threshold (e.g., "$IT_D$") in FIG. 5H. The gesture performed with contact 562 is detected on touch-sensitive surface 560 while cursor 576 is displayed over application icon 572B corresponding to App 2, on a displayed user interface 570 that includes application icons 572A-572D displayed in predefined region 574. In some embodiments, the gesture is detected on touch-sensitive display 504. The intensity sensors detect the intensity of contacts on touch-sensitive surface 560. The device determines that the intensity of contact 562 peaked above the deep press intensity threshold (e.g., "$IT_D$"). Contact 562 is maintained on touch-sensitive surface 560. In response to the detection of the gesture, and in accordance with contact 562 having an intensity that goes above the deep press intensity threshold (e.g., "$IT_D$") during the gesture, reduced-scale representations 578A-578C (e.g., thumbnails) of recently opened documents for App 2 are displayed, as shown in FIGS. 5F-5H. In some embodiments, the intensity, which is compared to the one or more intensity thresholds, is the characteristic intensity of a contact. It should be noted that the intensity diagram for contact 562 is not part of a displayed user interface, but is included in FIGS. 5E-5H to aid the reader.

In some embodiments, the display of representations 578A-578C includes an animation. For example, representation 578A is initially displayed in proximity of application icon 572B, as shown in FIG. 5F. As the animation proceeds, representation 578A moves upward and representation 578B is displayed in proximity of application icon 572B, as shown in FIG. 5G. Then, representations 578A moves upward, 578B moves upward toward representation 578A, and representation 578C is displayed in proximity of application icon 572B, as shown in FIG. 5H. Representations 578A-578C form an array above icon 572B. In some embodiments, the animation progresses in accordance with an intensity of contact 562, as shown in FIGS. 5F-5G, where the representations 578A-578C appear and move upwards as the intensity of contact 562 increases toward the deep press intensity threshold (e.g., "$IT_D$"). In some embodiments, the intensity, on which the progress of the animation is based, is the characteristic intensity of the contact. The operations described with reference to FIGS. 5E-5H can be performed using an electronic device similar or identical to device 100, 300, or 500.

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the descriptions of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

As used herein, an "installed application" refers to a software application that has been downloaded onto an electronic device (e.g., devices 100, 300, and/or 500) and is ready to be launched (e.g., become opened) on the device. In some embodiments, a downloaded application becomes an installed application by way of an installation program that extracts program portions from a downloaded package and integrates the extracted portions with the operating system of the computer system.

As used herein, the terms "open application" or "executing application" refer to a software application with retained state information (e.g., as part of device/global internal state 157 and/or application internal state 192). An open or executing application is, optionally, any one of the following types of applications:

- an active application, which is currently displayed on a display screen of the device that the application is being used on;
- a background application (or background processes), which is not currently displayed, but one or more processes for the application are being processed by one or more processors; and
- a suspended or hibernated application, which is not running, but has state information that is stored in memory (volatile and non-volatile, respectively) and that can be used to resume execution of the application.

As used herein, the term "closed application" refers to software applications without retained state information (e.g., state information for closed applications is not stored in a memory of the device). Accordingly, closing an application includes stopping and/or removing application processes for the application and removing state information for the application from the memory of the device. Generally, opening a second application while in a first application does not close the first application. When the second application is displayed and the first application ceases to be displayed, the first application becomes a background application.

Attention is now directed towards embodiments of user interfaces ("UI") and associated processes that are implemented on an electronic device, such as portable multifunction device 100, device 300, or device 500.

Figure 6A:
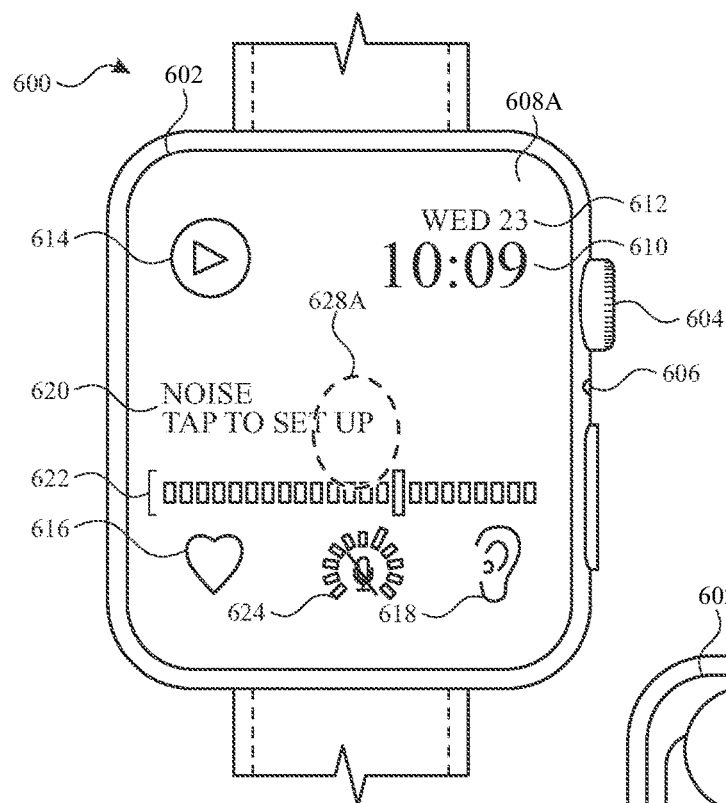
FIGS. 6A-6AL illustrate user interfaces for monitoring noise exposure levels in accordance with some embodiments.
Figure 7A:
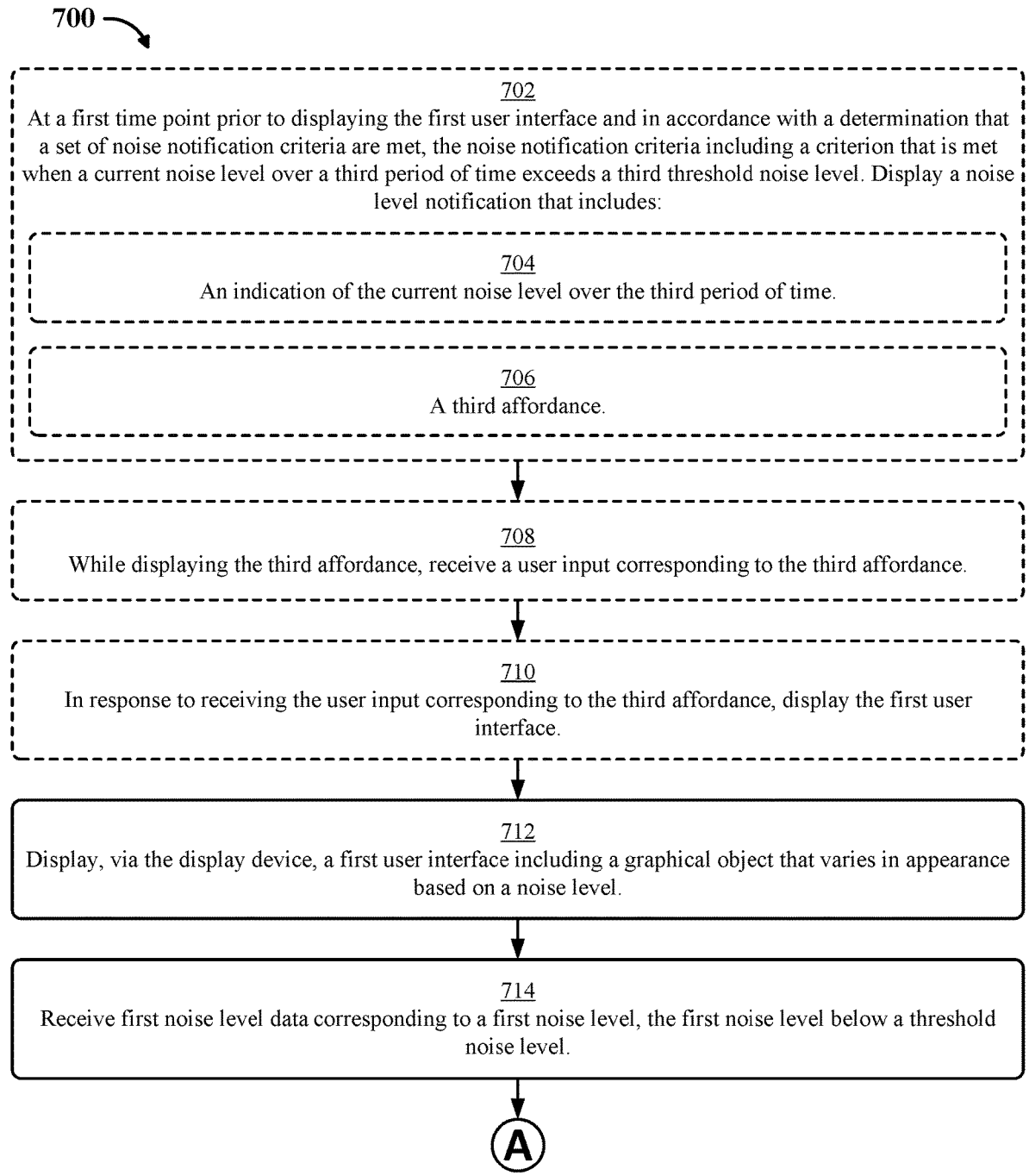
FIGS. 7A-7B are a flow diagram illustrating a method for monitoring noise exposure levels using an electronic device, in accordance with some embodiments.
Figure 7B:
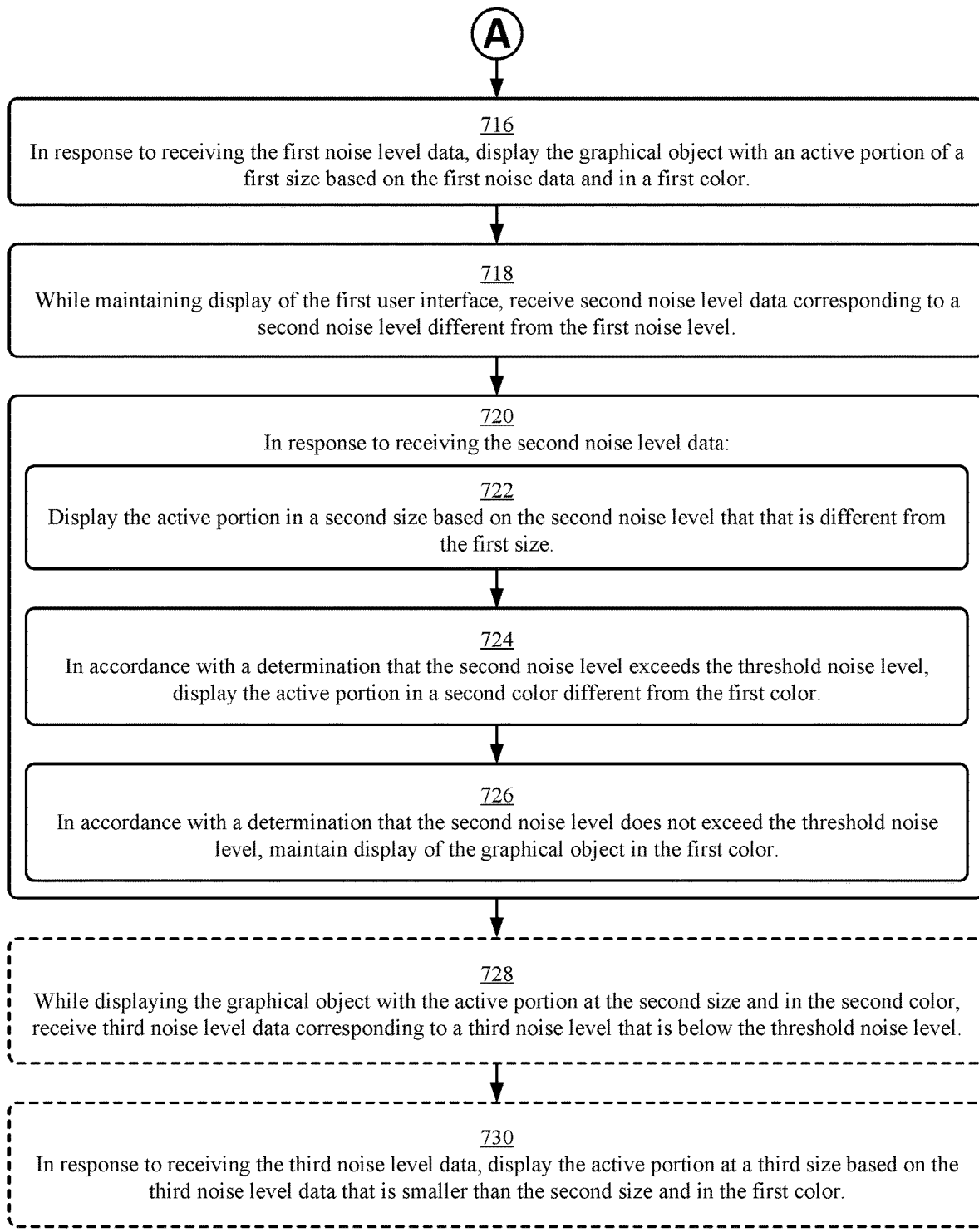

FIGS. 6A-6AL illustrate exemplary user interfaces for monitoring sound exposure levels, in accordance with some embodiments. The user interfaces in these figures are used to illustrate the processes described below, including the processes in FIGS. 7A-7D.

As depicted in FIG. 6A, device 600 includes display 602 (e.g., a display device) and rotatable and depressible input mechanism 604 (e.g., rotatable and depressible in relation to a housing or frame of the device), and microphone 606. In some embodiments, device 600 is a wearable electronic device, such as smartwatch. In some embodiments, device 600 includes one or more features of devices 100, 300, or 500.

As depicted in FIG. 6A, clock user interface 608A includes digital indication of time 610 (e.g., a representation of digital clock displaying current hour, and minute values), and multiple affordances, each affordance associated with an application stored on device 600. Date affordance 612 indicates a current date and launches a calendar application upon selection. Remote affordance 614 launches a remote control application upon selection (e.g., an application to control devices external to device 600). Heart rate affordance 616 launches a heart rate monitoring application upon selection.

As depicted in FIG. 6A, clock user interface 608A (e.g., a clock face interface) also includes multiple noise application affordances that upon selection, launch a noise monitoring application (e.g., noise icon 618, noise status affordance 620, noise meter affordance 622, and compact noise affordance 624). As depicted in FIG. 6A, the noise application on device 600 has not been installed or initialized (e.g., enabled), as a result, noise status affordance 620, noise meter affordance 622, and compact noise affordance 624 do not indicate (e.g., display) any noise data from the noise application. Instead, for example, device 600 displays, noise status affordance 620 as a setup prompt (e.g., "tap to set up"), indicating that the noise application needs to be initialized.

Figure 6B:
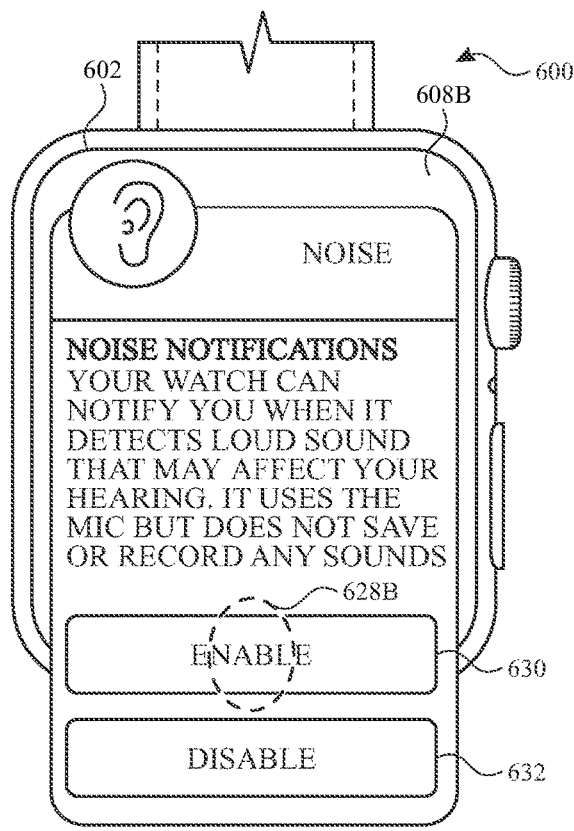

FIG. 6A depicts device 600 receiving user input 628A (e.g., a tap) on noise status affordance 620. In response to receiving user input 628A, device 600 displays the user interface 608B, as depicted in FIG. 6B. User interface 608B includes a description of the functionality of the noise application, enable affordance 630 for enabling (e.g., initializing the noise application), and disable affordance 632 for disabling (e.g., maintaining the uninitialized state of the noise application). FIG. 6B depicts device 600 receiving user input 628B (e.g., a tap) on enable affordance 630. In response to receiving user input 628B, device 600 displays user interface 608C (e.g., an interface associated with the noise application), as depicted in FIG. 6C.

Figure 6C:
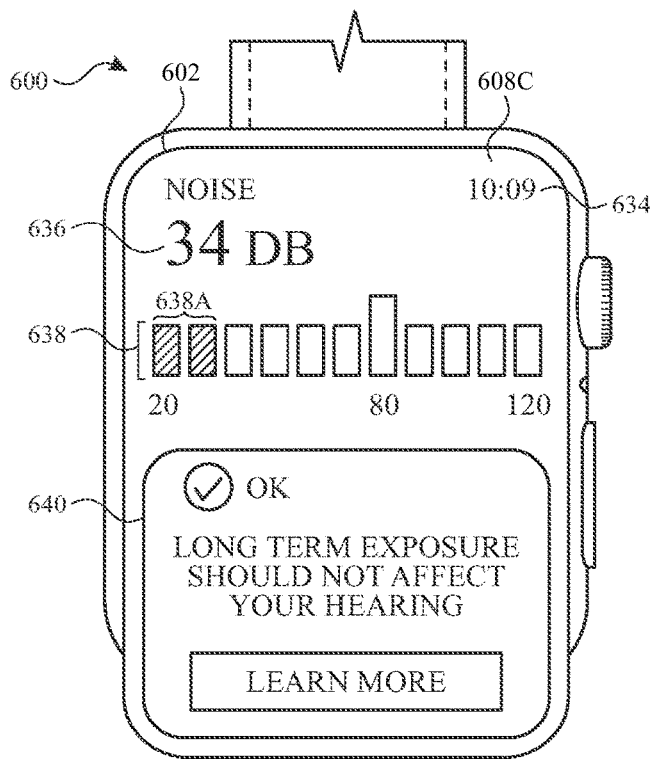

As depicted in FIGS. 6C (and 6D-6G), user interface 608C includes indication of time 634 (e.g., indicating a current time of 10:09), noise level indicator 636, noise meter indicator 638, and noise status indicator 640. Noise level indicator 636 provides a numeric indication (e.g., 34 DB) of a first noise level value (e.g., measured by or determined by device 600 from noise data derived from microphone 606). Noise status indicator 640, provides a non-numeric indication (e.g., an indication including graphics and/or text) of the first noise level value (e.g., measured by or determined by device 600 from noise data derived from microphone 606) relative to a first level threshold (e.g., a predetermined 80 DB threshold). In some embodiments, the first noise level threshold is user-configurable. In some embodiments, the device identifies a noise level based on noise data detected by a sensor (e.g., microphone) of the electronic device (e.g., the first noise level represents a noise level of the physical environment where the device is located).

Noise meter indicator 636 provides a graphical indication of a second noise level (e.g., measured by device 600 via microphone 606). In some embodiments, the second noise level and the first noise are the same noise level. In some embodiments, the first noise level and the second noise level are determined based on common noise data sampled at different time periods and/or rates (e.g., 1-second and 0.1-seconds, respectively). Noise meter indicator 638 includes active portion 638A (e.g., a visually emphasized portion) that varies in size and/or color according to a second noise level. As illustrate by the following figures, the size of active portion 638A increases as a noise level increases and the color of the active portion 638A changes relative to a second threshold level. In some embodiments, size includes a number of visually emphasized segments, a relative area occupied by a set of visually emphasized segments, or a position of the right-most edge of a set of visually emphasized segments relative to a scale. In some embodiments, each emphasized segment in active portion 638A represents a predetermined number of decibels (e.g., 10 DB). In some embodiments, the first threshold level and the second threshold level are the same level (e.g., 80 DB).

The noise levels (e.g., values, amplitudes) indicated by the appearance of noise level indicator 636, noise meter indicator 638, and noise status indicator 640 (e.g., as described below), are updated in response to device 600 determining one or more noise levels based on received noise data (e.g., the indications update as ambient noise levels are continuously determined or measured by device 600). In some embodiments, noise levels are measured or detected by a device external to device 600 (e.g., device 600 receives data representing a current noise level from a remote device communicatively coupled with device 600).

FIG. 6C depicts the state of user interface 608C while device 600 is in an environment with a consistent noise level of 34 DB at a time of 10:09 (e.g. device 600 is located in a low noise environment such as a computer lab). Accordingly, as depicted in FIG. 6C, noise level indicator 636 includes a "34 DB" value and noise status indicator 640 includes a non-cautionary prompt (e.g., a check mark graphic, "OK," and a descriptive prompt indicating relatively low risk associated with exposure at the level indicated by noise level indicator 636) indicating that the noise level is below a threshold level (e.g., 80 DB). Likewise, as depicted in FIG. 6C, noise meter indicator 638 provides a graphical indication of a low, consistent noise level by displaying active portion 638A in a size corresponding to two green segments (e.g., green as represented by diagonal hatching).

Figure 6D:
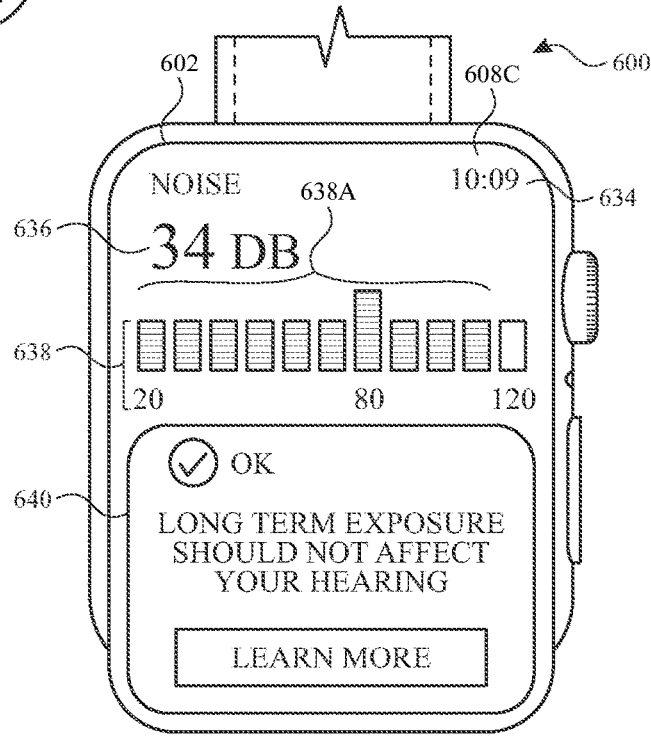

FIG. 6D depicts the state of user interface 608C in response to a sudden increase (e.g., within 200 millisecond of a spike) in ambient noise (e.g., a fire alarm goes off inside of the computer lab). As depicted in FIG. 6D, the size of active portion 638A of noise meter indicator 638 has increased from 2-segments to 10-segments and the color transitioned from green to yellow (e.g. yellow represented by horizontal hatching). In contrast, noise level indicator 636 and noise status indicator 640 maintain the their previous appearance (e.g., as depicted in FIG. 6C).

As described above, the appearance of noise level indicator 636 and noise status indicator 640 vary with a first noise level (e.g., a noise level based on a longer 1-second period of noise level data) and the appearance of noise meter indicator 638 varies based on a second noise level (e.g., a noise level based on a shorter 0.1-second period of noise level data). Consequently, the graphical meter changes more quickly (e.g., instantaneously) than noise level indicator 636 (and noise status indicator 640) in response to sudden changes in ambient noise level. This lagging effect is illustrated by the difference between the noise levels represented by noise level indicator 636 and noise status indicator 640 and noise meter 638. In some embodiments, the slower update makes it easier to for a user to decipher (e.g., read) a displayed noise level, while the faster update behavior of graphical meter 638 provides the user with more timely (e.g., responsive) visual feedback.

Figure 6E:
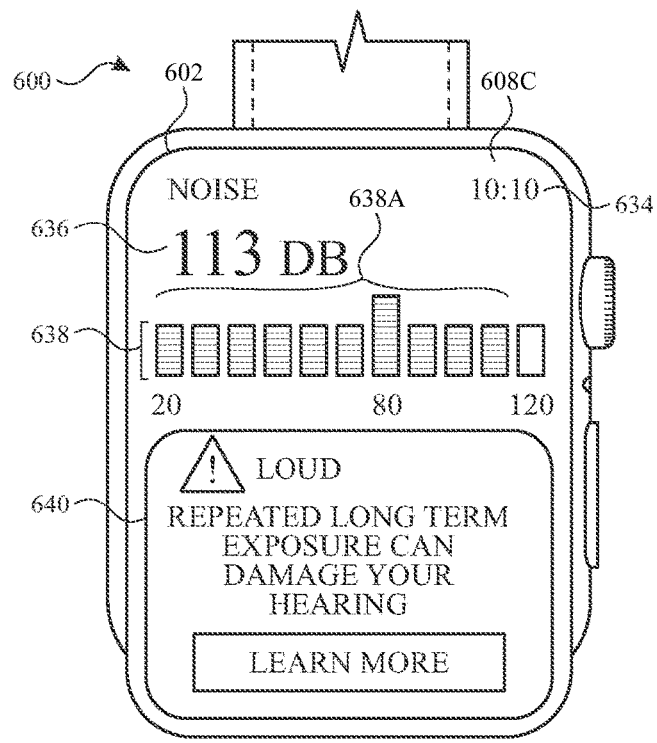

FIG. 6E depicts the state of user interface 608C after an elevated noise level has been sustained (e.g., a fire alarm continues to sound for a 1-minute). As depicted in FIG. 6E, the size and color of active portion 638A of noise meter indicator 638 remains unchanged (e.g., compared to the depiction in FIG. 6D). However, noise level indicator 636 and noise status indicator 640 have been updated to reflect the sustained elevated ambient noise level (e.g., noise level indicator 636 indicates a 113 DB level and noise status indicator 640 includes a cautionary (e.g., "LOUD") prompt indicating a noise level above an 80 DB threshold).

Figure 6F:
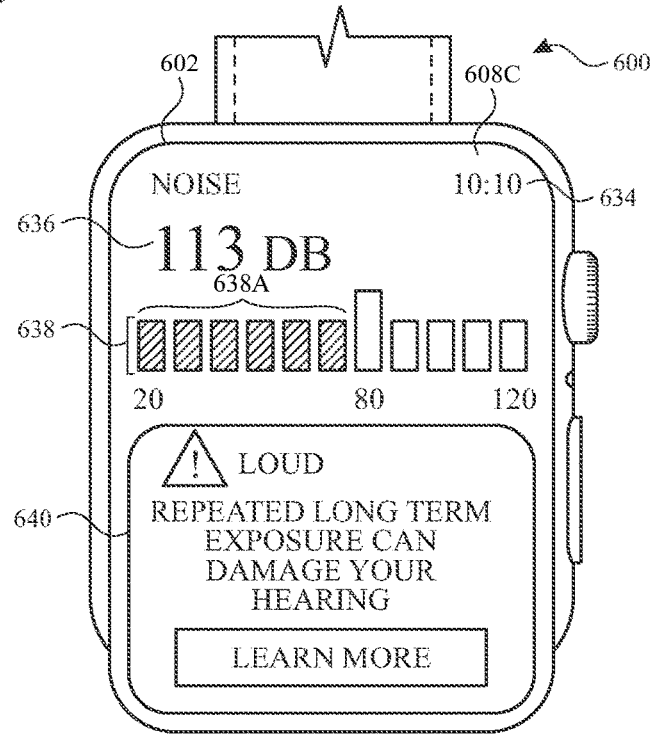

FIG. 6F depicts the state of user interface 608C in response to a sudden decrease in ambient noise level (e.g., a fire alarm abruptly stops). As depicted in FIG. 6F, the size of active portion 638A of noise meter indicator 638 has decrease from 10-segments to 6-segments and the color changed from yellow to green (e.g. green represented by diagonal hatching). In contrast, noise level indicator 636 and noise status indicator 640 maintain the their previous appearance (e.g., as depicted in FIG. 6E).

Figure 6G:
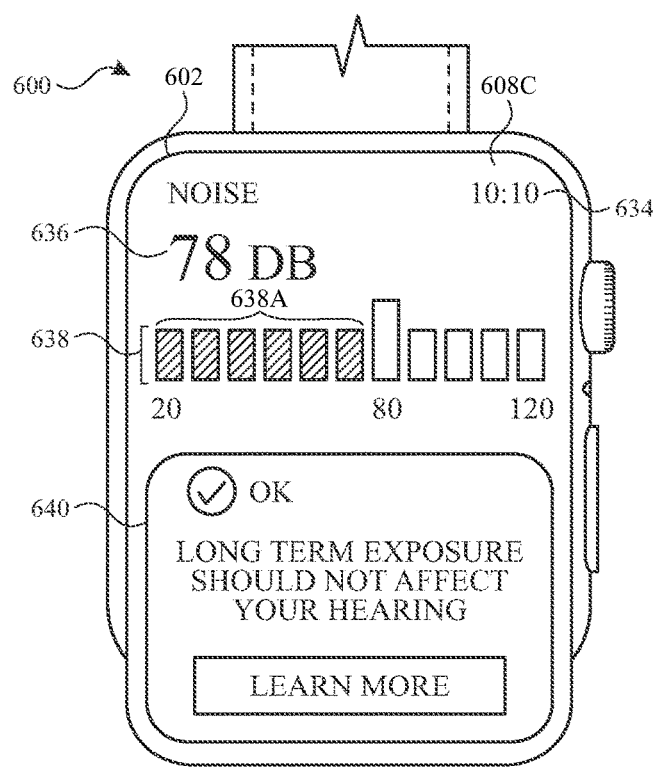

FIG. 6G depicts the state of user interface 608C after the reduced noise level has been sustained (e.g., for a period longer that 1-second). As depicted in FIG. 6G, the size and color of active portion 638A of noise meter indicator 638 remains unchanged (e.g., compared to the depiction in FIG. 6F). However, the noise level indicator 636 and noise status indicator 640 have been updated to reflect the reduced ambient noise level (e.g., noise level indicator 636 indicates a 78 DB level and noise status indicator 640 includes a non-cautionary prompt (e.g., "OK") indicating a noise level below an 80 DB threshold.

Figure 6H:
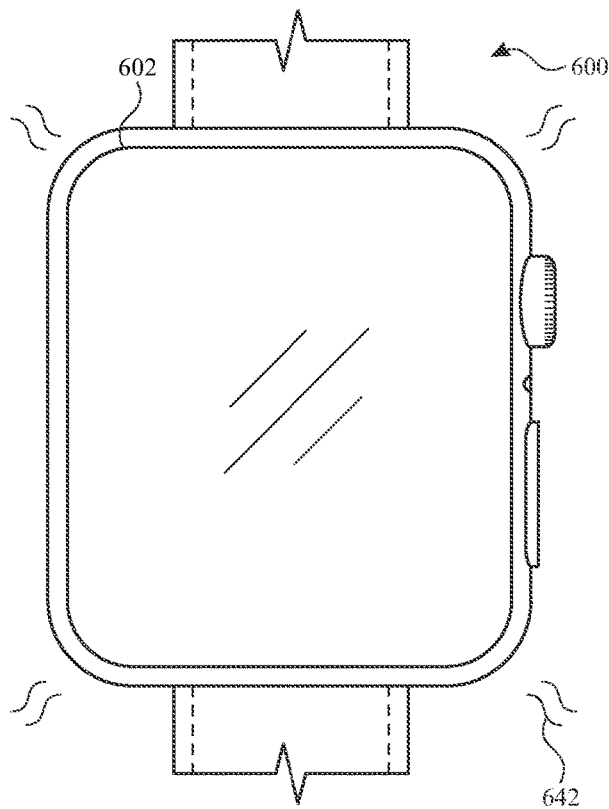

In response to a determination that a noise level exceeds a notification level threshold (e.g., 80 DB, 85 DB, 90 DB, etc.) for a period of time (e.g., 3-minutes), device 600 emits haptic alert 642 as depicted in FIG. 6H. In some embodiments, noise data used to determine a noise level value is sampled at a first rate while device 600 displays graphical noise meter indicator 620 (e.g., FIG. 6C-6E) and noise meter affordance 622 (e.g., FIGS. 6K-6N) and is sampled at a second rate (e.g., a lower sampling rate, 20% lower), while device 600 is not displaying graphical noise meter indicator 638 or noise meter affordance 622 (e.g., FIG. 6H).

Figure 6I:
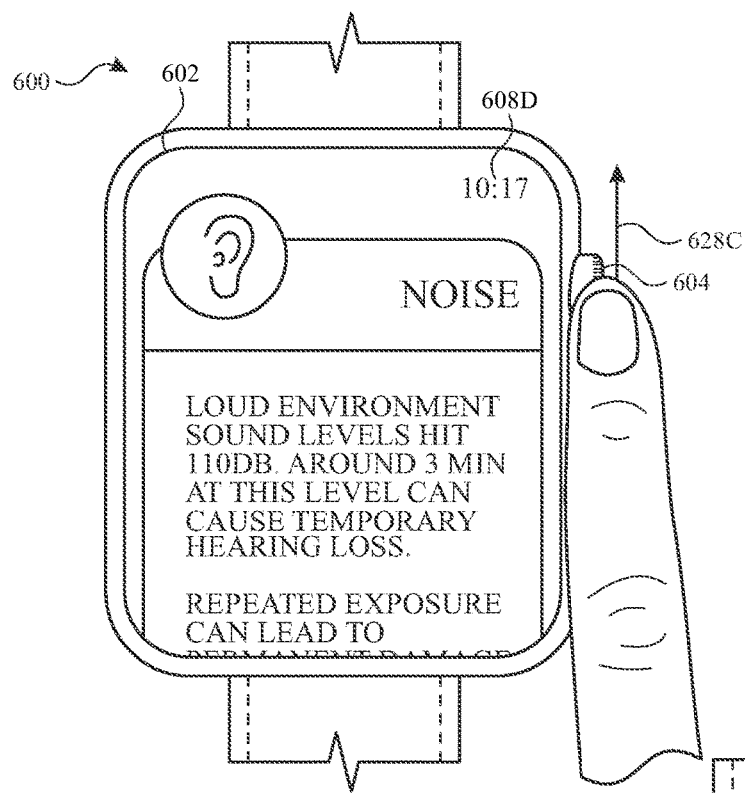
Figure 6J:
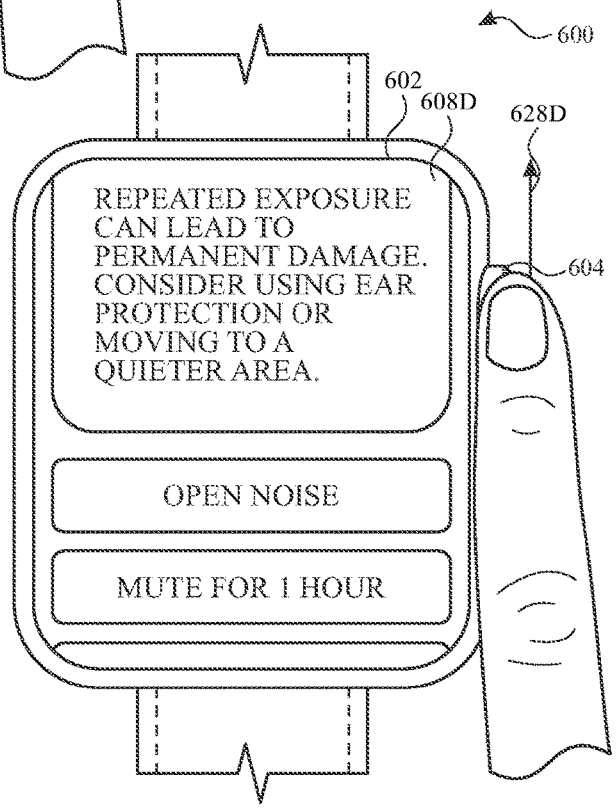

Subsequent to outputting haptic alert 642, device 600 displays the noise notification user interface 608D of FIG. 6I (e.g., a warning notification). As depicted in FIG. 6I, noise notification user interface 608D includes an explanation of the notification triggering condition (e.g., "110 DB around 3 MIN") and the associated hearing loss risk. FIGS. 6I and 6J depict device 600 receiving user inputs 628C and 628D (e.g., scroll inputs) at rotatable and depressible mechanism 604. In response to receiving the user inputs, device 600 displays additional portions of noise notification user interface 608D.

Figure 6K:
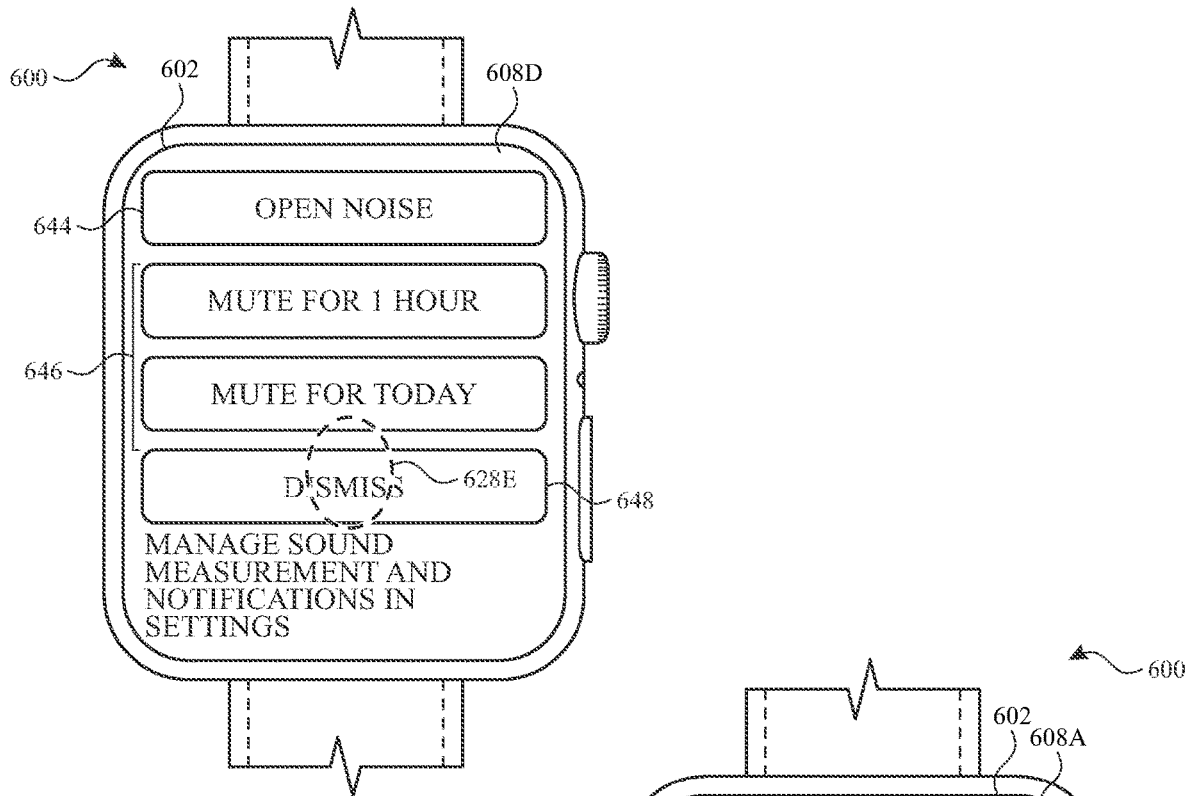

As depicted in FIG. 6K, noise notification user interface 608D includes noise app affordance 644 for launching the noise application, multiple mute affordances 646 for suppressing display of subsequent noise notifications (e.g., display of user interface 608D) for a specified time periods (e.g., 1-hour and the remainder of the day), and dismiss affordance 648. FIG. 6K depicts device 600 receiving user input 628E (e.g., tap) corresponding to dismiss affordance 648. In response to receiving user input 628E, device 600 displays (e.g., re-displays) clock user interface 608A. In some embodiments, selection of dismiss affordance 648 causes device 600 to suppress (e.g., to forgo displaying notification user interface 608D despite a notification triggering condition being detected by device 600) subsequent notifications for a predetermined auto-suppression period (e.g., 30 minutes). In some embodiments, notification user interface 608D includes a graphical indication of a noise exposure level (e.g. noise meter indicator 638).

Figure 6L:
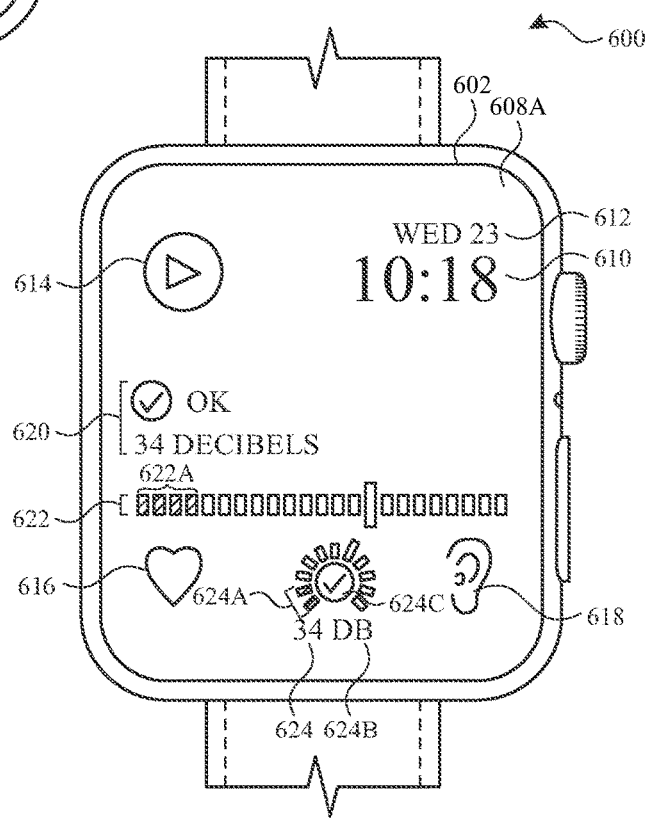

As depicted in FIG. 6L, noise status affordance 620, noise meter affordance 622, and compact noise affordance 624 now display noise level data associated with the noise application (e.g., since the noise application was initialized via user input 628B). The appearance of noise status affordance 620, noise meter affordance 622, and compact noise affordance 624, mirror the functionality provided by noise level indicator 636, noise meter indicator 638, and noise status indicator 640 (e.g., as described below with reference to FIGS. 6C-6G).

FIG. 6L depicts the state of clock user interface 608A while device 600 is in an environment with a consistent noise level of 34 DB at 10:18 (e.g. device 600 is located in a low noise environment such as a library). Accordingly, as depicted in FIG. 6L, noise status affordance 620 includes a "34 DECIBELS" value and a non-cautionary prompt (e.g., a check mark graphic and "OK") indicating that the noise level is below a threshold level (e.g., 80 DB). As depicted in FIG. 6L, noise meter affordance 622 provides a graphical indication of low noise level by displaying active portion 622A in a size corresponding to 4 segments (out of 23 segments) in a green (e.g., green as represented by diagonal hatching). Like active portion 638A of noise meter indicator 638, the size of active portion 622A is proportional to noise level and the color (e.g., green) indicates a noise level relative to a threshold level (e.g., green below and yellow above).

As depicted in FIG. 6L, compact noise affordance 624 displays a combination of the information represented by noise meter affordance 622 and noise status affordance 620. In particular, as depicted in FIG. 6L, compact noise affordance includes a graphical indication of a low noise level by displaying active portion 624A in a size corresponding to 2 segments (out of 11 segments) in green (e.g., green as represented by diagonal hatching), numeric portion 624B includes value (e.g., 34 DB) and graphic portion 624C includes a non-cautionary graphic (e.g., a check mark graphic) corresponding to the values indicate by noise status affordance 620.

Figure 6M:
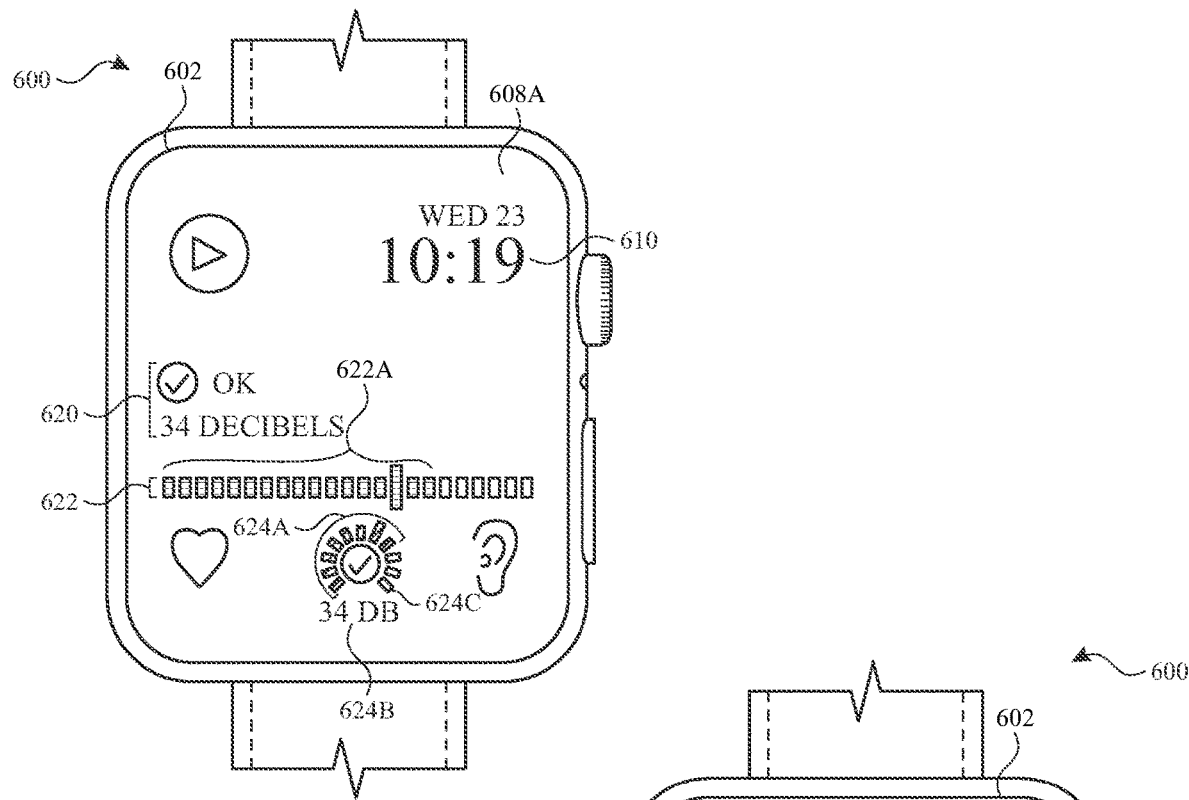

FIG. 6M depicts the state of user interface 608A in response to a sudden increase (e.g., a spike) in ambient noise at a time of 10:19. As depicted in FIG. 6M, the size of active portion 622A of noise meter affordance 622 has increased from 4-segments to 17-segments and the color of active portion 622A transitions from green to yellow (e.g. yellow represented by horizontal hatching). Similarly, as depicted in FIG. 6M, the size of active portion 624A of compact noise affordance 624 has increased from 2-segments to 8-segments and the color changed from green to yellow. In contrast, noise level status affordance 620, numeric portion 624B, and graphic portion 624C have maintained their previous appearance (e.g., as depicted in FIG. 6L).

Figure 6N:
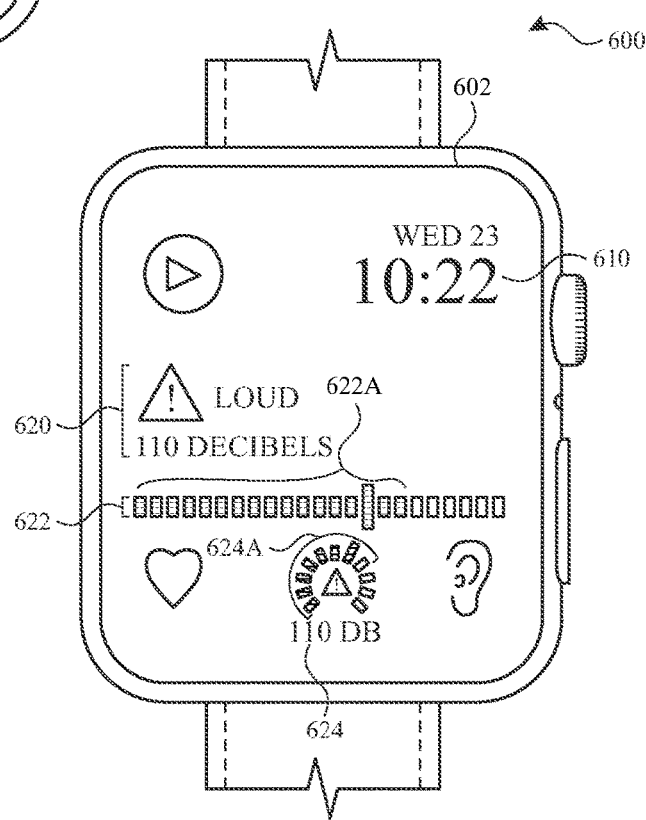

FIG. 6N depicts the state of user interface 608A after an elevated noise level has been sustained (e.g., for 3-minutes). As depicted in FIG. 6N, the size and color of active portion 622A of noise meter affordance 622 remain unchanged (e.g., compared to the depiction in FIG. 6M). However, noise status affordance 620, numeric portion 624B, and graphic portion 624C have been updated to reflect the sustained elevated ambient noise level. Notably, immediately after displaying user interface 608A as depicted FIG. 6N (e.g., after device 600 detects and displays a sustained noise level of 110 DB for 3-minutes, the previously discussed notification triggering condition), device 600 does not output haptic alert (e.g., FIG. 6H) or display noise notification user interface 608D (e.g., FIG. 6I), since the previous notification was dismiss within an auto-suppression period (e.g., 30 minutes).

Figure 6O:
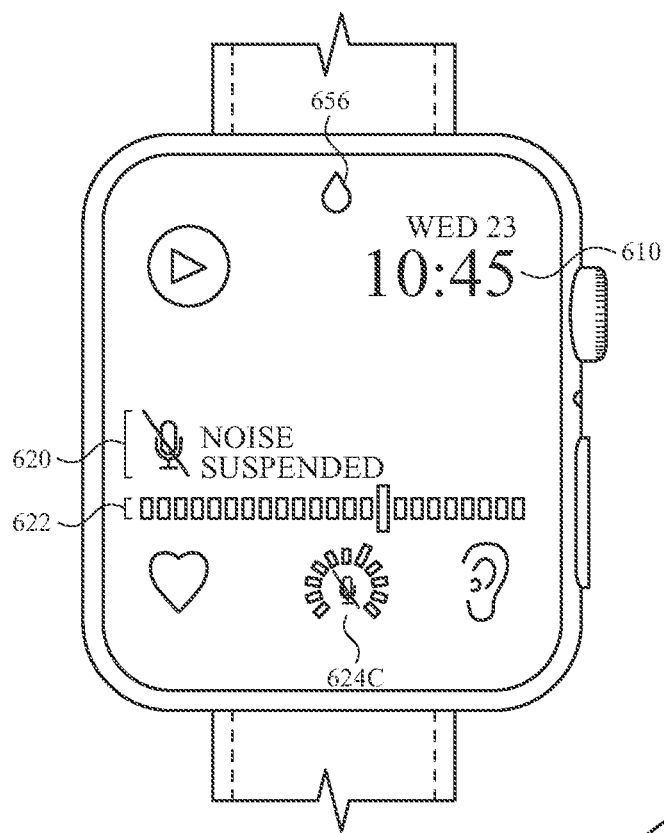
Figure 6P:
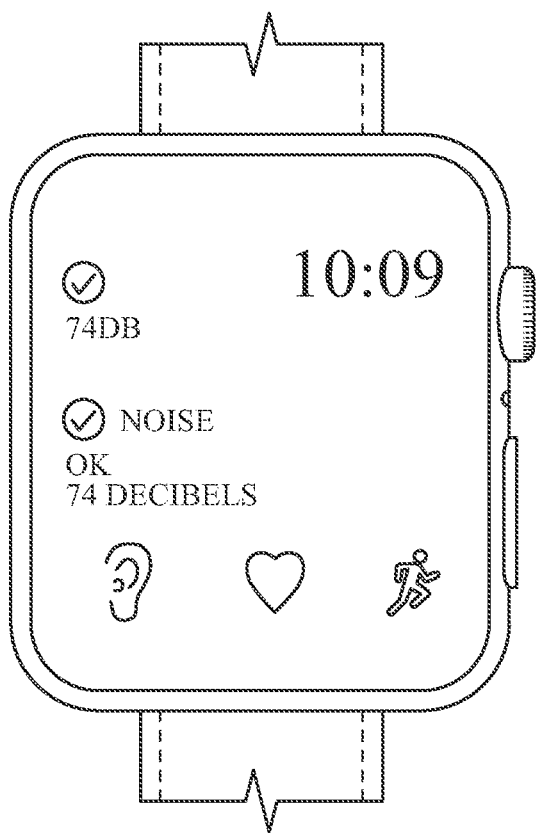
Figure 6Q:
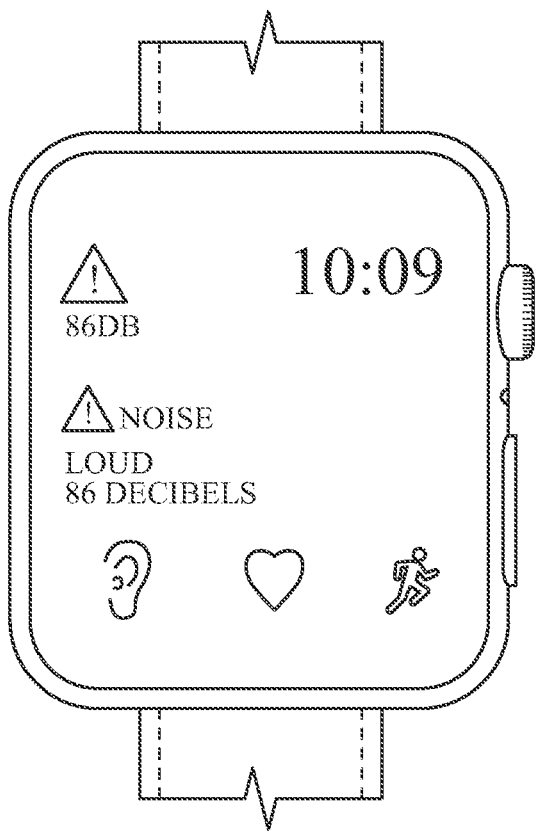
Figure 6R:
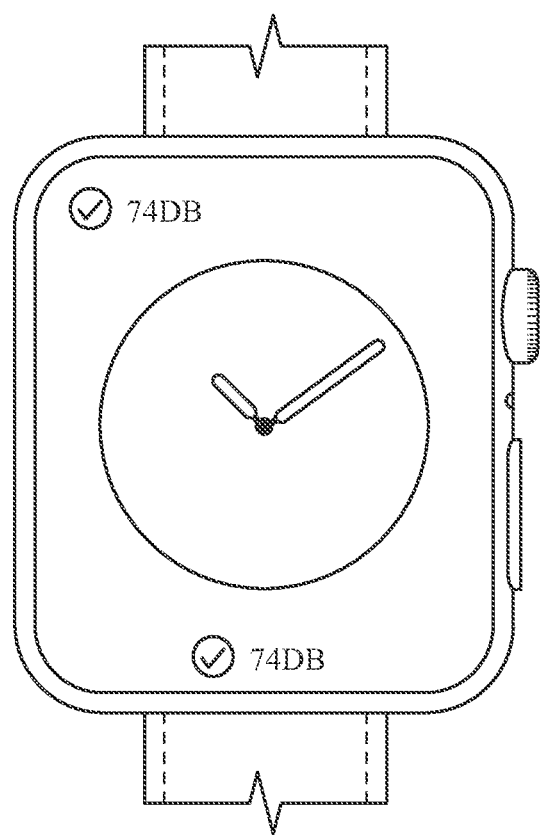
Figure 6S:
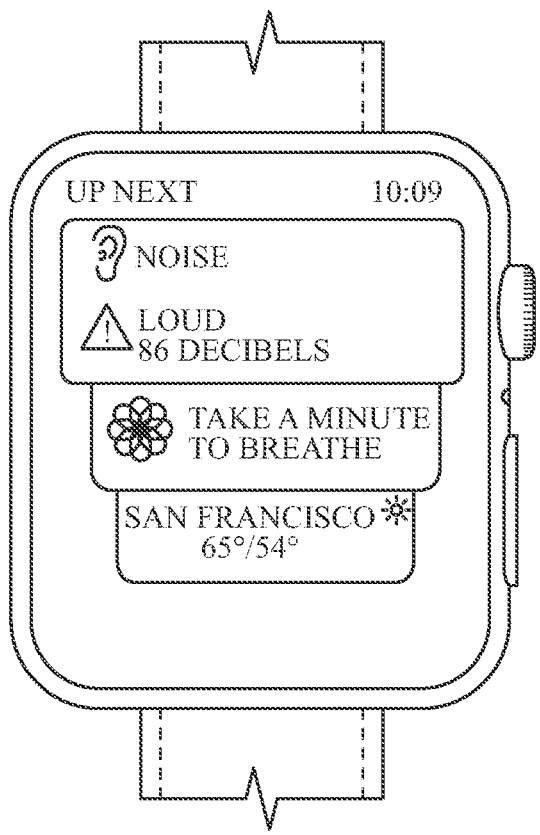
Figure 6T:
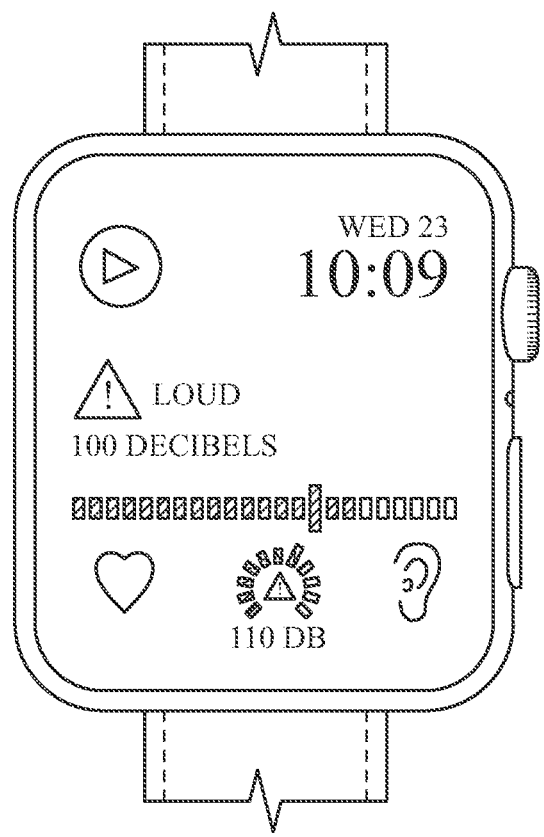
Figure 6U:
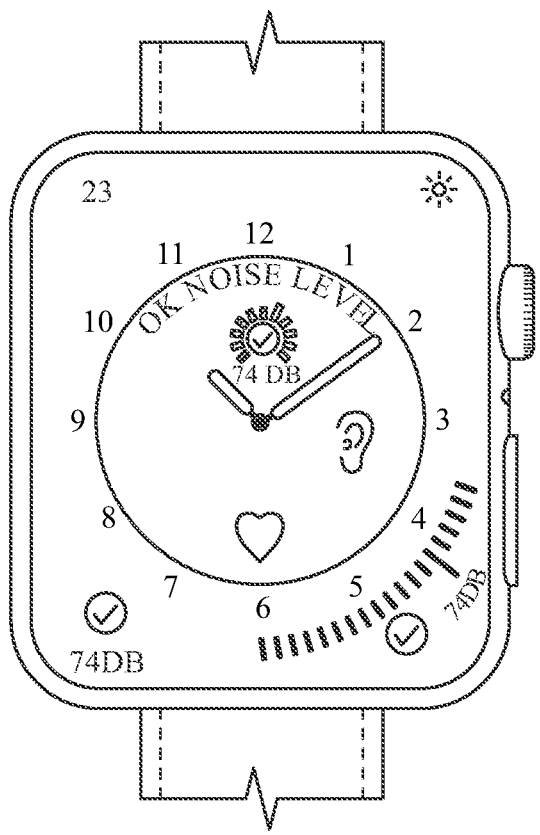
Figure 6V:
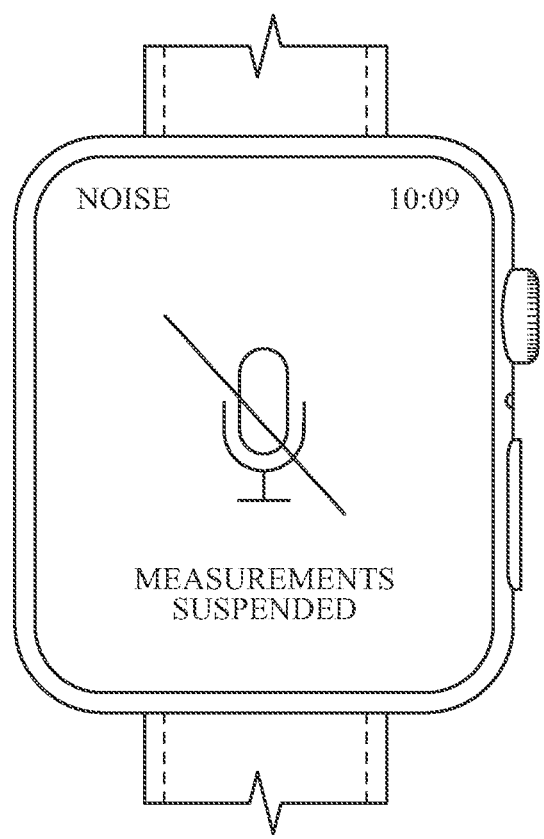
Figure 6W:
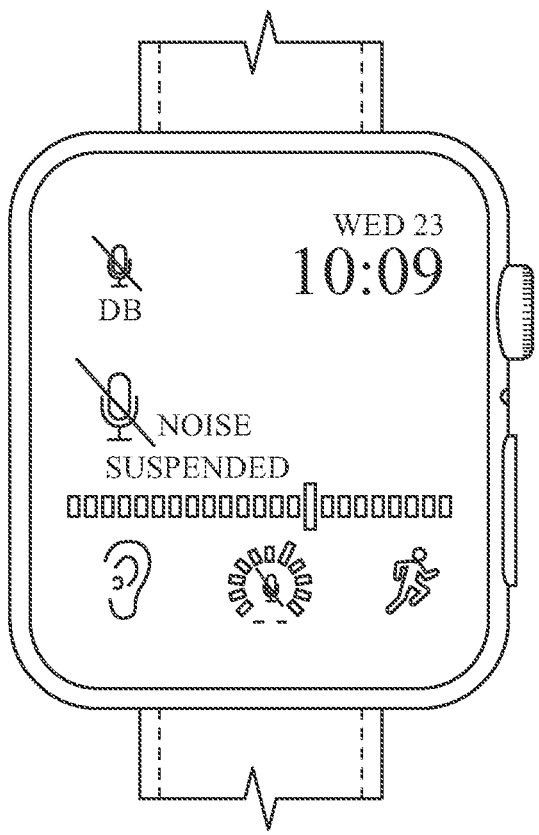
Figure 6X:
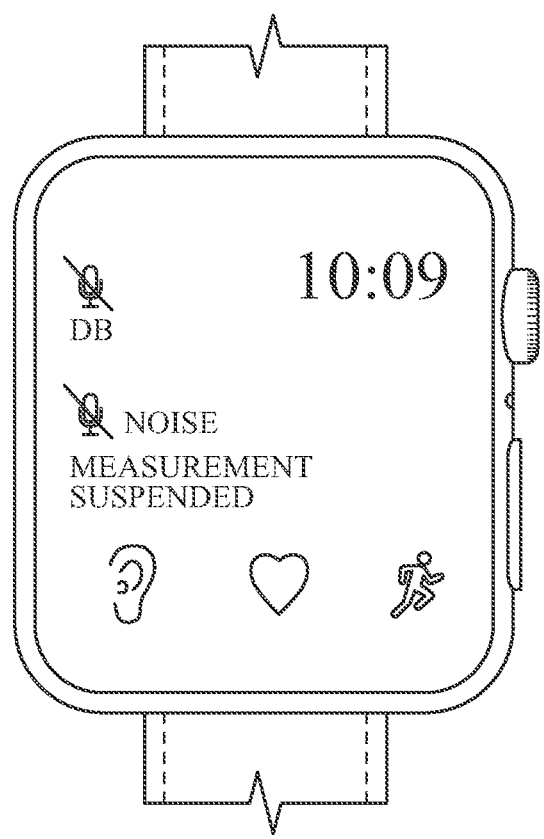
Figure 6Y:
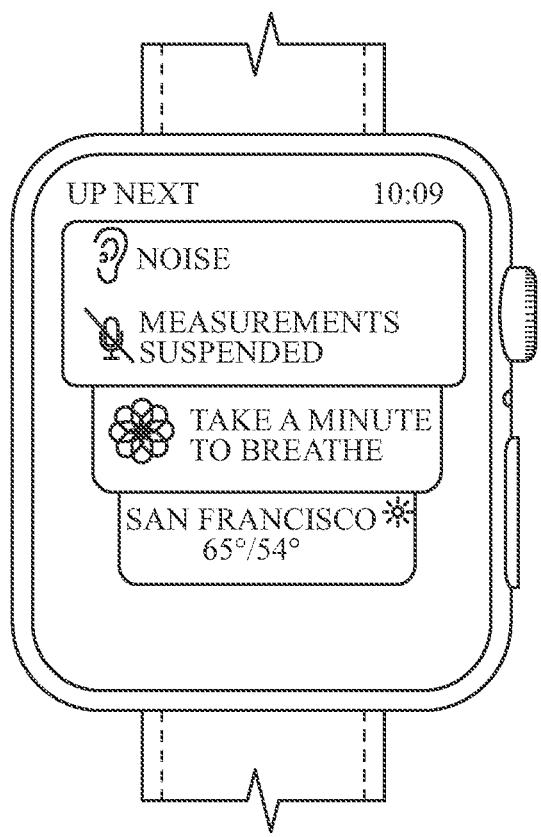
Figure 6A:
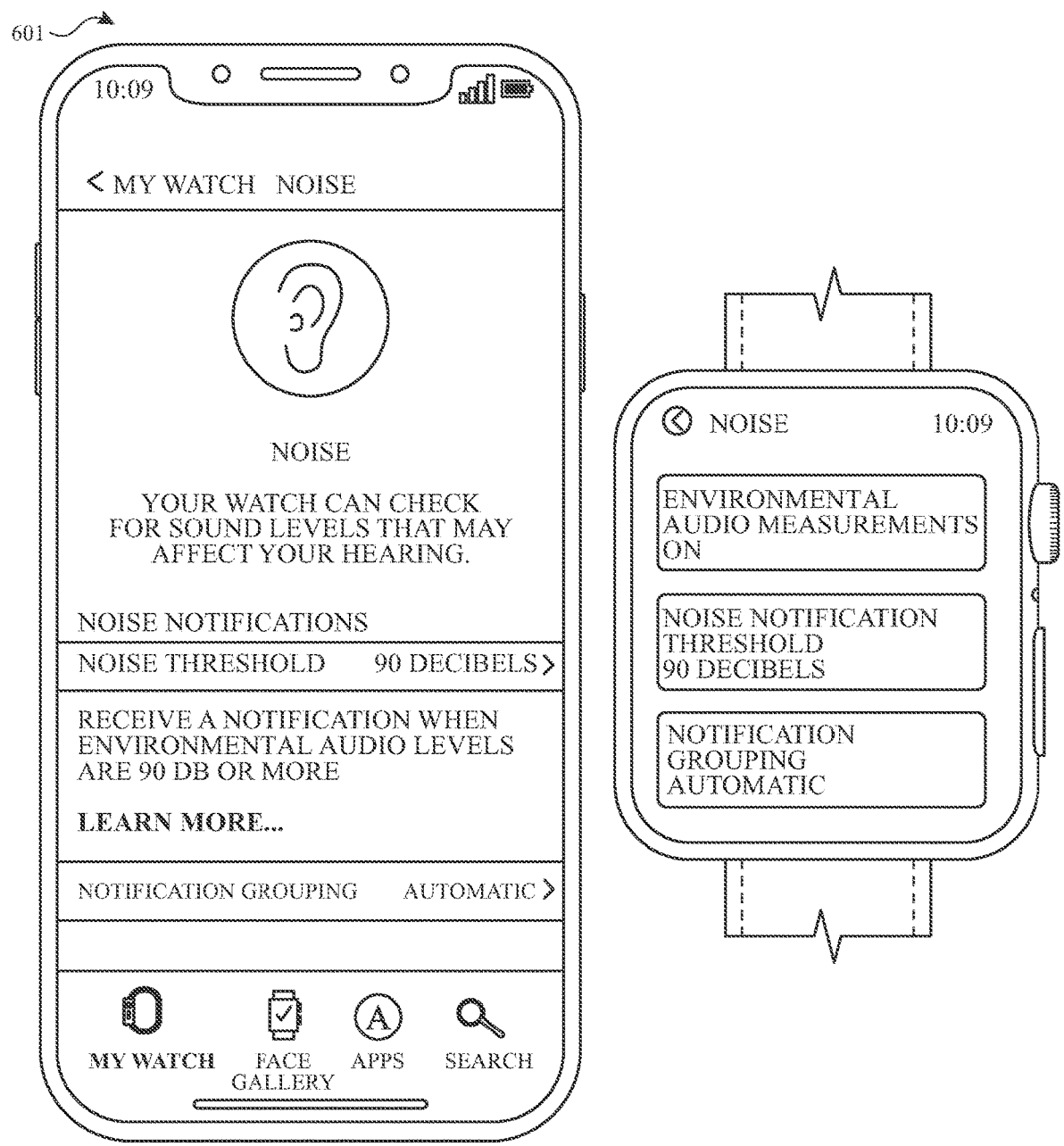
Figure 6A:
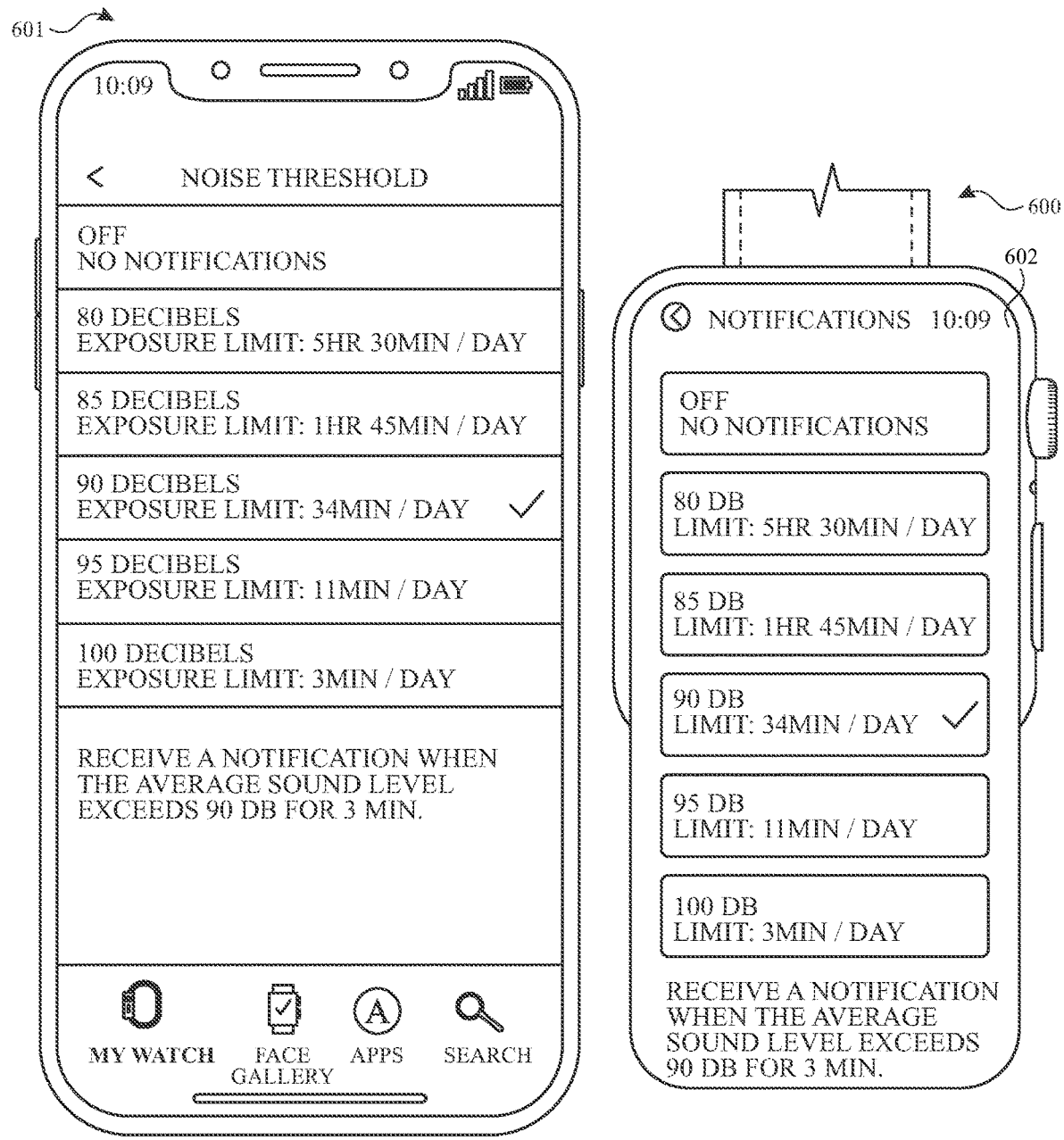
Figure 6A:
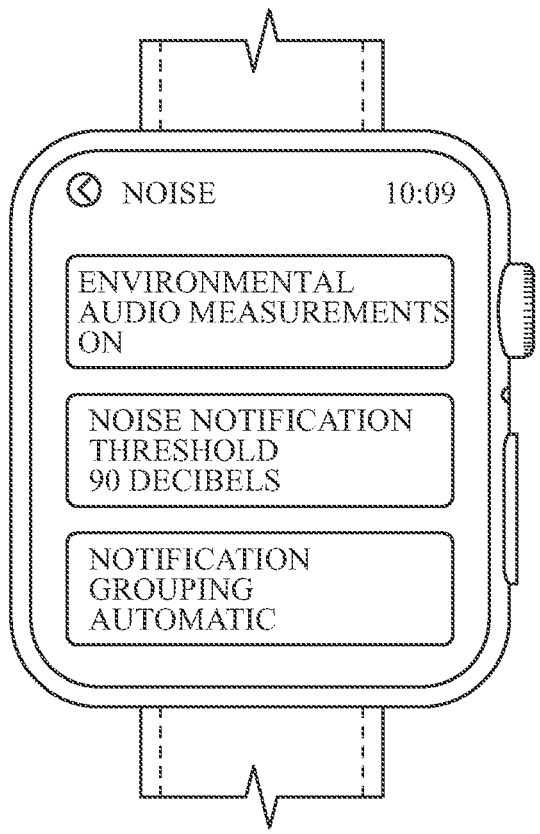
Figure 6A:
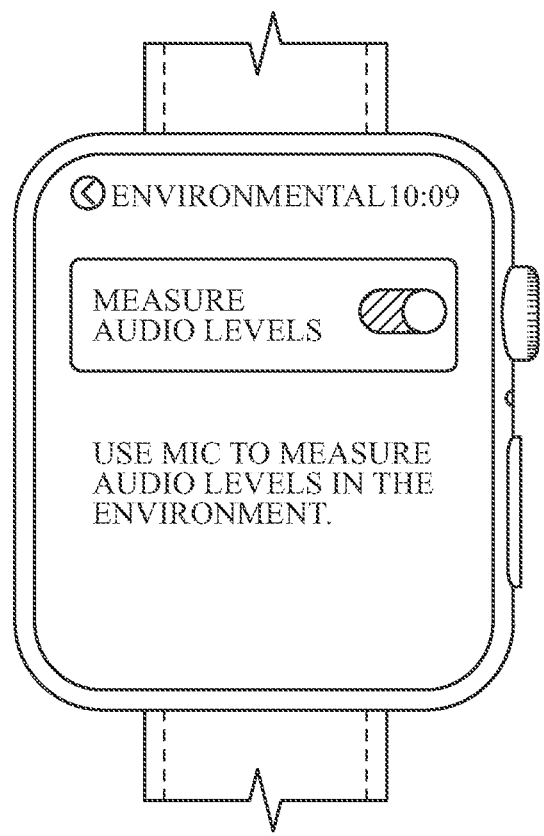
Figure 6A:
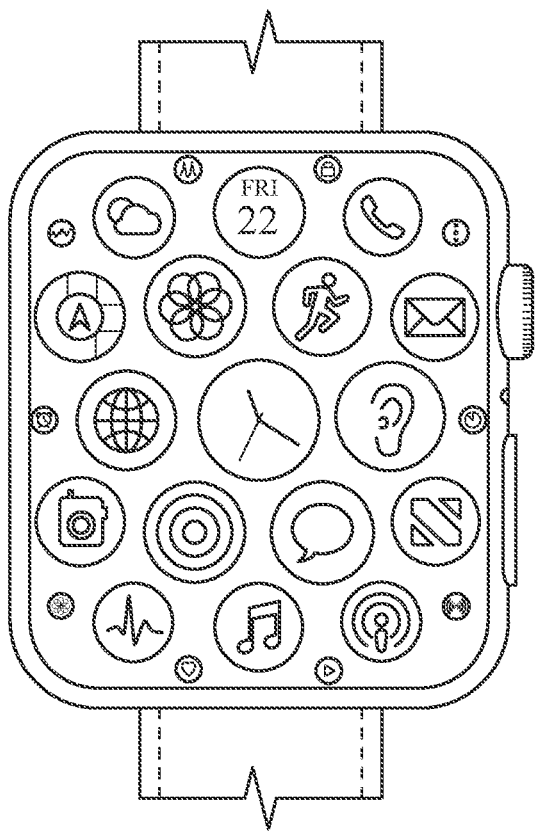
Figure 6A:
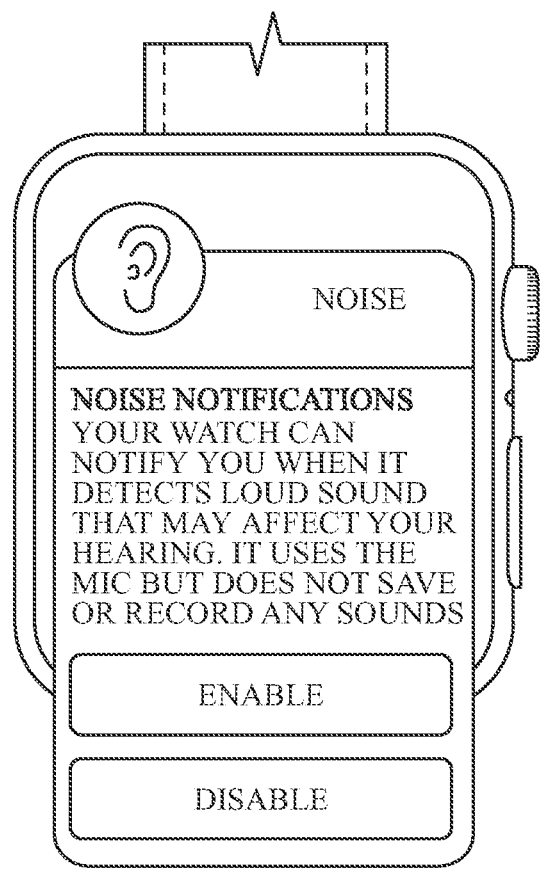
Figure 6A:
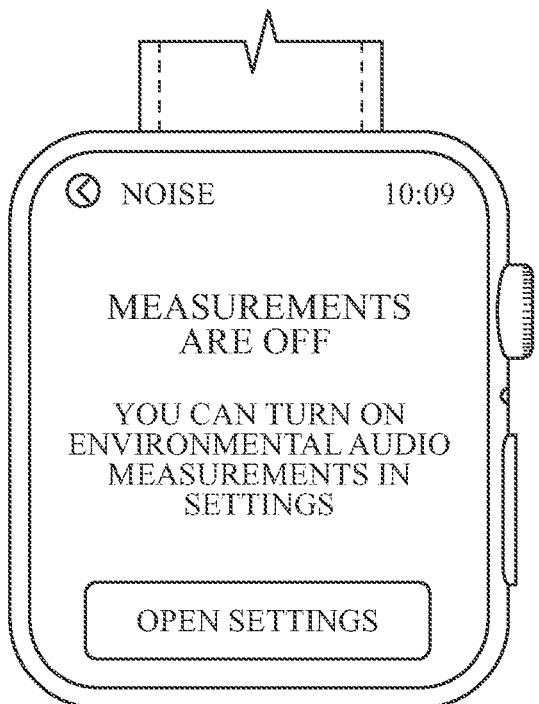
Figure 6A:
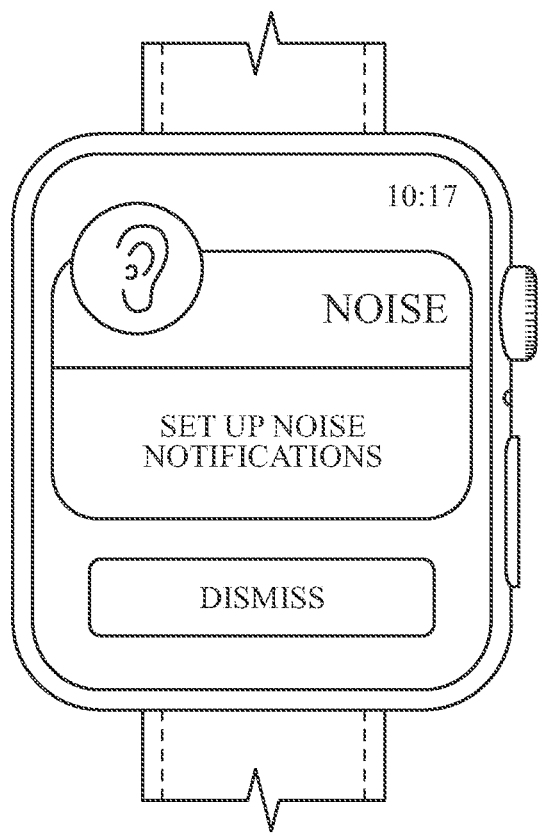
Figure 6A:
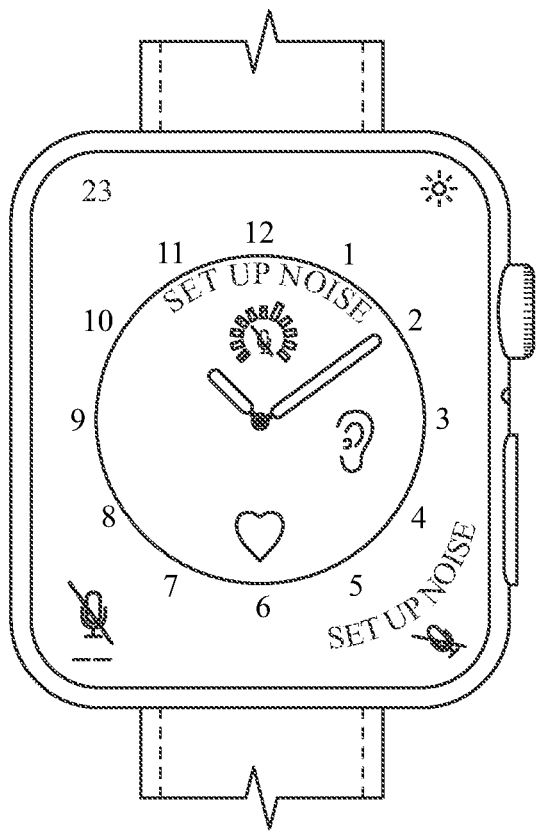
Figure 6A:
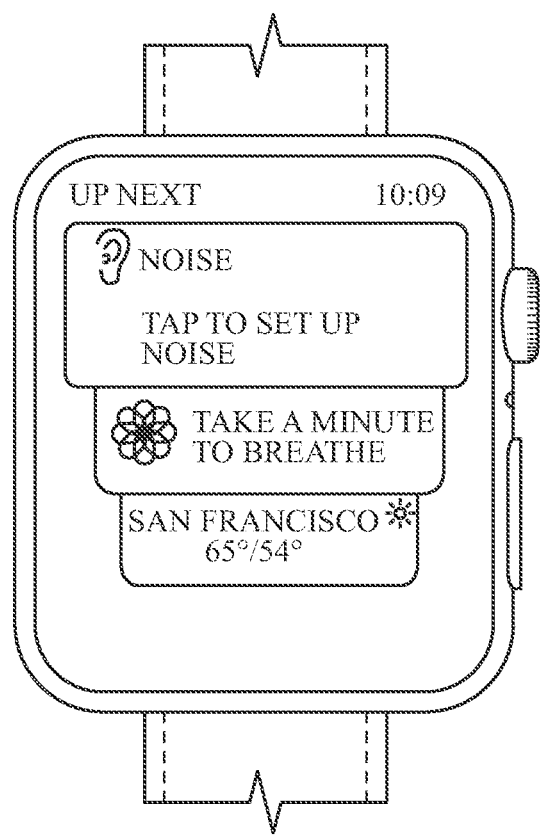
Figure 6A:
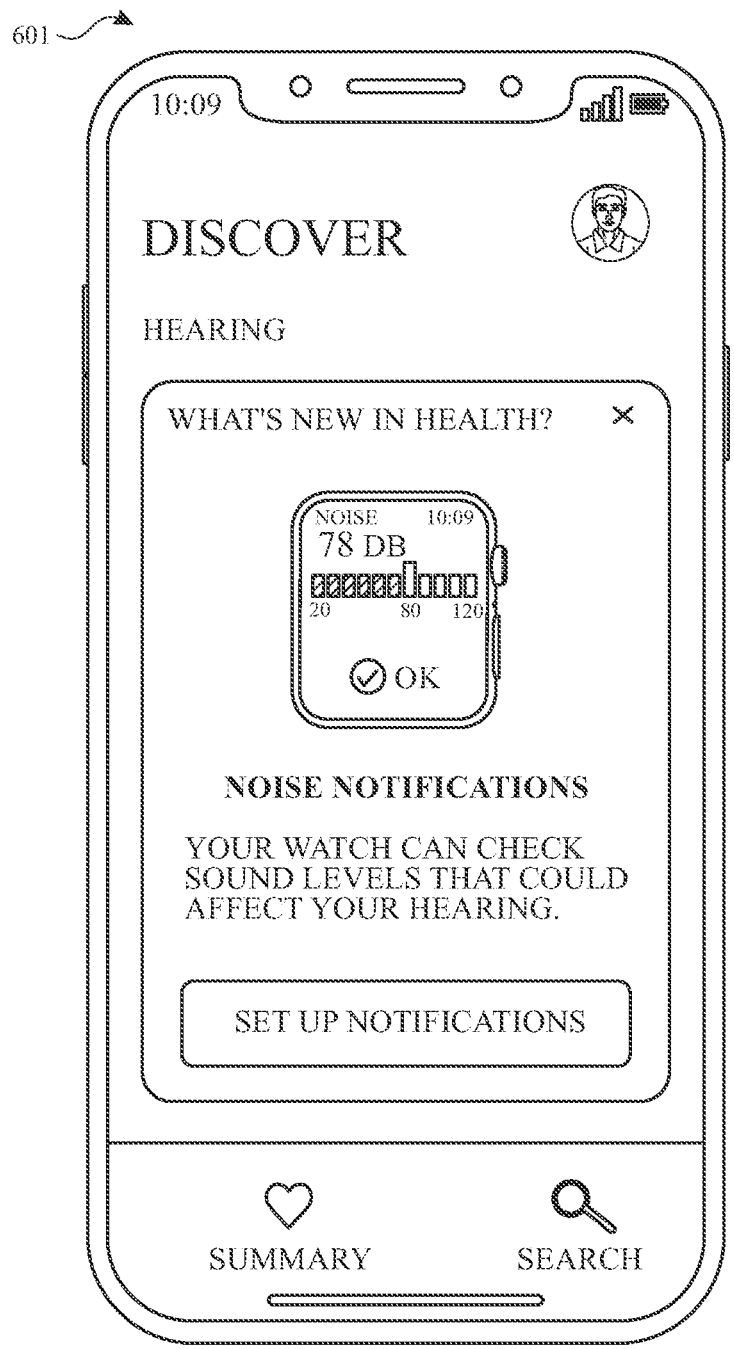

FIG. 6O depicts user interface 608A while device 600 operates in a suspended state (e.g., not currently measuring or detecting noise levels). As depicted in FIG. 6O, while in a suspended state, user interface 608A does not indicate noise level values and noise status affordance 620 and graphic portion 624C appear in an alternative form to indicate the suspending state of device 600. In some embodiments, noise measurements are suspended upon detection of various operating conditions (e.g., water lock mode on, phone call active, speaker in-use, or watch off-wrist conditions (unless the watch has been manually unlocked)). In some embodiments, notification (e.g., display of user interface 608D) may be disabled without suspending noise measurements. In some embodiments, noise measurements are disabled when a noise application feature is disabled (e.g., via device privacy setting or noise app setting).

FIGS. 6P-6U depict device 600 displaying exemplary clock user interfaces including noise application affordances and elements corresponding those described above with respect to FIGS. 6A-6O.

FIGS. 6V-6Y depict device 600 displaying exemplary user interfaces reflecting device 600 in a suspended state.

FIGS. 6Z-6AA depict a series user interfaces associated with configuring a noise level threshold (e.g., a noise level threshold corresponding to the thresholds described above with respect to FIGS. 6A-6O), from device 600 or from an external device coupled (e.g., wirelessly) to device 600.

FIGS. 6AD-6AE depict user interfaces for enabling and disabling noise measurement on device 600.

FIGS. 6AF-6AL depict various interfaces for initializing or enabling a noise monitoring application (e.g., as describe above with respect to FIGS. 6A-6O).

FIGS. 7A-7B are a flow diagram illustrating a method for monitoring noise levels using an electronic device, in accordance with some embodiments. Method 700 is performed at an electronic device (e.g., 100, 300, 500, 600) with a display device (e.g., 602). In some embodiments, the electronic device also includes a set of sensors (e.g., accelerometer, gyroscope, GPS, heart rate sensor, barometric altimeter, microphone, pressure sensor, ambient light sensor, ECG sensor, etc.). In some embodiments, the electronic device is a wearable device with an attachment mechanism, such as a band. Some operations in method 700 are, optionally, combined, the orders of some operations are, optionally, changed, and some operations are, optionally, omitted.

As described below, method 700 provides an intuitive way for monitoring noise exposure levels. The method reduces the cognitive burden on a user seeking to monitor noise levels (e.g., environment noise levels) the user is exposed to and experiencing during a day, thereby creating a more efficient human-machine interface. For battery-operated computing devices, enabling a user to monitor noise exposure levels faster and more efficiently conserves power and increases the time between battery charges.

The electronic device (e.g., 600) displays (712), via the display device, a first user interface (e.g., a clock face user interface or user interface of an application) including a graphical object (e.g., a meter) that varies in appearance based on a noise level.

In some embodiments, at a first time point prior to displaying the first user interface (e.g., 608A, 608C) and in accordance with a determination that a set of noise notification criteria are met, the noise notification criteria including a criterion that is met when a current noise level over a third period of time (e.g., an average value of the current noise level over the third period of time) exceeds a third threshold noise level (e.g., 80 dB, 85 dB, 90 dB, etc.) (e.g., the average noise level exceeds the threshold for at least 3 minutes), the electronic device displays (702) a noise level notification (608D) that includes: an indication of the current noise level over the third period of time (e.g., text indicating that a current noise level over the third period of time has exceeded the third threshold noise level; text indicating the amount of time that the current noise level has exceeded the third threshold noise level) (704), and a third affordance (e.g., "Open Noise") (e.g., 644) (706). In some embodiments, the third threshold level is the same as the first or second threshold levels. In some embodiments, the set of noise notification criteria includes a second criterion that is met when the current noise level exceeds the third threshold noise level for at least a third period of time. In some embodiments, while displaying the third affordance (e.g., 644), the electronic device receives (708) a user input corresponding to the third affordance. In some embodiments, in response to receiving the user input corresponding to the third affordance, the electronic device displays (710) the first user interface (e.g., 608C) (e.g., opening the noise app). Displaying (e.g., automatically) the noise level notification in accordance with the determination that the set of noise notification criteria are met provides a user with quick and easy access to information concerning a current noise exposure level. Performing an operation when a set of conditions has been met without requiring further user input enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the set of noise notification criteria are not satisfied when a second noise notification level was displayed within a predetermined time (e.g., 30 minutes) before the first time point (e.g., 10:17 as depicted in FIG. 6I). In some embodiments, subsequent noise level notifications are suppressed for a period of time after issuing a previous noise level notification. Suppressing subsequent noise level notifications for the period of time after issuing the previous noise level notification prevents the electronic device from unnecessarily providing redundant notifications, which in turn enhances the operability of the device and makes the user-device interface more efficient which, additionally, reduces power usage and improves battery life of the device by enabling the user to use the device more quickly and efficiently. In some embodiments, notifications displayed within the predetermined period after the first time point are not suppressed if the noise level averages below the threshold for a fixed period (e.g., 15 minutes) after the first time point.

In some embodiments, the noise level notification (e.g., 608D) further includes a fourth affordance (e.g., 646) associated with a second predetermined period and the electronic device receives an input corresponding to the fourth affordance and in response to receiving the input corresponding to the fourth affordance, the electronic device forgoes display of (e.g., suppressing display of) further instances of noise level notifications for the second predetermined time period (e.g., 1 hour, ½ hour, reminder of the day, etc.). Providing the fourth affordance in the noise level notification that enables a user to cause the electronic device to forgo displaying further instances of noise level notifications enables the user to quickly and easily suppress further noise level notifications on the electronic device. Providing additional control options without cluttering the UI with additional displayed controls enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

The electronic device receives (714) first noise level data (e.g., noise level data corresponding to the noise level over a first period of time; an average value over the first period of time or multiple data points representing the noise level over the first period of time) (e.g., noise level "34 DB" of FIG. 6C) corresponding to a first noise level (e.g. data from a sensor of the electronic device; data from an external electronic device), the first noise level below a threshold noise level (e.g., 80 dB). In some embodiments, the first noise level data over the first period of time represents an instantaneous noise level.

In response to receiving the first noise level data, the electronic device displays (716) the graphical object (e.g., 622, 638) with an active portion (e.g., emphasized or visually distinct portion based on appearance) (e.g., 622A, 638A) of a first size (e.g., a number of segments, a length, or an area relative to the object's overall size that is proportional to the noise level) based on the first noise data and in a first color (e.g., green). In some embodiments, the active portion extends from the left-most edge of the graphical object to a location between the left-most edge and right-most edge of the graphical object. In some embodiments, the graphical object includes an indication of the first noise level data other than a size of the active portion (e.g., a numeric value, a position of a point or a line along the axis of a graph). Displaying the graphical object with the active portion of the first size based on the first noise data and in the first color provides a user with easily recognizable and understandable noise exposure level information. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

While maintaining display of the first user interface, the electronic device receives (718) second noise level data corresponding to a second noise level different from the first noise level (e.g., the second is either lower or higher than the first) (e.g., noise level "113 DB" of FIG. 6E).

In response to receiving the second noise level data (720), the electronic device displays (722) the active portion in a second size based on the second noise level that that is different from the first size (e.g., the active portion grows or shrinks corresponding the difference between the first noise level and the second noise level) (e.g., 638A in FIG. 6D). Displaying the active portion in the second size based on the second noise level in response to receiving the second noise level data enables a user to quickly and easily visually differentiate between noise exposure level information corresponding to the first noise level data and the second noise level data. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In response to receiving the second noise level data (720), in accordance with a determination that the second noise level exceeds the threshold noise level (e.g., the noise level has increased beyond the 80 dB threshold), the electronic device displays (724) the active portion (e.g., 638A in FIG. 6D) in a second color different from the first color (e.g., change from green to yellow). Displaying the active portion in the second color different from the first color in accordance with the determination that the second noise level exceeds the threshold noise level provides visual feedback to the user that the noise exposure level has exceeded a certain threshold. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In response to receiving the second noise level data (720), in accordance with a determination that the second noise level does not exceed the threshold noise level (e.g., the noise level remains below the 80 dB threshold), the electronic device maintains (726) display of the graphical object in the first color (e.g., maintain as green).

In some embodiments, while displaying the graphical object with the active portion at the second size and in the second color (e.g., yellow), the electronic device receives (728) third noise level data corresponding to a third noise level that is below the threshold noise level (e.g., the noise level has decreased to below the 80 dB threshold). In some embodiments, in response to receiving the third noise level data, the electronic device displays (730) the active portion at a third size based on the third noise level data that is smaller than the second size and in the first color (e.g., the active portion shrinks corresponding the difference between the second noise level and the third noise level and changes from yellow to green) (e.g., 638A in FIG. 6F). Displaying the active portion at the third second size based on the third noise level in response to receiving the third noise level data enables a user to quickly and easily visually differentiate between noise exposure level information corresponding to the third noise level data from that corresponding to the first noise level data and the second noise level data. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the graphical object varies based on noise level over a first period of time (e.g., an average of noise level over a 0.1-second window) and the first user interface further includes a second graphical object (e.g., a text indication; a graphical indication) (e.g., 620, 624, 636, 640) that varies in appearance based on the noise level over a second period of time that is different from the first period of time (e.g., averaged over a 1-second window).

In some embodiments, displaying the first user interface includes displaying a first affordance that, when selected, displays a second user interface (e.g., an interface with information about the threshold noise level) (e.g., 640) in accordance with a determination that a current noise level (e.g., based on noise data for the first period of time or noise data for the second period of time) is below a second threshold noise level (e.g., a user-selected threshold). In some embodiments, the first affordance includes "OK" or a graphical element (e.g., a checkmark) when the noise level is below the threshold (e.g., 640 in FIGS. 6C, 6D, 6G; 620 in FIGS. 6L-6M). In some embodiments, the first threshold and the second threshold are the same.

In some embodiments, displaying the first user interface includes displaying a second affordance (e.g., without displaying the first affordance), different from the first affordance, that, when selected, displays a third user interface (e.g., the same as the second user interface; different than the first user interface and with information about the threshold noise level) in accordance with a determination that a current noise level is above the second threshold noise level. In some embodiments, the first affordance includes "LOUD" or a graphical element (e.g., an exclamation point) when the noise level is at or above the threshold.

In some embodiments, the electronic device includes one or more noise sensors (e.g., one or more pressure sensing devices such as a microphone or microphone array) (e.g., 606), and the first noise level data and the second noise level data are received from the one or more noise sensors. In some embodiments, the display device and the one or more noise sensors are located within a common housing or body of the electronic device and the first noise level data and the second noise level data represent the noise level of the physical environment where the electronic device is located.

In some embodiments, the first noise level data and the second noise level data are received from a second electronic device that is different from the first electronic device (e.g., noise level data is received at the electronic device displaying the UI from a device external to the electronic device displaying the UI).

In some embodiments, while the first user interface is displayed (e.g., 608A, 608C), the electronic device samples noise level data at a first sampling rate (e.g., receiving new noise level data at a first rate). In some embodiments, while the first user interface is not displayed (e.g., 608B, 608D, and as generally depicted by FIGS. 6H, 6P-6S, 6AA-6AI), the electronic device samples noise level data at a second sampling rate different from the first sampling rate. In some embodiments, the first noise level data and the second noise level data are spaced apart by a first time interval. While the first user interface is not displayed, noise level data is received at a second time interval that is longer than the first time interval. In some embodiments, the second sampling rate is 20% of the first sampling rate. By automatically sampling the noise level data at the second sampling rate different from the first sampling rate when the first user interface is not displayed as opposed to when the first user interface is displayed, the electronic device reduces power usage and thus improves battery life of the device.

Note that details of the processes described above with respect to method 700 (e.g., FIGS. 7A-7B) are also applicable in an analogous manner to the methods described below. For example, method 1000 optionally includes one or more of the characteristics of the various methods described above with reference to method 700. For example, information concerning noise exposure levels corresponding to one or more of the output devices described in method 1000 can be represented or provided to a user using the graphical indication (e.g., a graphical object) described above that varies in appearance based on the noise exposure level. For brevity, these details are not repeated below.

FIGS. 8A-8L depict device 800 displaying user interfaces (e.g., user interfaces 808A-808F) on display 802 for accessing and displaying environmental noise exposure data (e.g., sets of data representing a device user's exposure to noise at various sound intensities). In some embodiments, environmental noise exposure data is received at device 800 from a sensor of device 800 or from an external device (e.g., device 600 as described above). In some embodiments, environmental noise exposure data is inputted manually by a device user (e.g., via series of user inputs detected by device 800).

Figure 8A:
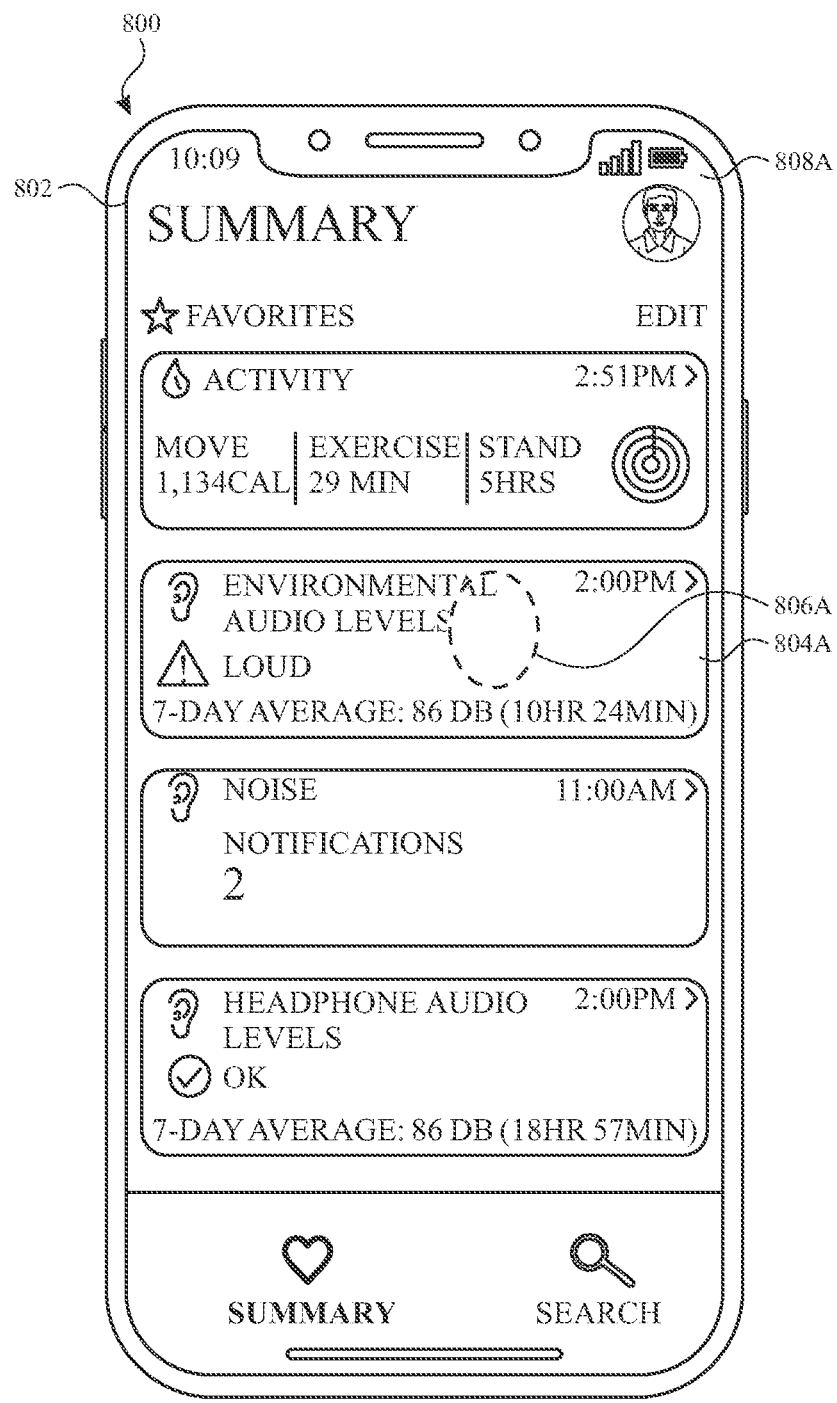
FIGS. 8A-8L illustrate user interfaces for monitoring noise exposure levels in accordance with some embodiments.
Figure 8B:
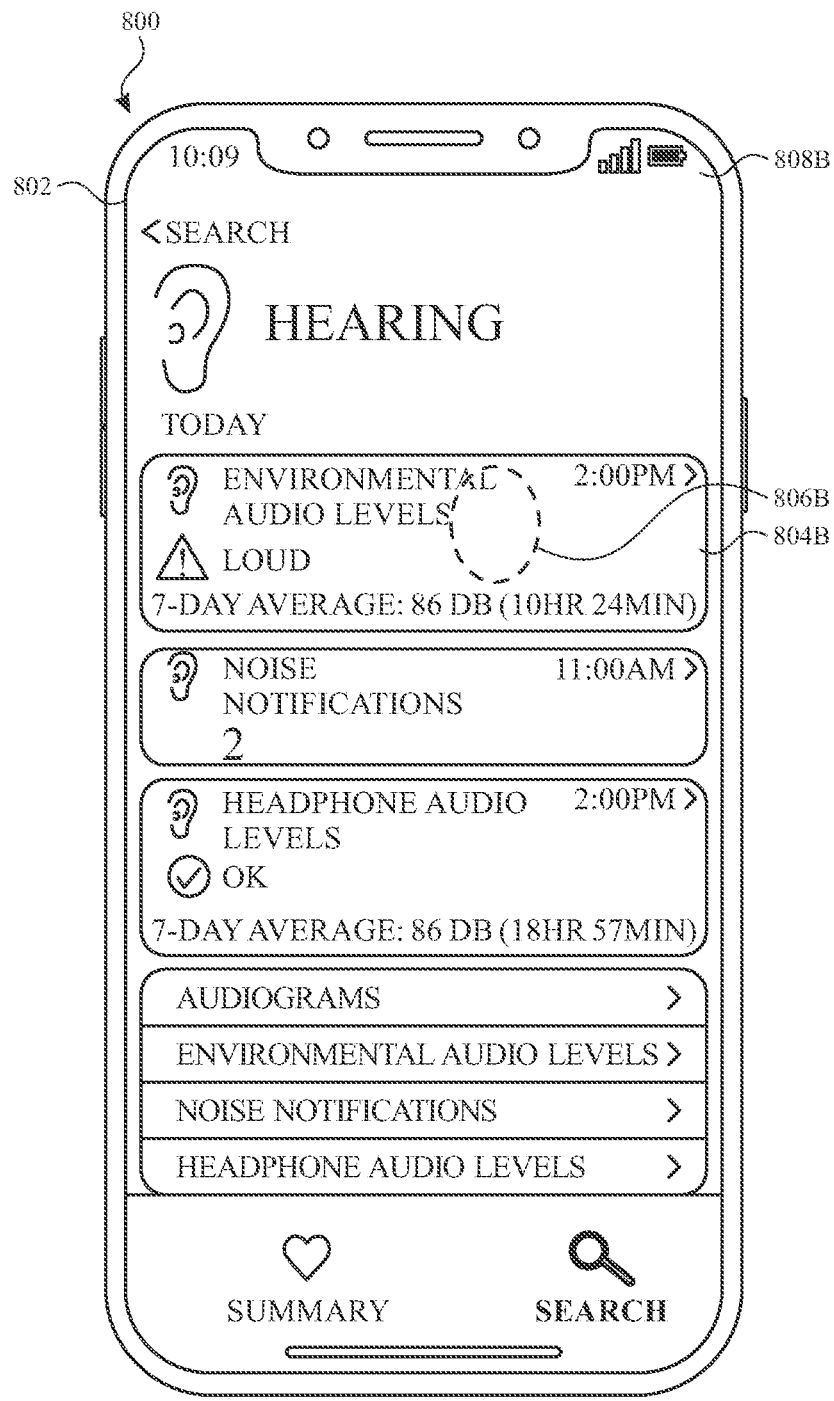

FIGS. 8A and 8B illustrate user interfaces within a health application for accessing environmental noise data. FIGS. 8A and 8B depict device 800 receiving inputs (e.g., 806A and 806B) at environmental audio levels affordance 804A and 804B, respectively. Upon detecting these inputs, device 800 displays data viewing interface 808C as depicted in FIG. 8C.

FIGS. 8C-8I depict various techniques for displaying and manipulating stored environmental noise data via user interface 808C. As depicted in FIGS. 8C-8I user interface 808C includes chart 805 displaying environmental noise exposure data (e.g., amplitudes or levels of noise a user associated with device 800 has been exposed to) over a selectable period (e.g., day, week, month, year, etc.).

Figure 8C:
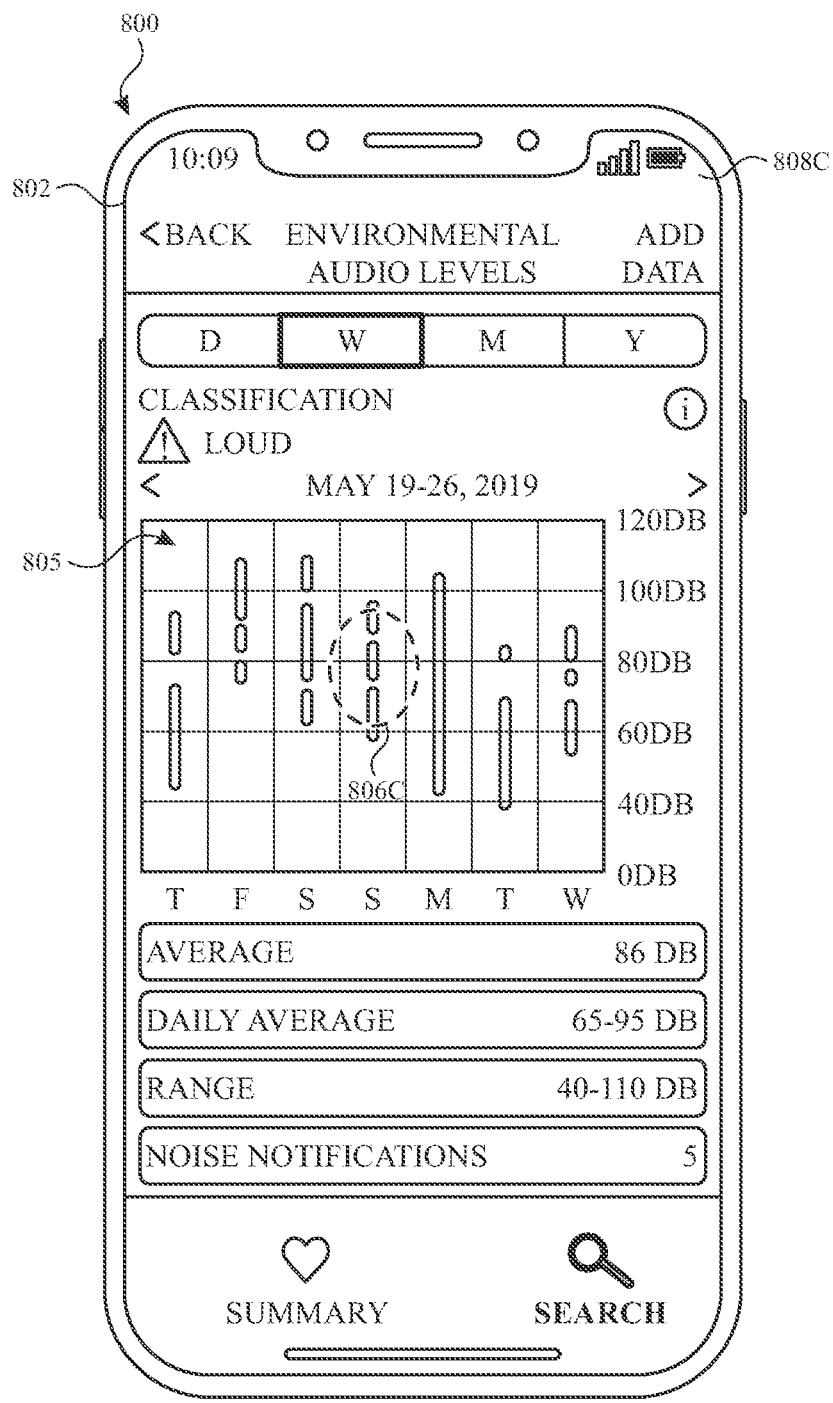
Figure 8D:
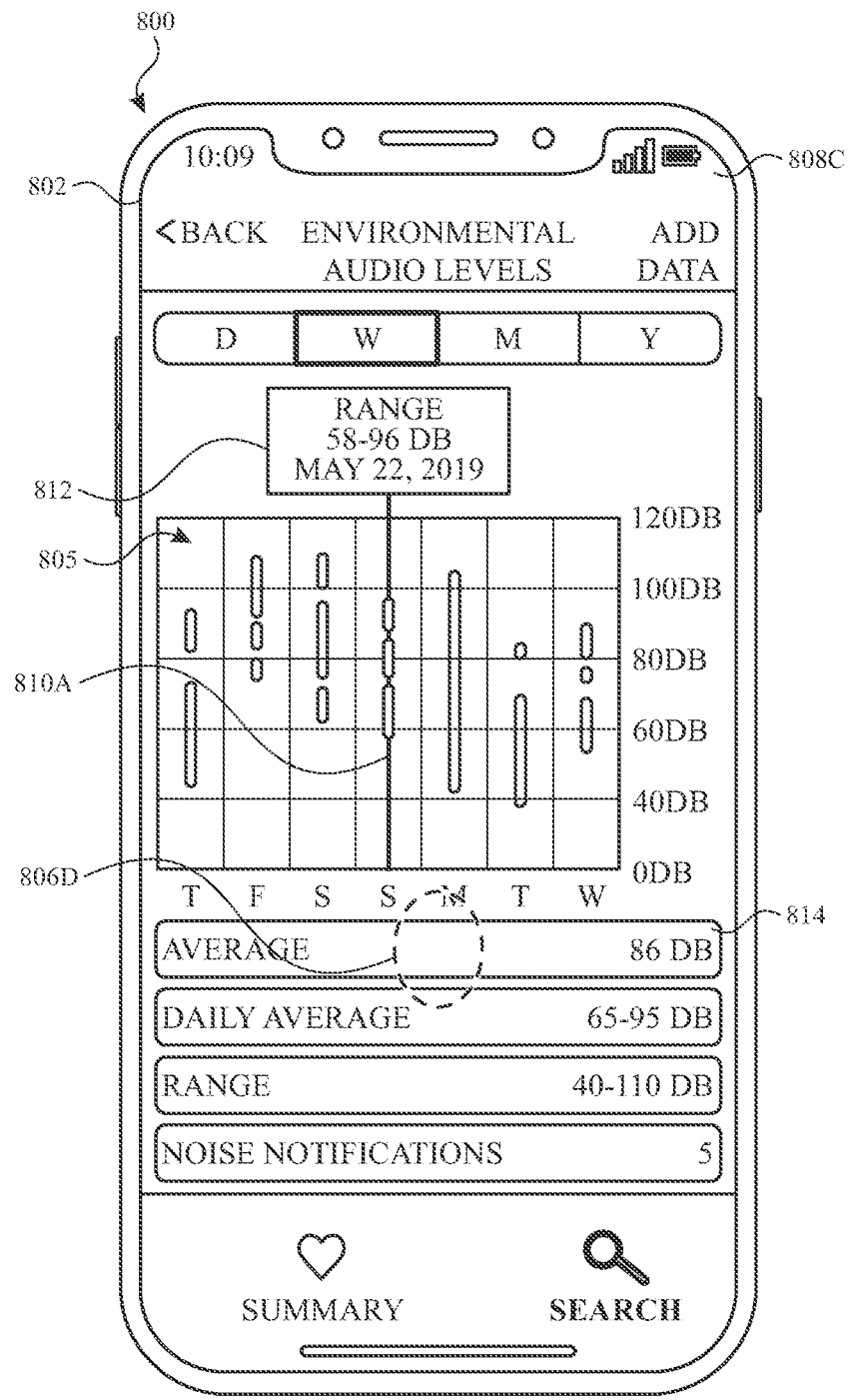

As depicted in FIGS. 8C-8D, environmental noise exposure data associated with a specific period (e.g., day of a week) on chart 805 is selected (e.g., via user input 806C). In response to selection, user interface 808C displays additional information about the selected environmental noise exposure data (e.g., details affordance 812). In response to selection, device also displays data overlay 810 at a location on chart 805 corresponding to the selected environmental noise exposure data in order to provide a visual indication of the data corresponding to the information displayed by details affordance 812.

Figure 8E:
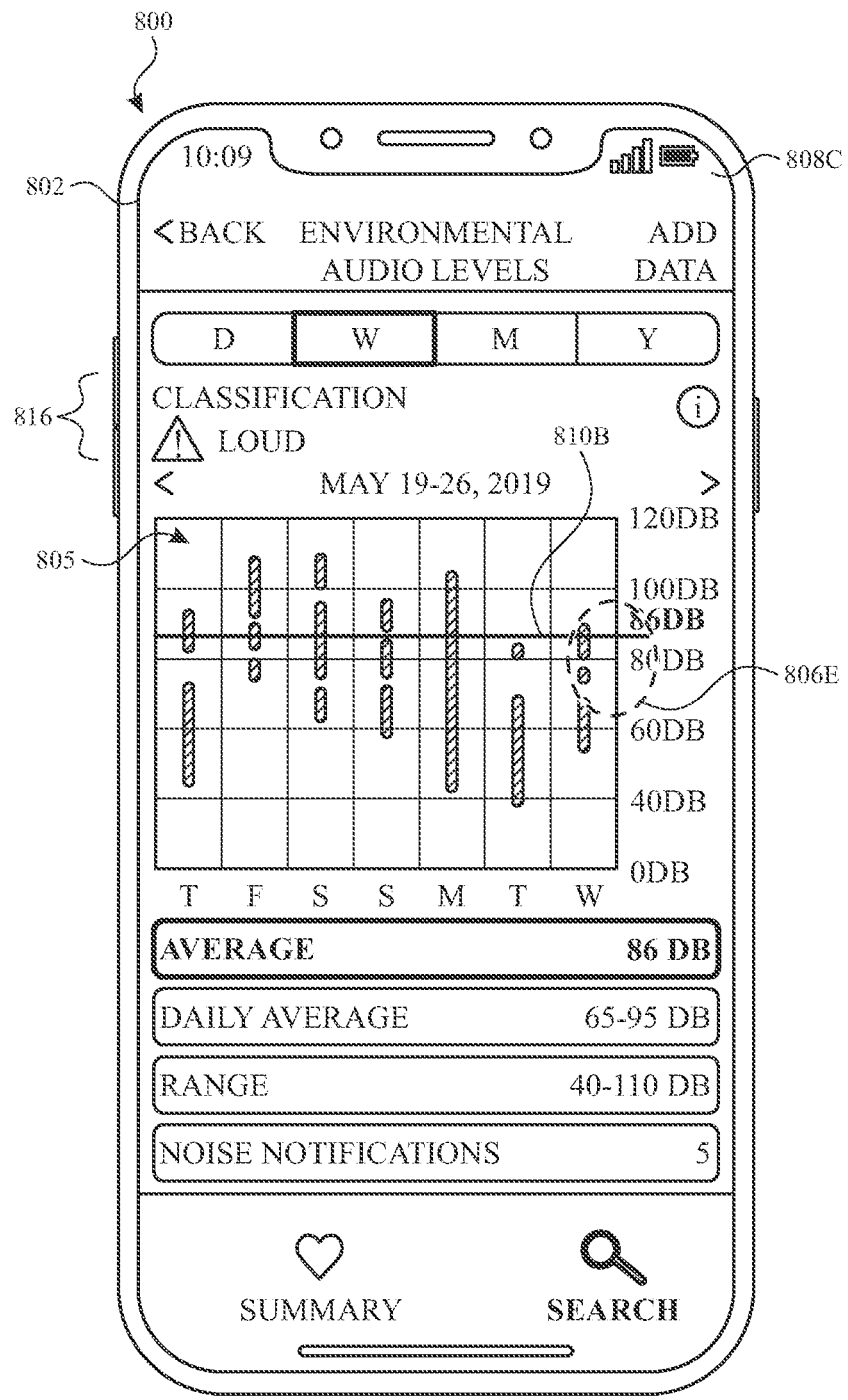
Figure 8F:
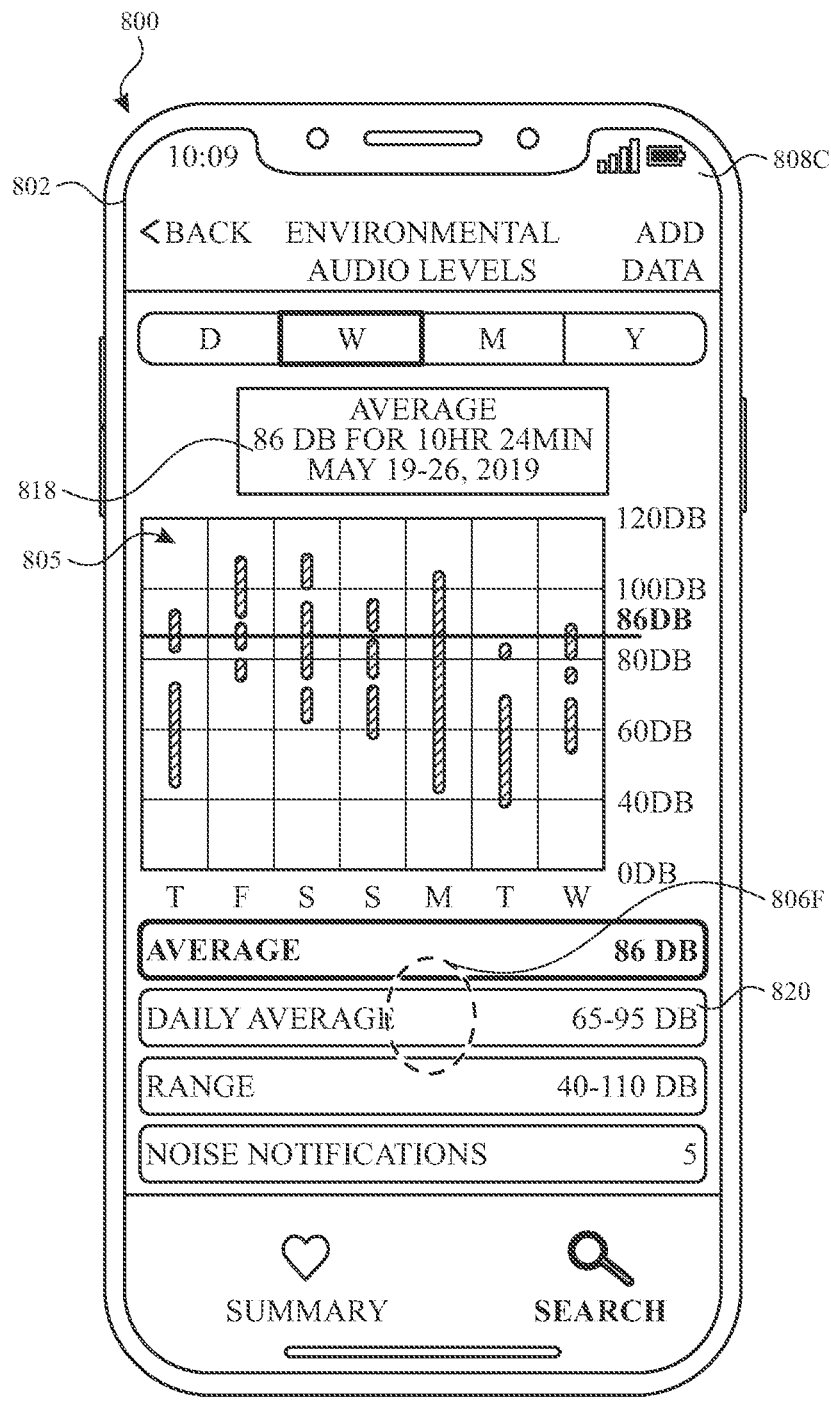
Figure 8G:
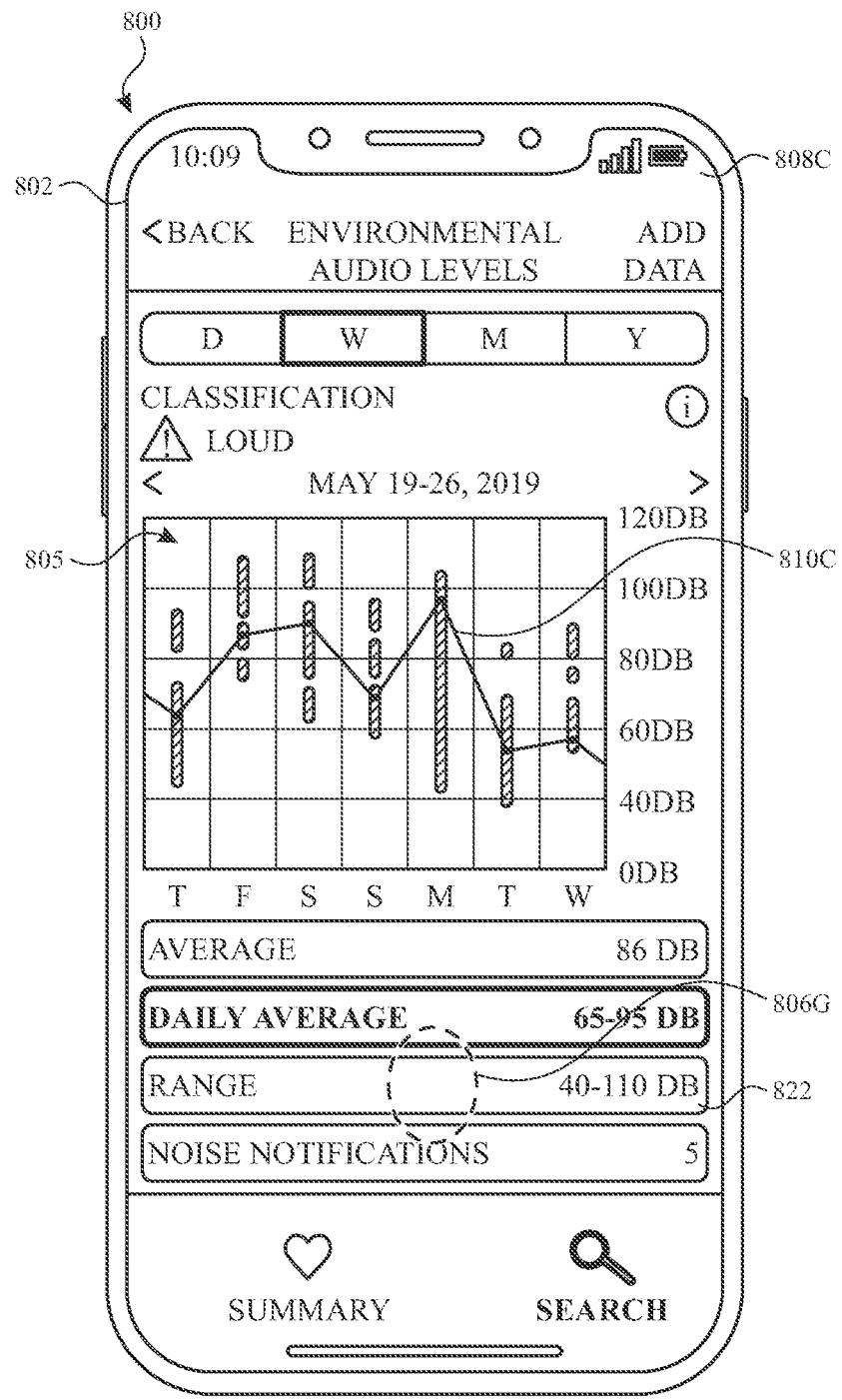

As depicted in FIGS. 8C-8I, user interface 808C includes various affordances for manipulating data displayed by chart 805 (e.g. average affordance 814, daily average affordance 820, range affordance 822, notification affordance 826). A depicted by FIGS. 8D-8E, in response to receiving user input 806D at average affordance 814, device 800 displays average overlay 810B (e.g., a visual reference to an average environmental noise exposure level calculated over the displayed period). As depicted by FIGS. 8E-8F, device 800 displays average details affordance 818 in respond to detecting selection (e.g., user input 806E) of average overlay 810B. As depicted by FIGS. 8F-8G, device 800 displays average details affordance 818 in respond to detecting selection (e.g., user input 806E) of average overlay 810B. A depicted by FIGS. 8F-8G, in response to receiving user input 806F at daily average affordance 820, device 800 displays daily average overlay 810C (e.g., a visual reference to the average environmental noise exposure levels as calculated on a daily basis). In some embodiments, device 800 displays noise classification affordance 816 (as depicted in FIG. 8E) in response to a determination that the average noise exposure level (e.g., as indicated by average overlay 810B) is above a threshold level (e.g., 80 DB). In some embodiments, in response to a determination that the average noise exposure level (e.g., as indicated by average overlay 810B) is below a threshold level (e.g., 80 DB), device displays noise classification affordance 816 with a different appearance (e.g., the affordance behaves similar to noise status affordance 620 or noise status indicator 640 as describe above with respect to FIGS. 6A-6O).

Figure 8H:
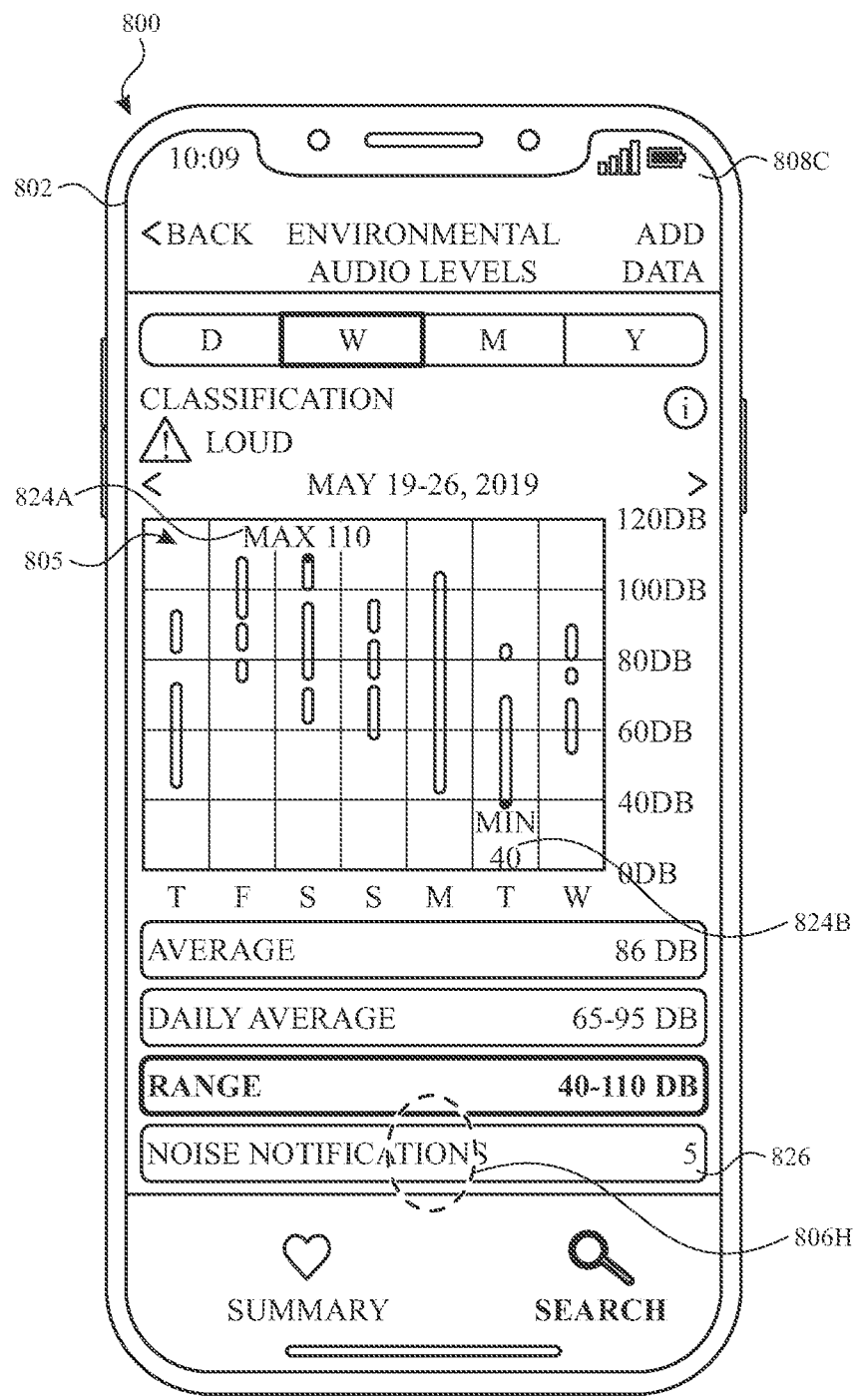
Figure 8I:
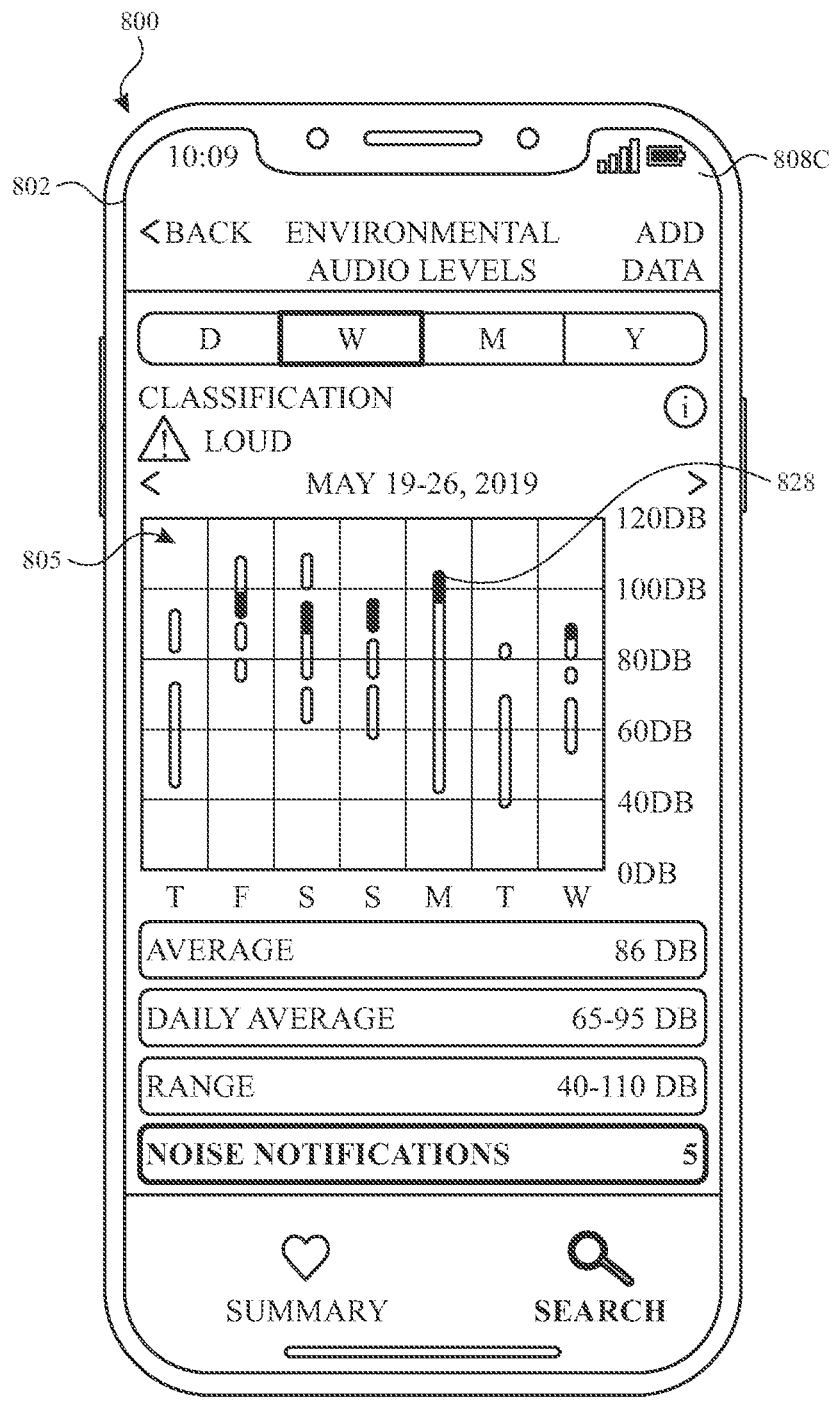

A depicted by FIGS. 8G-8H, in response to receiving user input 806G at range affordance 822, device 800 displays maximum level indicator 824A and minimum level indicator 824B (e.g., a visual references to the highest and lowest noise exposure levels within the displayed environmental noise level data on chart 805).

A depicted by FIGS. 8H-8G, in response to receiving user input 806H at notifications affordance 826, device 800 updates the environmental noise level data displayed in chart 805 by visually emphasizing (e.g., by varying one or more visual characteristics) of environmental noise exposure levels which caused device 800 (or a device coupled to device 800 such as device 600), to display a noise notification interface (e.g., noise notification user interface 608D of FIG. 6I).

Figure 8J:
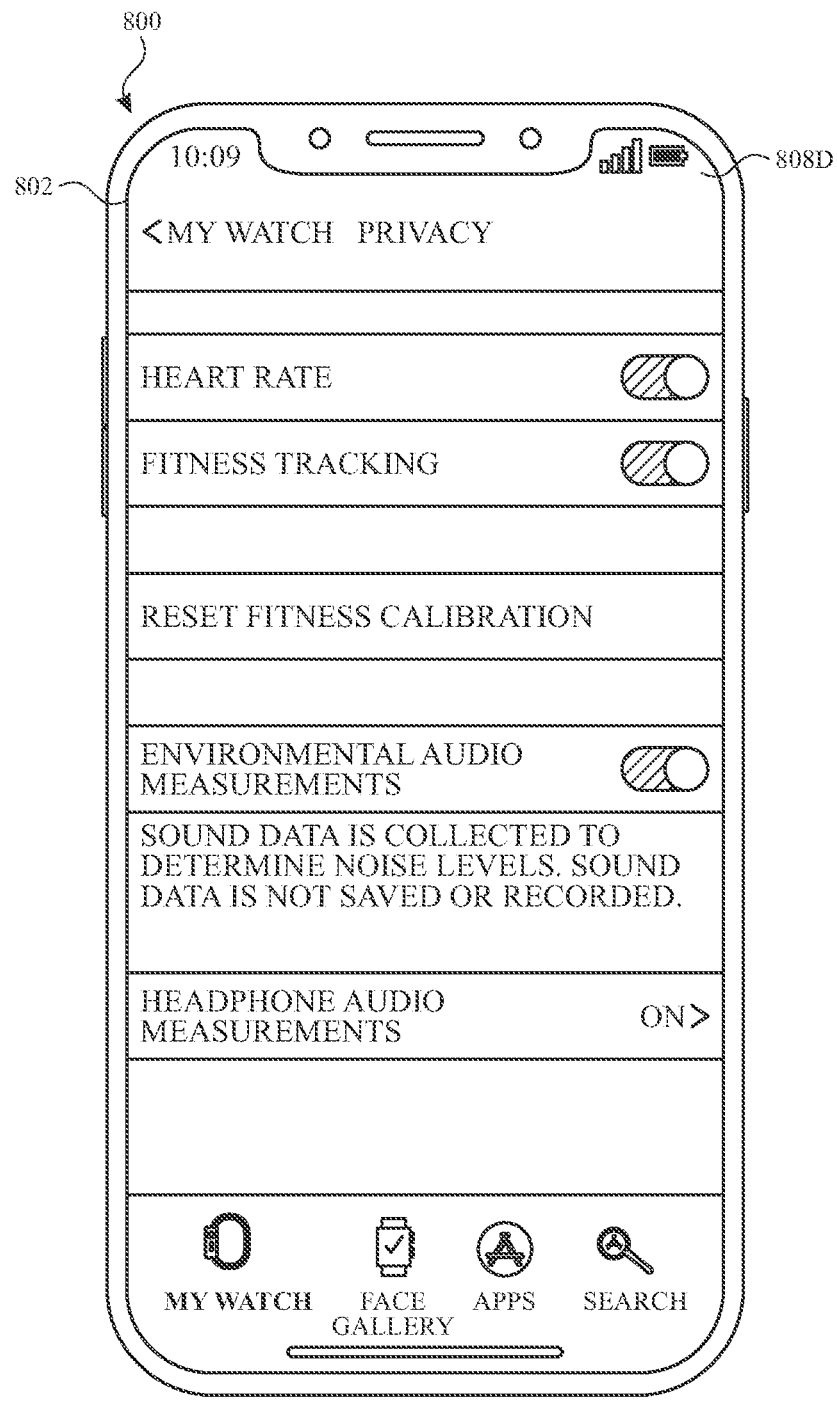
Figure 8K:
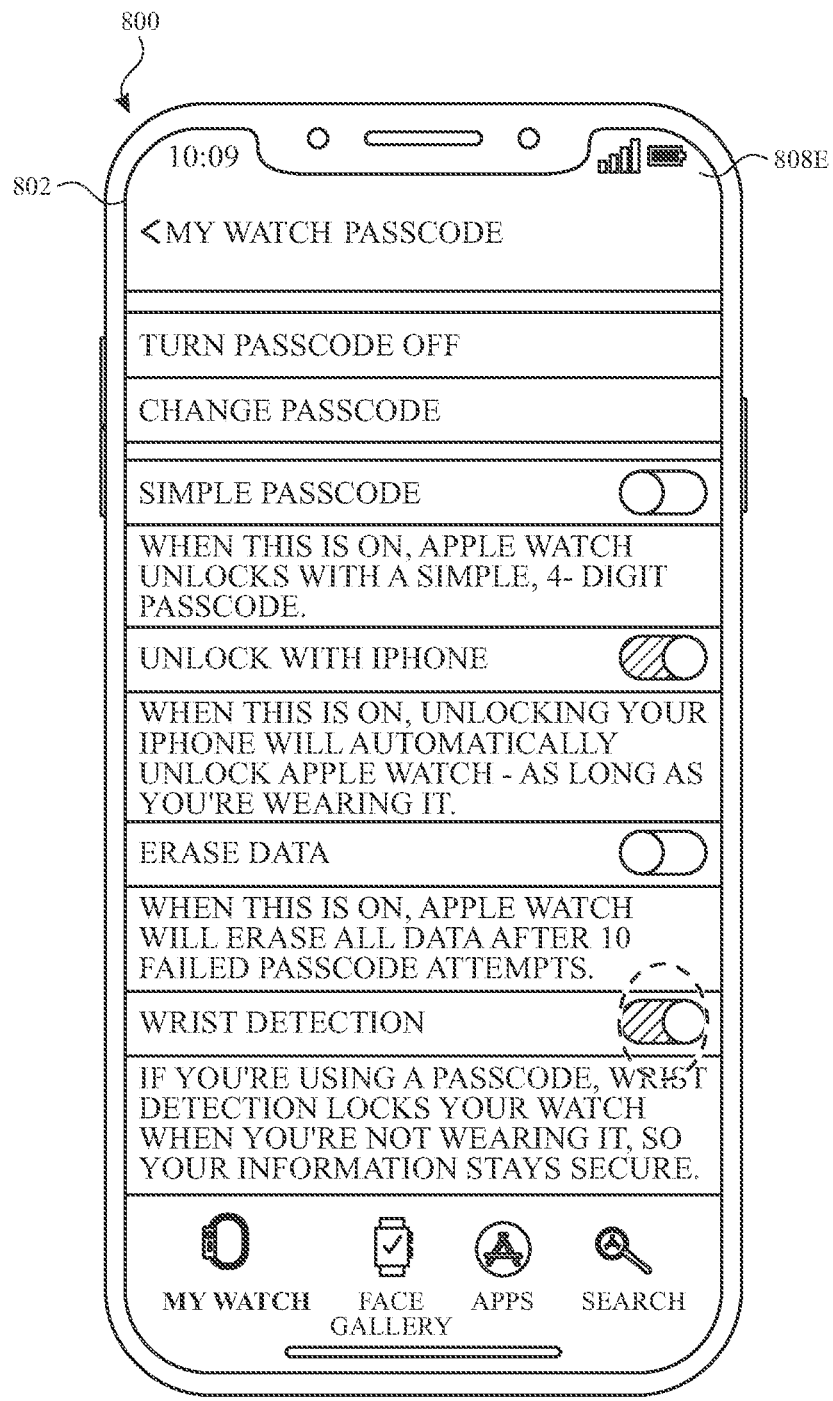
Figure 8L:
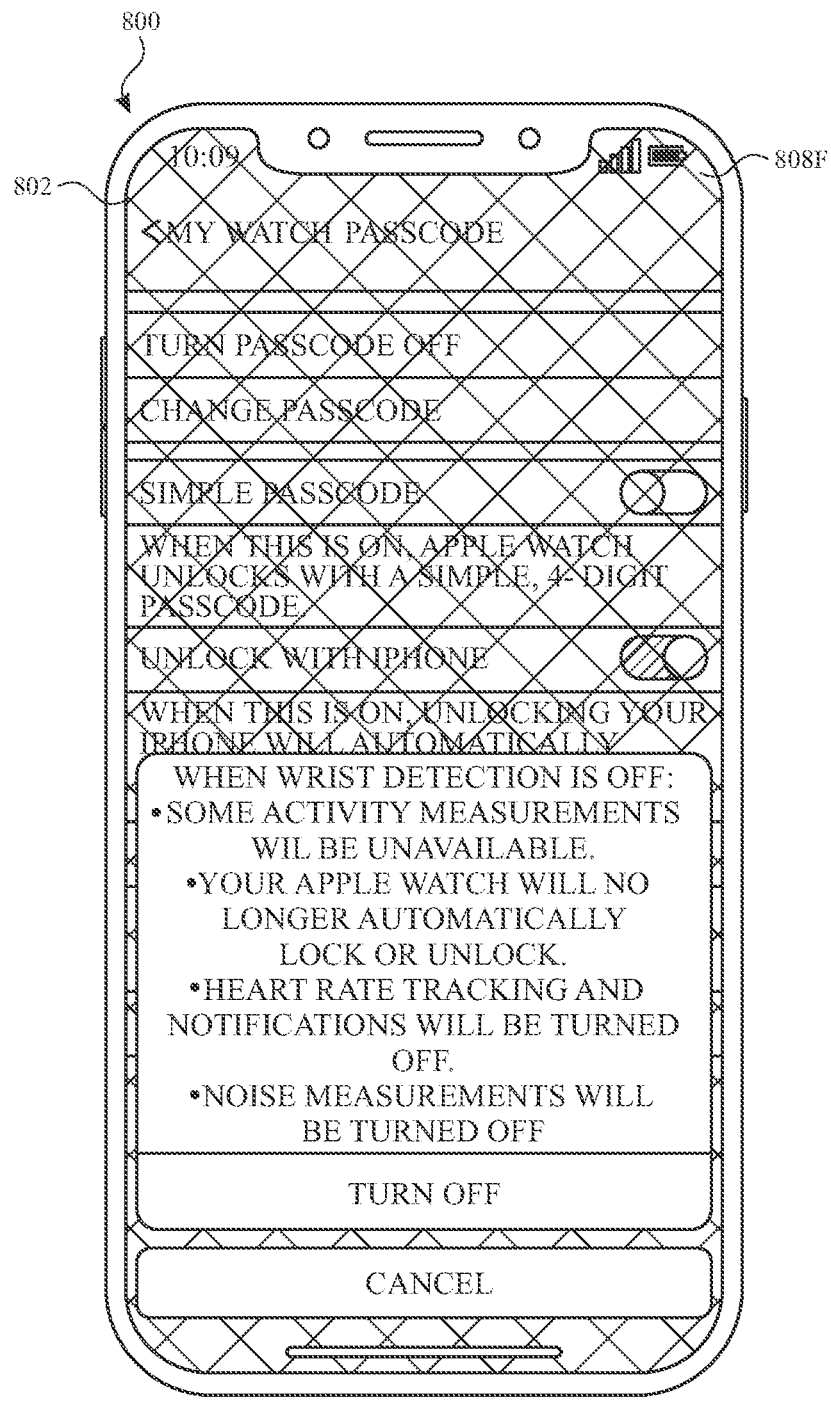

FIGS. 8J-8K depict user interfaces for enabling and disabling noise measurement on device 800. In some embodiments, measurements on a device external to device 800 (e.g., a device used to obtain environmental noise exposure data for display via the user interfaces described above) may be turned off or deactivated in response to disabling other features on a device external (e.g., wrist detection).

FIGS. 9A-9G illustrate exemplary user interfaces for monitoring noise levels (e.g., exposure to noise due from media devices), in accordance with some embodiments. The user interfaces in these figures are used to illustrate the processes described below, including the processes in FIG. 10.

Figure 9A:
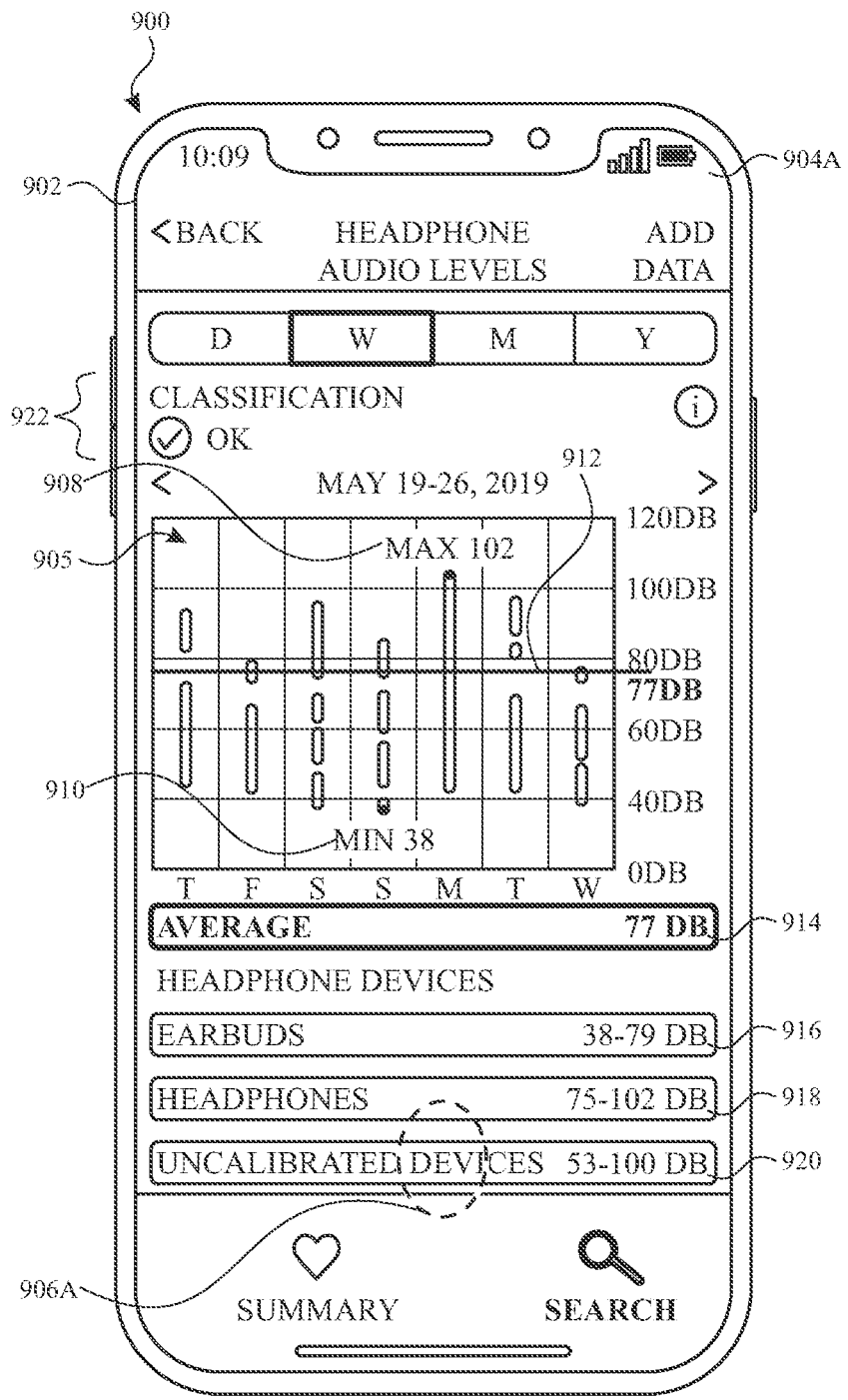
FIGS. 9A-9G illustrate user interfaces for monitoring audio exposure levels in accordance with some embodiments.
Figure 10:
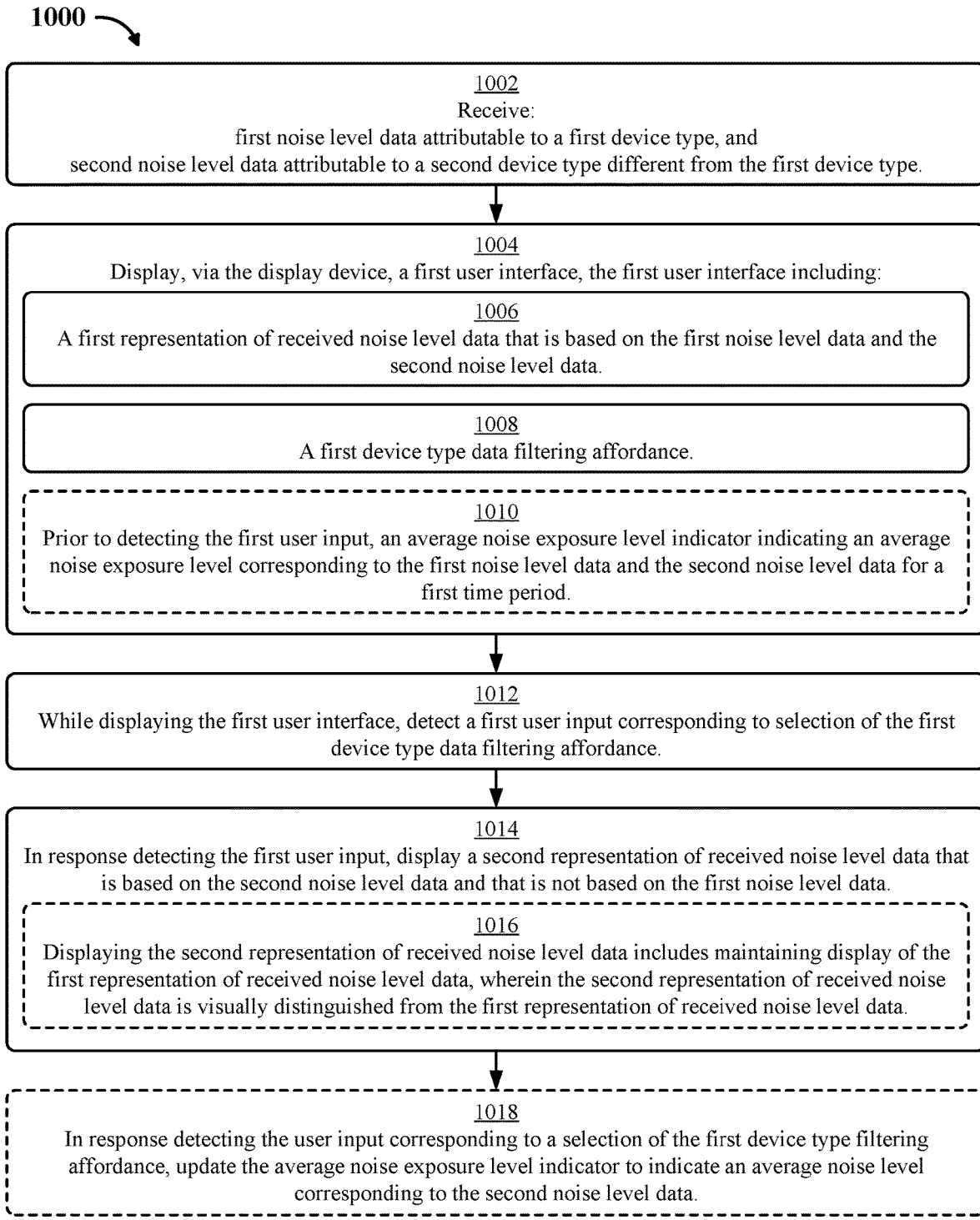
FIG. 10 is a flow diagram illustrating a method for monitoring audio exposure levels using an electronic device, in accordance with some embodiments.

FIG. 9A depicts device 900 displaying user interface 904A on display 902. As depicted in FIG. 9A, user interface 904A includes chart 906 depicting a set of daily audio amplitude values (e.g., corresponding to the range of sound levels experienced by a user of device 900 due to use of connected audio output devices) over a 7-day period. In some embodiments, audio amplitude values are determined based on an output volume setting of device 900 (e.g., audio levels are not measured via a microphone). In some embodiments, audio amplitude values (e.g. levels of sound exposure due to device use) are estimated or extrapolated based on a known output device response (e.g., sensitivity, frequency response, etc.). As depicted in FIG. 9A, chart 905 includes maximum indication 908 and minimum indication 910, representing the highest and lowest audio amplitude levels experienced by a user of device 900 due to use of connected audio output devices.

As depicted in FIG. 9A, average affordance 914 is displayed in a selected state (e.g., it was previously selected via a user input or was selected by default upon display of user interface 904A). Average affordance 914 includes a value indicating an average audio level over the set of displayed audio amplitude values (e.g., "77 DB").

Chart 905 includes an overlay line corresponding the average audio level indicated by average affordance 914 (e.g. overlay 912). In some embodiments, the average audio level is not an average of the displayed data but rather a time-based average of underlying data (e.g., an average based on how long a user was exposed to each level (e.g., sound pressure level) depicted by the data in chart 905). In some embodiments, the data depicted by chart 905 represents the audio amplitudes levels a device user has been exposed to over the course of a day or other period of time (e.g., hour, week, year, month). As depicted in FIG. 9A, user interface 904A includes an audio classification indicator 922, which provides a non-numeric indication (e.g., an indication including graphics and/or text) of the average audio level relative to a threshold (e.g., a predetermined 80 DB threshold). As depicted in FIG. 9A, the audio classification indicator 922 indicates that the average audio level (e.g., 77 DB) is below an 80 DB threshold with an "OK" and a check mark graphic.

As depicted in FIG. 9A, user interface 904A includes device type filtering affordances (e.g., affordances associated with a specific type of device) for emphasizing data in chart 905 attributable to each respective device type (e.g., emphasizing a subset of the set of daily audio amplitude values included in chart 905 of FIG. 9A). Each device type filtering affordance (e.g., earbuds filtering affordance 916, headphones filtering affordance 918, uncalibrated devices affordance 920) includes an associated range representing the highest and lowest audio amplitude levels experienced by a user of device 900 due to use devices of the respective device type. In some embodiments, a device type corresponds to a single device. In some embodiments, a single device includes a pair (e.g., left and right) of connected devices.

Figure 9B:
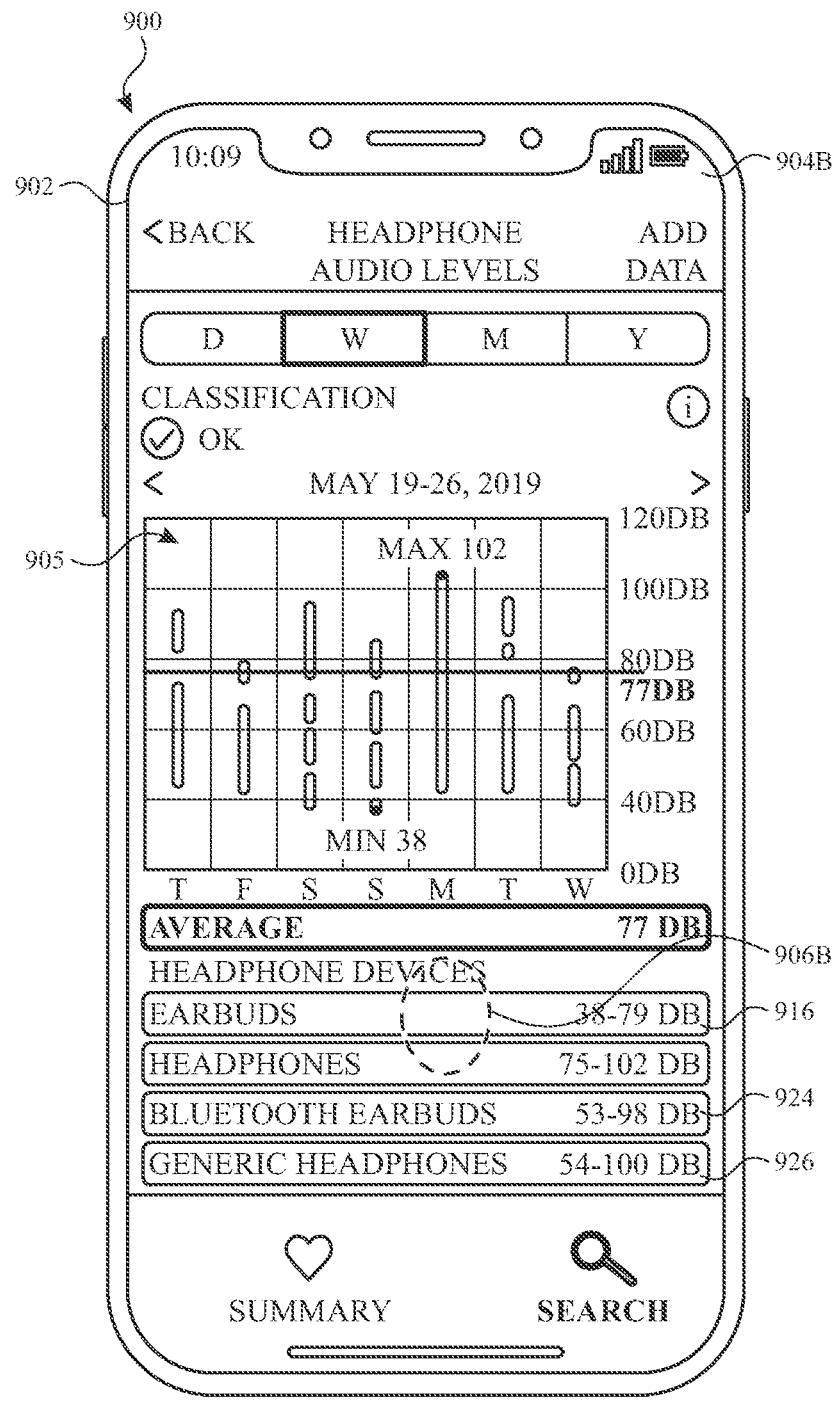

FIG. 9A depicts device 900 receiving user input 906A (e.g., a tap) on uncalibrated device affordance 920. In response to receiving user input 906A, device 900 displays user interface 904B. As depicted in FIG. 9B, uncalibrated device affordance 920 is replaced by Bluetooth earbuds affordance 924 and generic headphones affordance 926, each corresponding to an audio output device coupled (e.g., wirelessly or physically) to device 900 (e.g. audio output devices receive analog or digital audio signals generated by device 1100 and convert those into acoustic output).

Figure 9C:
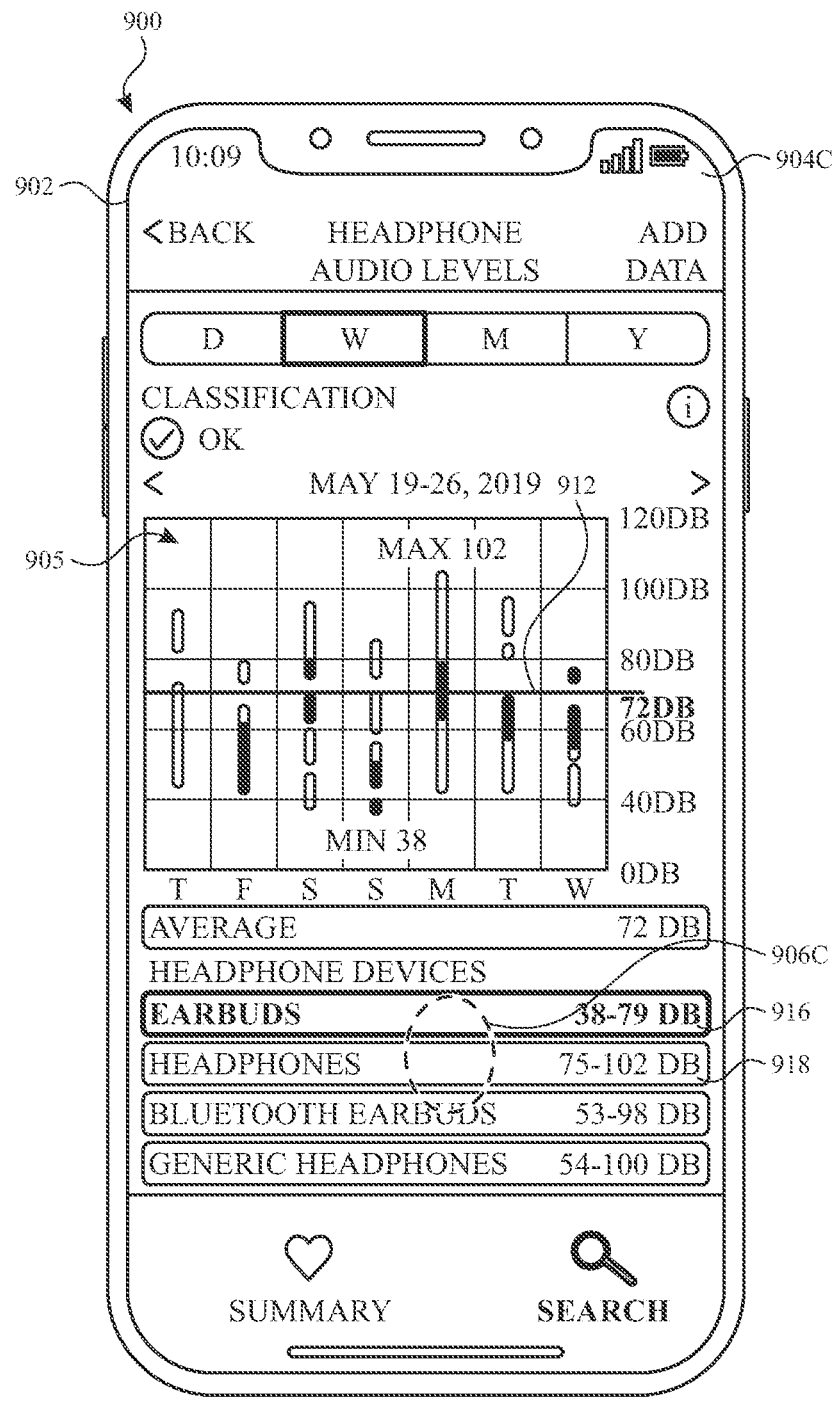

FIG. 9B depicts device 900 receiving user input 906B (e.g., a tap) on earbuds affordance 916. In response to receiving user input 906B, device 900 displays user interface 904C (e.g., an interface emphasizing audio level data associated with earbuds type output devices), as depicted in FIG. 9C. In some embodiments, earbuds type output devices are calibrated devices (e.g., devices with a known frequency response).

As depicted in FIG. 9C, user interface 904C emphasizes audio level data attributable to one or more output devices associated with the earbuds affordance 916. For example, a set of data points (e.g., ranges of audio exposure level data)

attributable to devices corresponding to the selected device type filter (e.g., earbud type devices) are visually distinguished (e.g., by varying on or more visual property such as color, hue, saturation, texture, etc.) from data not attributable to devices corresponding to the selected device type filter (e.g., earbud type devices). As illustrated in FIG. 9C, data attributable to earbud type devices corresponds to black data points on chart 905. In some embodiments, visually distinguishing data (e.g., a set of exposure levels attributable to a first device type includes de-emphasizing noise exposure levels attributable to a second device type by varying one or more visual properties (e.g., brightness, opacity, color, contrast, hue, saturation, etc.).

In addition to emphasizing audio data in response to user input 906C, device 900 updates overlay 912 to depict an average audio level (e.g., 72 DB) based on the emphasized set of noise amplitude values (e.g., the average audio level attributable to earbud device types).

Figure 9D:
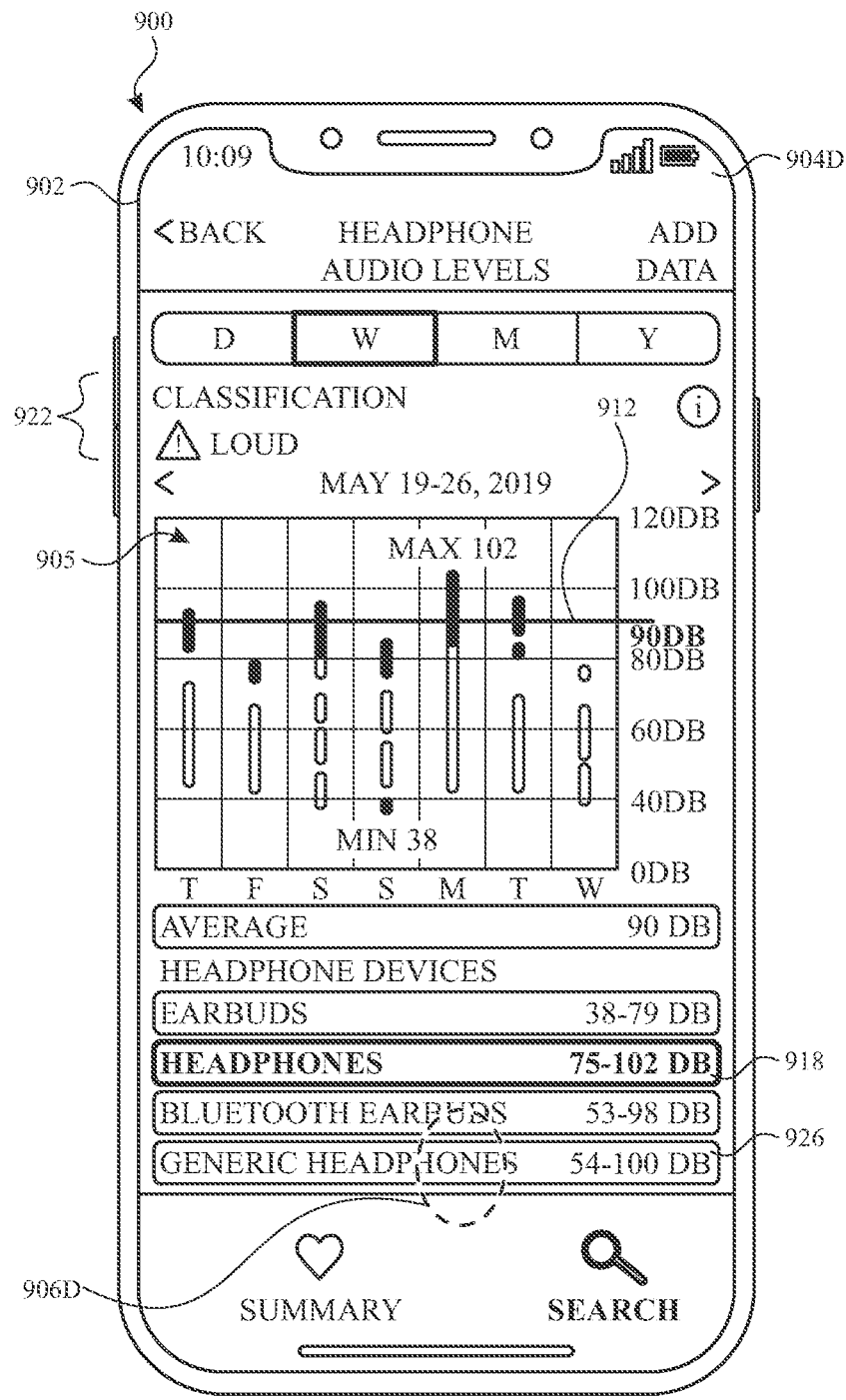

FIG. 9C depicts device 900 receiving user input 906C (e.g., a tap) on headphones affordance 918. In response to receiving user input 906C, device 900 displays user interface 904D (e.g., an interface emphasizing noise level data associated a headphones type output device), as depicted in FIG. 9D. In some embodiments, headphone type output devices are calibrated devices (e.g., devices with a known frequency response).

As depicted in FIG. 9D, user interface 904D emphasizes audio level data attributable to one or more output devices associated with the headphones affordance 918. For example, a set of data points (e.g., ranges of audio exposure level data) attributable to devices corresponding to the selected device type filter (e.g., headphones type devices) are visually distinguished (e.g., by varying on or more visual property such as color, hue, saturation, texture, etc.) from data not attributable to devices corresponding to the selected device type filter (e.g., headphone type devices). As illustrated in FIG. 9D, data attributable to headphones type devices corresponds to black data points on chart 905. In addition to emphasizing audio data in response to user input 906D, device 900 updates overlay 912 to depict an average audio level (e.g., 90 DB) based on the emphasized set of noise amplitude values (e.g., the average audio level attributable to headphones device types). Device 900 also updated, audio classification indicator 922 to indicate that the average audio level (e.g., 90 DB) has exceeded an 80 DB threshold with an "LOUD" and caution graphic.

Figure 9E:
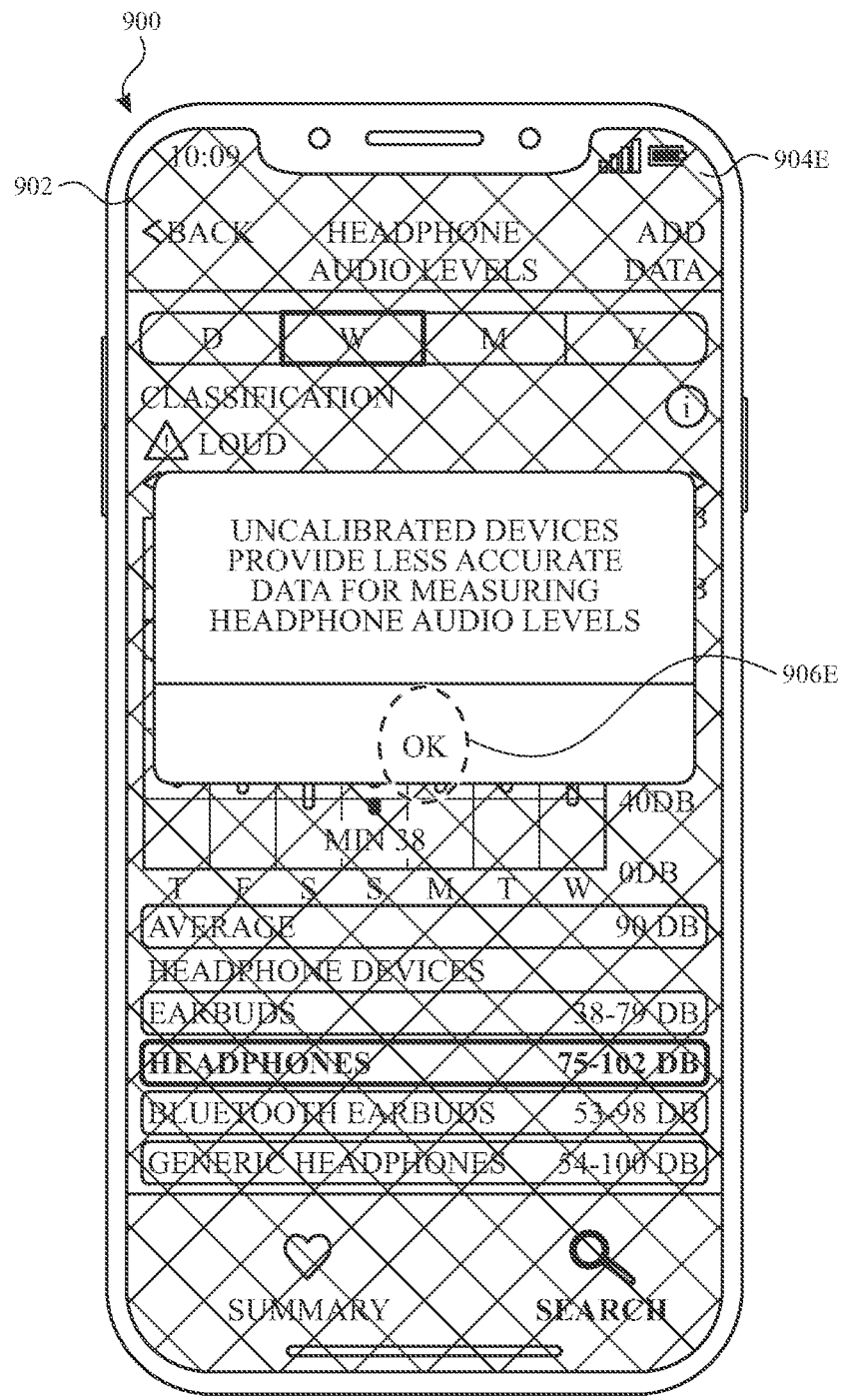

FIG. 9D depicts device 900 receiving user input 906D (e.g., a tap) on generic headphones affordance 926. In response to receiving user input 906D, device 900 displays user interface 904E (e.g., a warning prompt interface), as depicted in FIG. 9E. User interface 904E informs a user that the audio levels based on uncalibrated devices may not be accurate. For example, device 900 cannot accurately extrapolate audio exposures levels without data characterizing the response of a given output device (e.g., a headphone frequency response curve).

FIG. 9E depicts device 900 receiving user input 906E (e.g., a tap) on an acknowledgement affordance (e.g., "OK"). In response to receiving user input 906E, device 900 displays user interface 904F (e.g., an interface emphasizing noise level data associated generic headphones type output devices) as depicted in FIG. 9F.

Figure 9F:
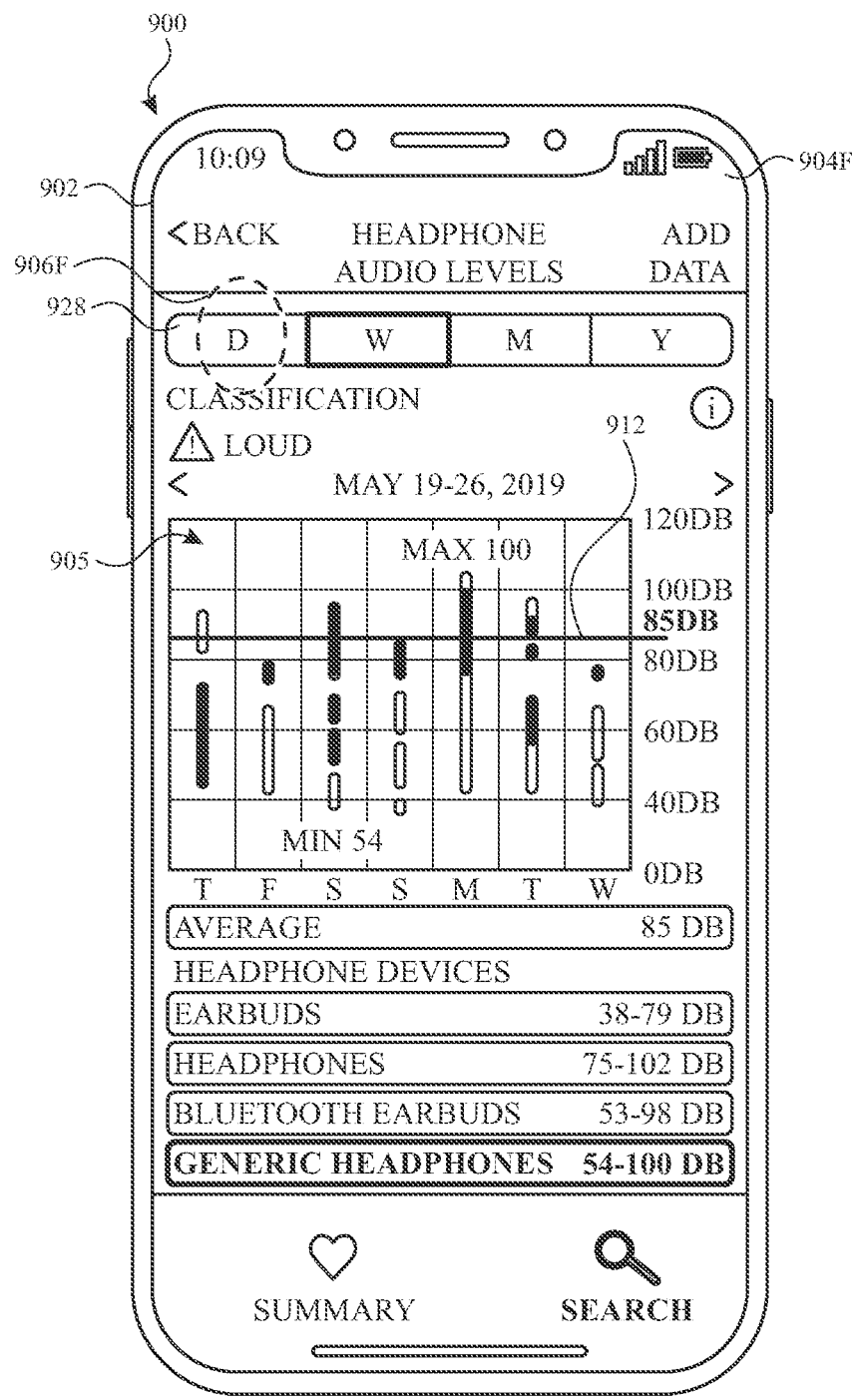

As depicted in FIG. 9F, user interface 904F emphasizes audio level data attributable to one or more output devices associated with generic headphones affordance 926. For example, a set of data points (e.g., ranges of audio exposure level data) attributable to devices corresponding to the selected device type filter (e.g., generic headphones type devices) are visually distinguished (e.g., by varying on or more visual property such as color, hue, saturation, texture, etc.) from data not attributable to devices corresponding to the selected device type filter (e.g., generic headphones type devices). As illustrated in FIG. 9E, data attributable to generic headphones type devices corresponds to black data points on chart 905. In addition to emphasizing audio data in response to user input 906E, device 900 updates overlay 912 to depict an average audio level (e.g., 85 DB) based on the emphasized set of noise amplitude values (e.g., the average audio level attributable to generic headphones device types).

FIG. 9F depicts device 900 receiving user input 906F (e.g., a tap) on day time-scale affordance 928. In response to receiving user input 906E, device 900 displays user interface 904G (e.g., an interface emphasizing noise level data associated generic headphones type output devices over a day period) as depicted in FIG. 9F.

As depicted in FIG. 9F, in response receiving user input 906E device displays audio level data corresponding to Saturday May 22 (e.g. center day of the 7-day period displayed throughout FIGS. 9A-9F). In some embodiments, audio exposure levels corresponding to a day other than the center day (e.g., a current day of audio exposure level) are displayed by chart 905.

Figure 9G:
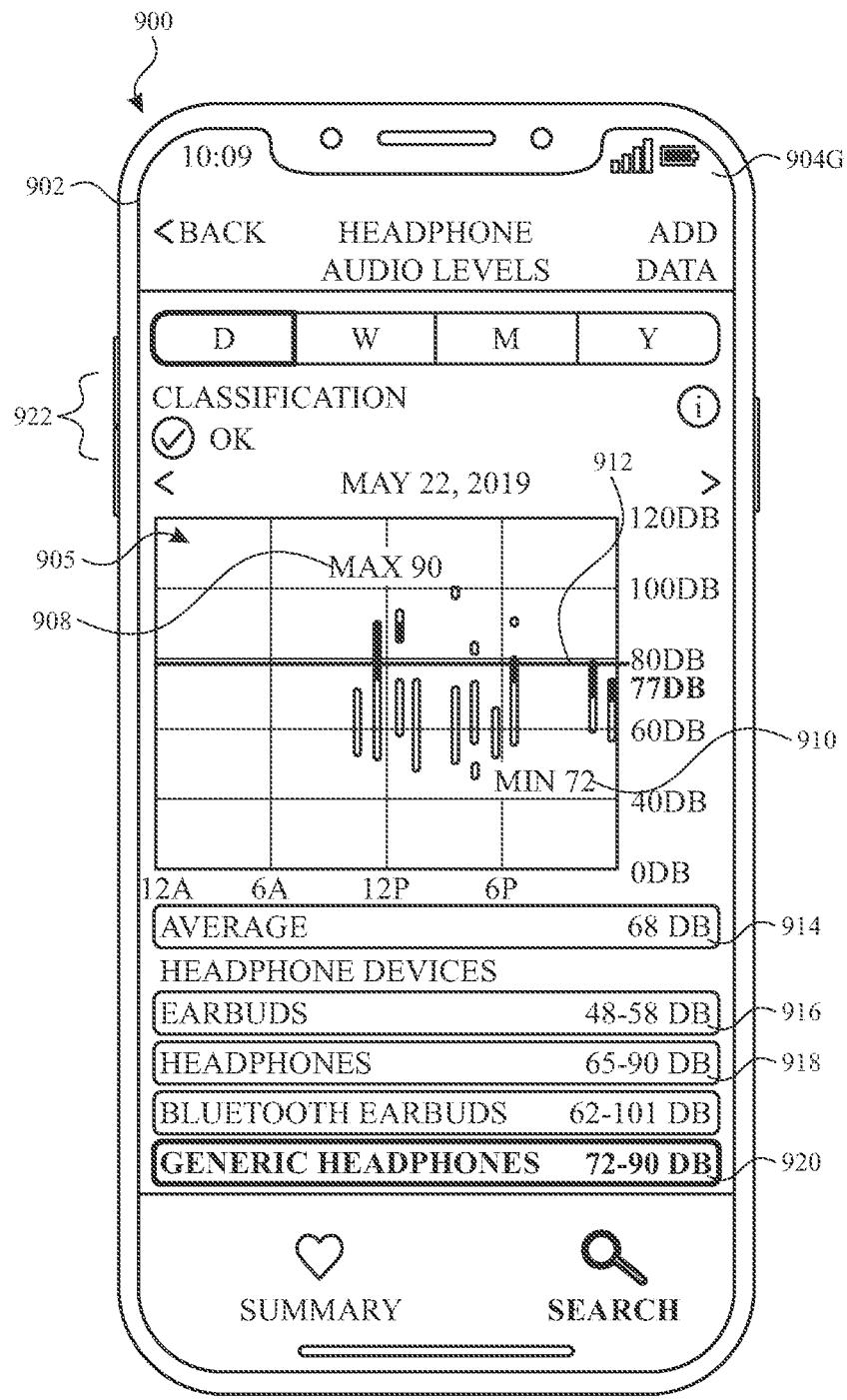

As depicted in FIG. 9G, user interface 904G emphasizes audio level data attributable to one or more output devices associated with generic headphones affordance 926 over 24-hour period (e.g., a day). For example, a set of data points (e.g., ranges of audio exposure level data) attributable to devices corresponding to the selected device type filter (e.g., generic headphones type devices) are visually distinguished (e.g., by varying on or more visual property such as color, hue, saturation, texture, etc.) from data not attributable to devices corresponding to the selected device type filter (e.g., generic headphones type devices). As illustrated in FIG. 9G, data attributable to generic headphones type devices corresponds to black data points on chart 905. In addition displaying emphasized audio data for a different time period in response to user input 906F, device 900 updates maximum indication 908, minimum indication 910, overlay 912, average affordance 914, earbuds filtering affordance 916, headphones filtering affordance 918, generic headphones filtering affordance 920, and audio level classification 922 to depict an audio levels (e.g., 85 DB) based on the emphasized set of noise amplitude values (e.g., the average audio level attributable to generic headphones device types) within the displayed 24-hour time period. For example, average affordance 914 updated to indicate a daily average audio level of 68 DB (e.g., compared to the 85 DB weekly average audio level as depicted in FIGS. 9A-9F).

FIG. 10 is a flow diagram illustrating a method for monitoring noise exposure levels using an electronic device, in accordance with some embodiments. Method 1000 is performed at an electronic device (e.g., 100, 300, 500, 600, 800, 900, and 1100) with a display device and a touch-sensitive surface. Some operations in method 1000 are, optionally, combined, the orders of some operations are, optionally, changed, and some operations are, optionally, omitted.

As described below, method 700 provides an intuitive way for monitoring noise exposure levels. The method reduces the cognitive burden on a user to monitor noise exposure levels, thereby creating a more efficient human-machine interface. For battery-operated computing devices, enabling a user to monitor noise exposure levels faster and more efficiently conserves power and increases the time between battery charges.

The electronic device receives (1002) first noise level data attributable to a first device type (e.g., uncalibrated devices, such as wired headphones connected to the electronic device via a port (e.g., a headphone jack) or uncalibrated wireless headphones). The electronic device receives (1002) second noise level data attributable to a second device type (e.g., calibrated devices, such as calibrated wireless headphones) different from the first device type. In some embodiments, the electronic device identifies the first and second noise level data based on one or more output signals (e.g., voltages, digital audio data, etc.) sent by the electronic device to an output device of the first type.).

The electronic device displays (1004), via the display device (e.g., 902), a first user interface (e.g., 904A). In some embodiments, the first user interface is displayed in response to a user request (e.g., request to view a UI of noise application through search feature of health app or notifications in discover tab of health app). The first user interface includes a first representation of received noise level data that is based on the first noise level data and the second noise level data (e.g., a graph showing combined data or concurrently showing separate data for each of the first and second noise level data) (1006) (e.g., 905 in FIG. 9A). The first user interface includes a first device type data filtering affordance (1008) (e.g., 916). Including the first representation of received noise level data that is based on the first noise level data and the second noise level data in the first user interface (e.g., as a graph) visually informs a user of the noise level data in an easily understandable and recognizable manner. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

While displaying the first user interface, the electronic device detects (1012) a first user input corresponding to selection of the first device type data filtering affordance (e.g., 916, 918, 926).

In response detecting the first user input, the electronic device displays (1014) a second representation of received noise level data that is based on the second noise level data and that is not based on the first noise level data (e.g., a second representation (e.g., a separate graph, a visual emphasis on the first representation) that emphasizes noise level data from calibrated devices compared to the depiction of noise level data in the first representation) (e.g., 905 in FIGS. 9C-9D, 9F, and 9G). Displaying the second representation of the received noise level data that is based on the second noise level data and that is not based on the first noise level data (e.g., as a separate graph) in response detecting the first user input enables a user to more easily view information corresponding to the second noise level data. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, as part of displaying the second representation of received noise level data, the electronic device maintains (1016) display of the first representation of received noise level data (e.g., 905 in FIGS. 9C and 9D-9G). In some embodiments, the second representation of received noise level data is visually distinguished from the first representation of received noise level data (e.g., 905 in FIGS. 9C and 9D-9G). In some embodiments, visually distinguishing data (e.g., a set of exposure levels attributable to the second output device type) includes de-emphasizing noise exposure levels attributable to the first device type data by varying one or more visual properties (e.g., brightness, opacity, color, contrast, hue, saturation) (e.g., 905 in FIGS. 9C and 9D-9G). In some embodiments, visually distinguishing data includes emphasizing noise exposure levels attributable to the second device type by varying one or more visual properties (e.g., brightness, opacity, color, contrast, hue, saturation) (e.g., 905 in FIGS. 9C and 9D-9G).

In some embodiments, the second noise level data corresponds to noise level data attributable to a single device. In some embodiments, a single device includes a pair of linked devices (e.g., wirelessly linked left and right headphones).

In some embodiments, the first noise level data corresponds to noise level data attributable to a plurality of devices (e.g., a plurality of sets of linked devices (e.g., pairs of linked wireless headphones).

In some embodiments, the second noise level data includes third noise level data attributable to a third device type (e.g., data from an additional calibrated device). In some embodiments, the first user interface includes a second device type filtering affordance corresponding to the third noise level data (e.g., an additional calibrated device affordance in additions to the first calibrated device affordance) (e.g., 918). In some embodiments, while displaying the first user interface (e.g., 904C), the electronic device detects a user input corresponding to selection of the second device type filtering affordance (e.g., 906C). In some embodiments, in response detecting the user input corresponding to a selection of the second device type filtering affordance, the electronic device displays a third representation of the third noise level data (e.g., 905 in FIG. 6D). Displaying the third representation of the third noise level data enables a user to more easily view and understand information corresponding to the third noise level data. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the first user interface includes, prior to detecting the first user input, an average noise exposure level indicator (e.g., 912, 914) indicating an average noise exposure level corresponding to the first noise level data and the second noise level data for a first time period (e.g., a day, a week) (1010). In some embodiments, the average noise level indicator includes a check mark or exclamation point, 'LOUD' or 'OK' (e.g., 922). In some embodiments, the average noise level indicator is an overlay line (e.g., 912), textual description, or icon (e.g., 922). Providing an average noise exposure level indicator indicating the average noise exposure level provides a user with a simple and easily recognizable metric to understand the overall noise exposure level. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, in response detecting the user input corresponding to a selection of the first device type filtering affordance (e.g., 916), the electronic device updates (1018) the average noise exposure level indicator to indicate an average noise level corresponding to the second noise level data (e.g., that does not correspond to the first noise level data) (e.g., indicating the average based on only the calibrated data associated with the second device type) (e.g., 912 in FIGS. 9B-9C).

In some embodiments, the second noise level data is based, at least in part, on one or more signals transmitted from the electronic device to one or more devices of the second type (e.g., noise levels are not based on incoming signals or data (e.g., audio levels measured via a microphone). In some embodiments, noise levels are estimated based on a volume setting (e.g., volume at 100%) and a known output device response (e.g., headphones of a first type output 87 dB at 100% for the particular signal being played).

In some embodiments, the first representation of received noise level data includes an indication of the maximum value of the noise level data (e.g., 908) and the minimum value of the noise level data (e.g., values representing the highest and lowest noise levels within the combined first noise level data and second noise level data) for a second time period (e.g., a day, a week) (e.g., 910). In some embodiments, the first representation includes more than one pair of maximum and minimum noise level values (e.g., maximum and minimum values for each day within a week). Note that details of the processes described above with respect to method 1000 (e.g., FIG. 10) are also applicable in an analogous manner to the methods described above. For example, method 700 optionally includes one or more of the characteristics of the various methods described above with reference to method 1000. For example, the graphical indication (e.g., a graphical object) that varies in appearance based on a noise exposure level, as described above in method 700, can be used to display noise exposure level information corresponding to one or more output devices. For brevity, these details are not repeated below.

Figure 11A:
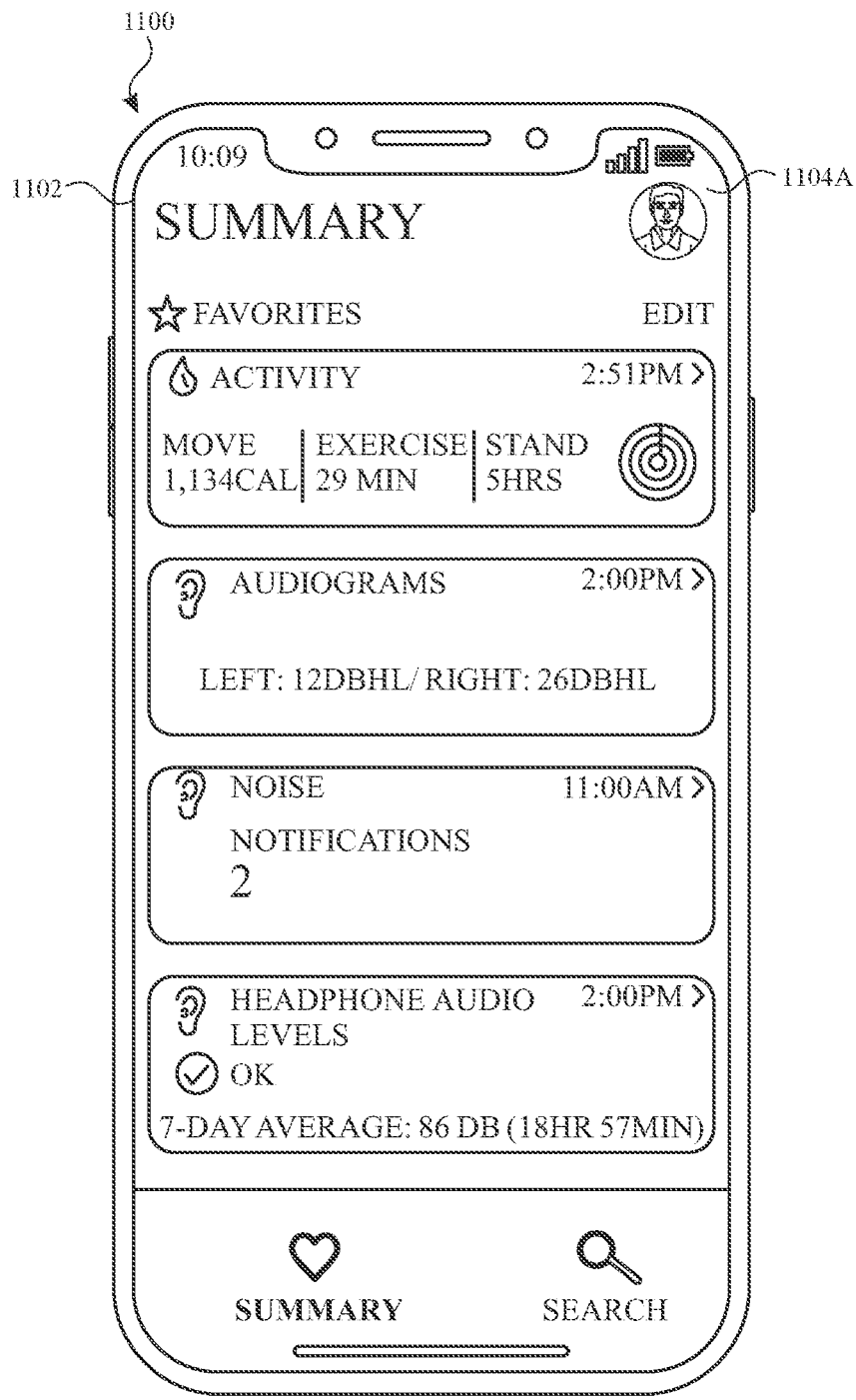
Figure 11B:
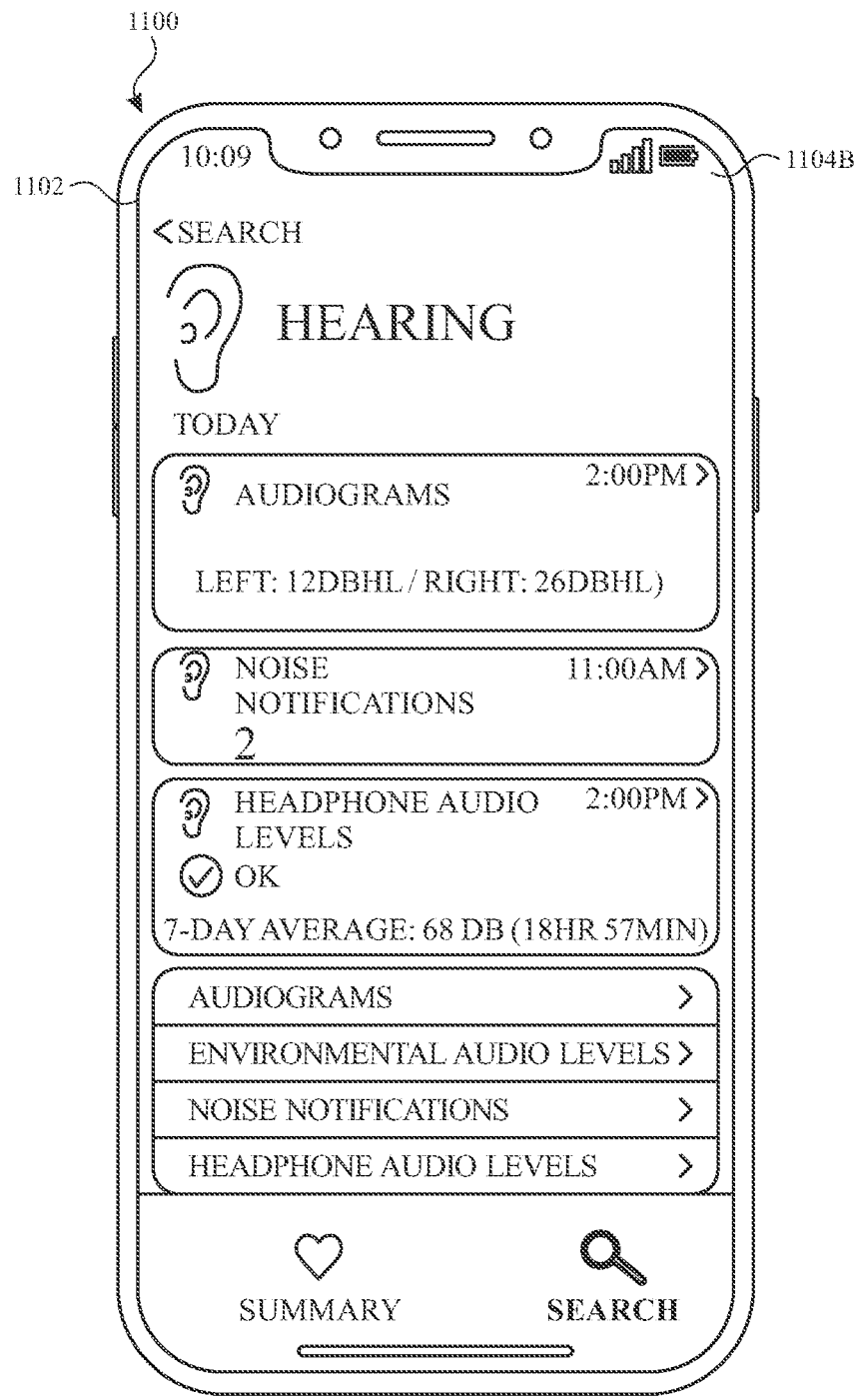
Figure 11C:
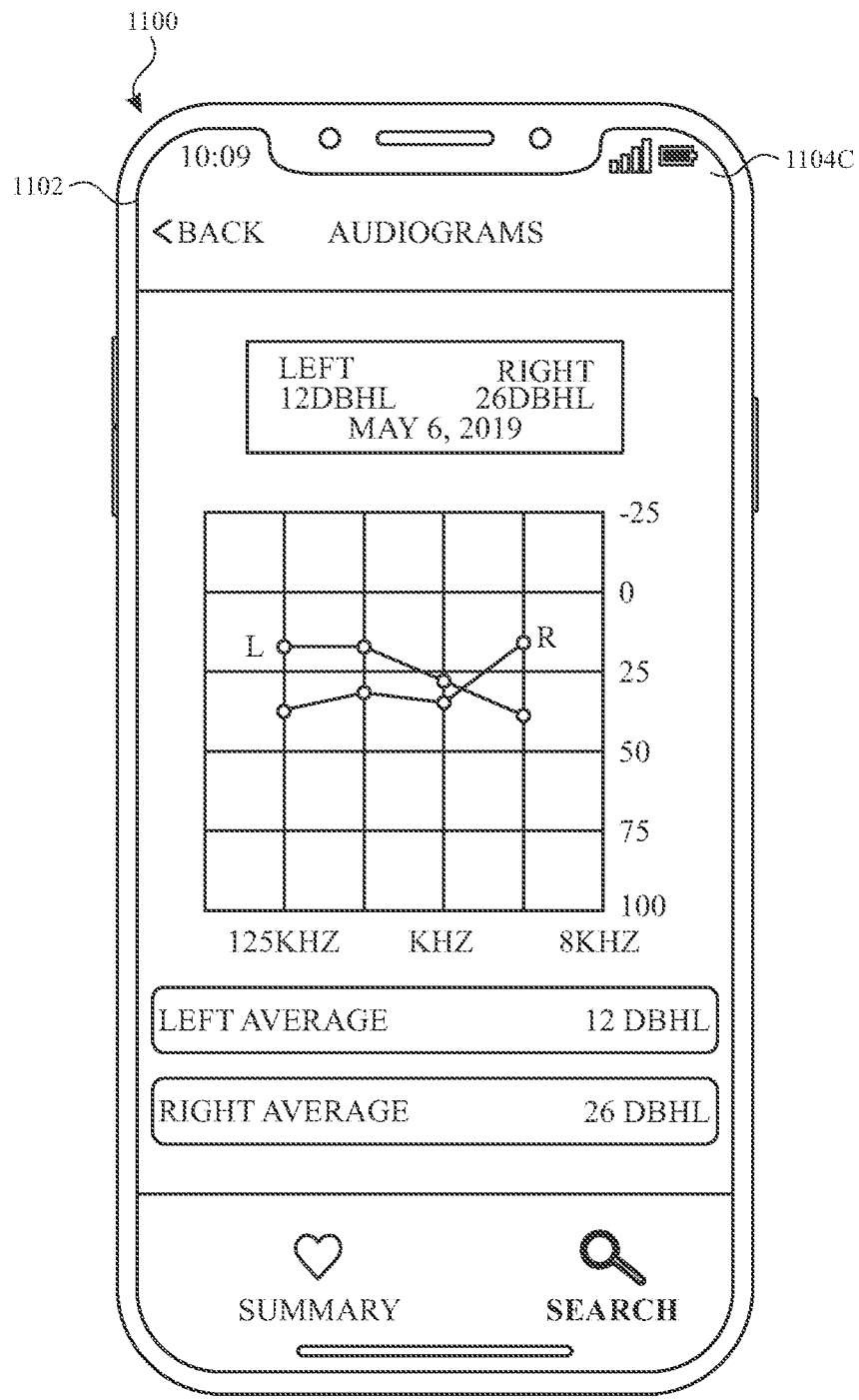
Figure 11D:
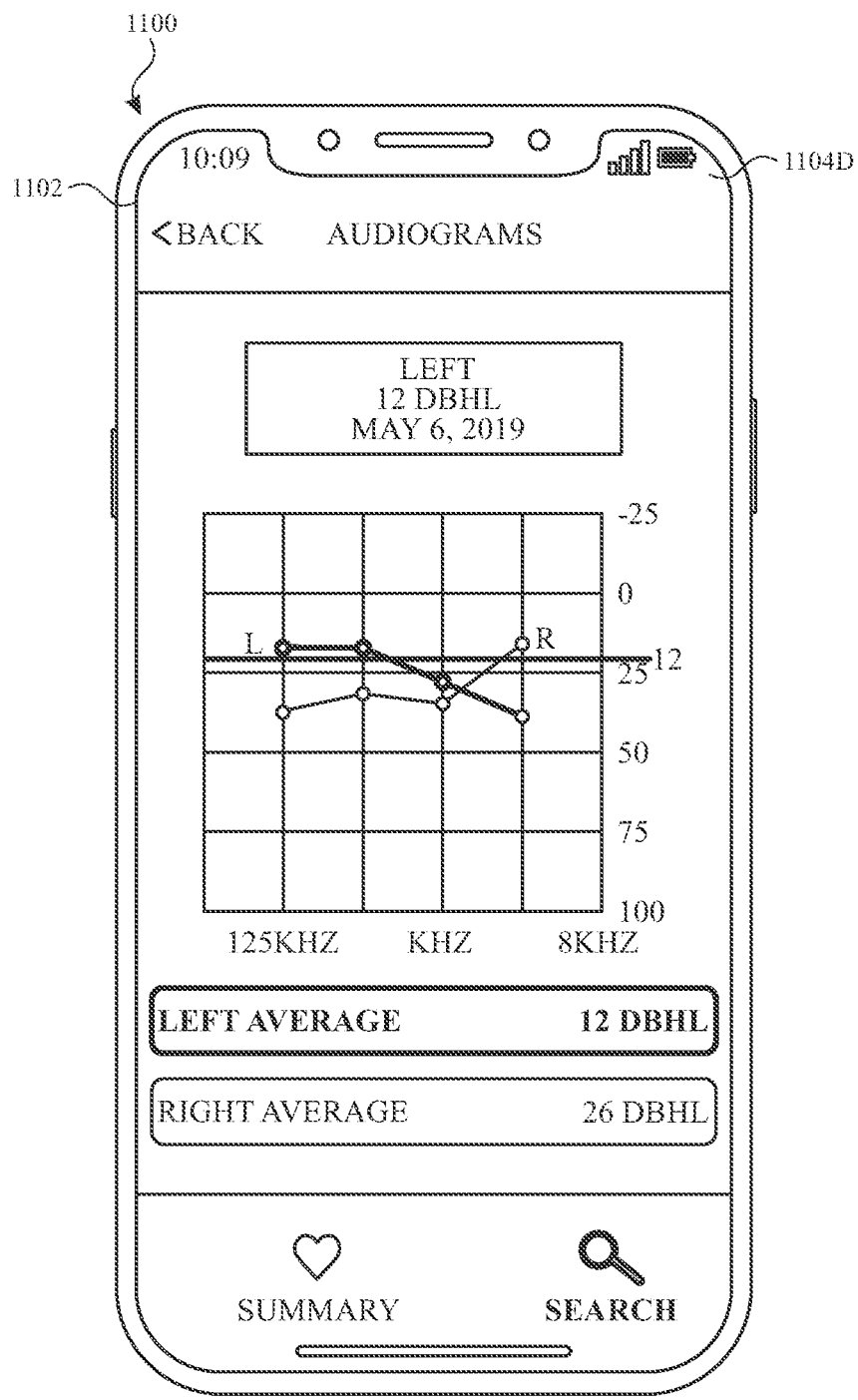
Figure 11E:
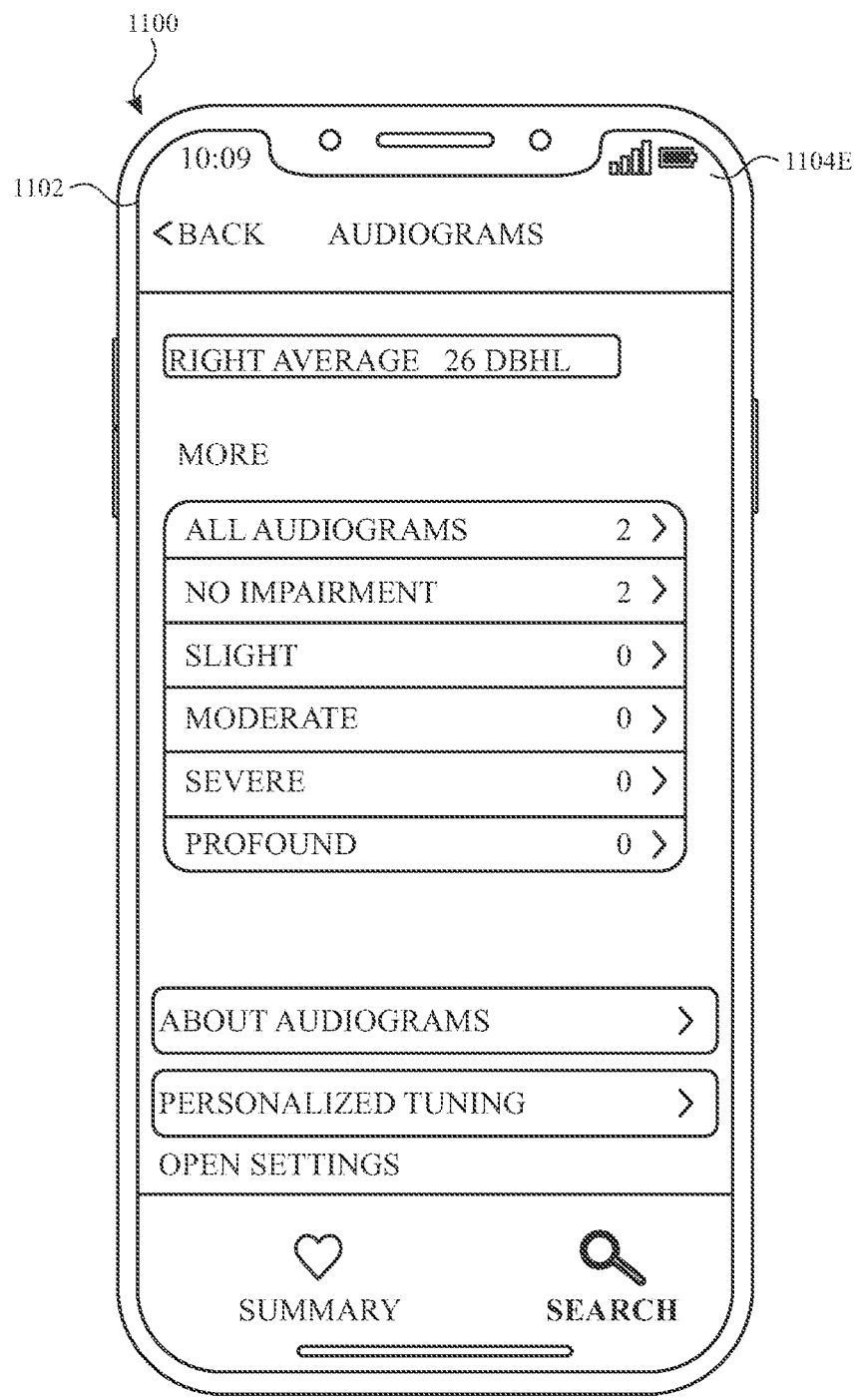
Figure 11F:
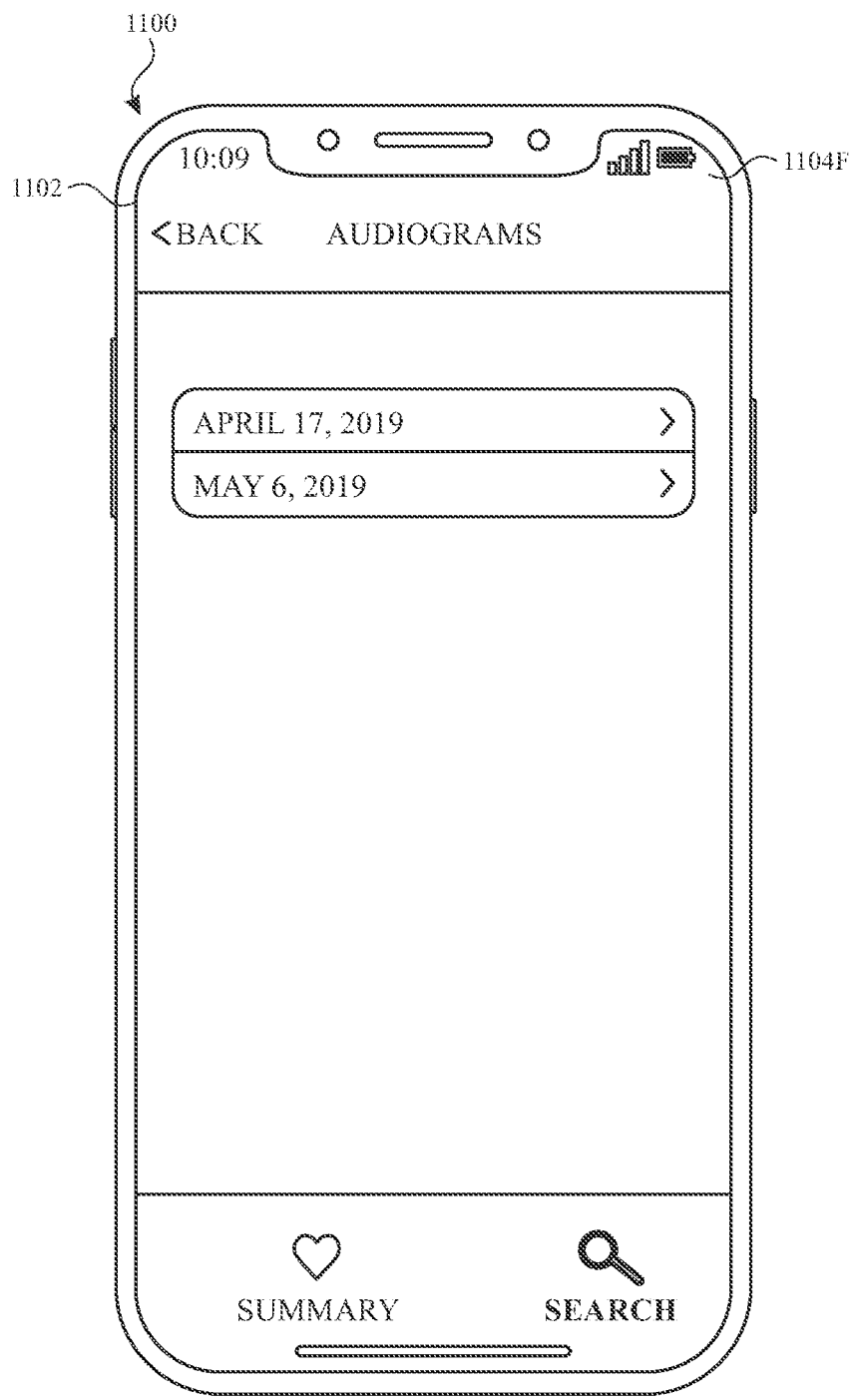
Figure 11G:
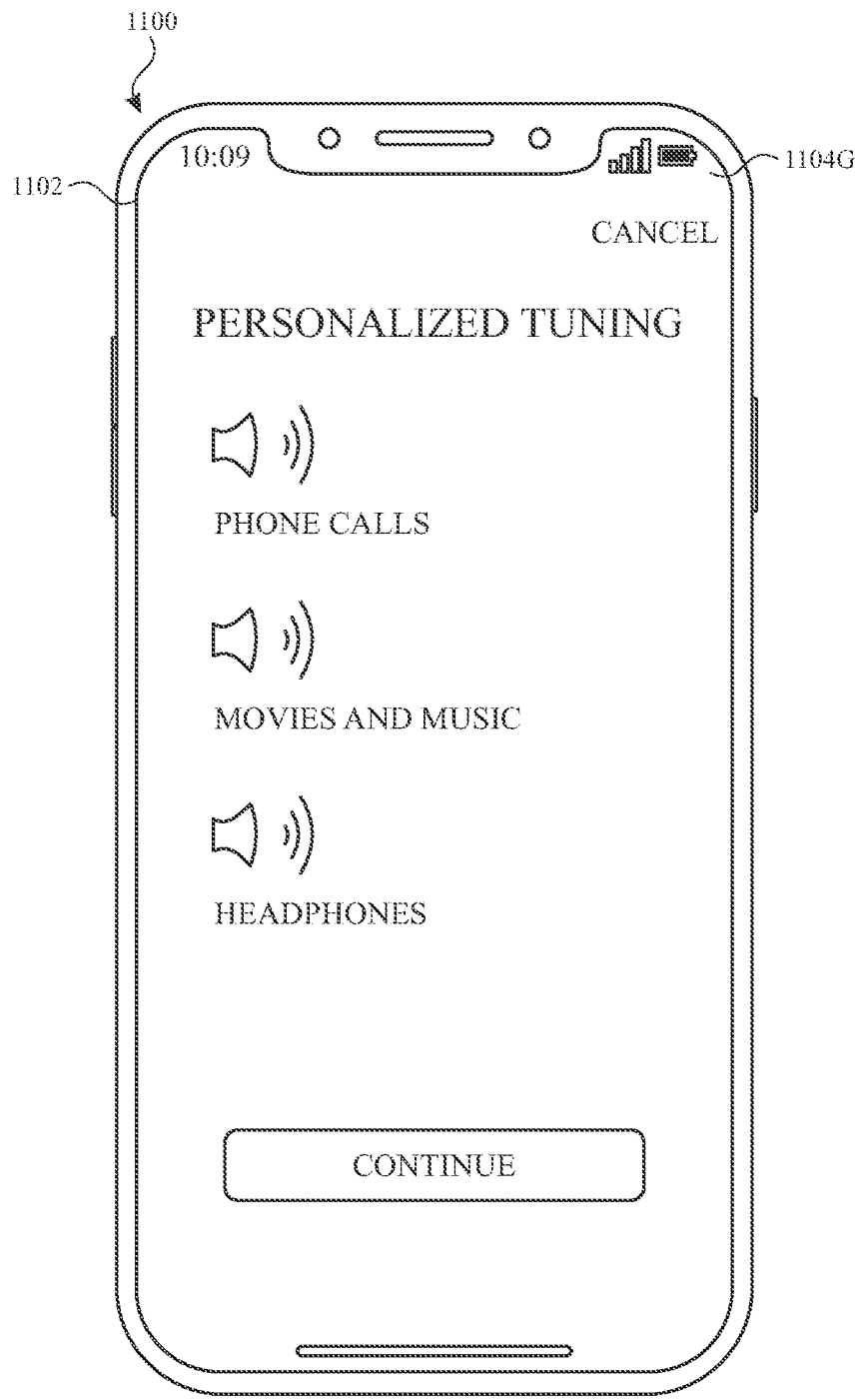

FIGS. 11A-11F depict user interfaces (e.g., 1104A-1104F) for accessing and displaying audiogram data (e.g., sets of data representing hearing impairment at various sound frequencies). In some embodiments, audiogram data is received at device 1100 from a third-party application. In some embodiments, audiogram data is inputted manually by a device user (e.g., via series of user inputs detected by device 1100). For example, FIGS. 11A and 11B illustrate user interfaces within a health application for accessing audiogram noise data. FIGS. 11C-11D illustrate techniques for displaying audiogram data and selecting or visually emphasizing portions of the data (e.g., a portion associated with a left or right side).

Figure 11H:
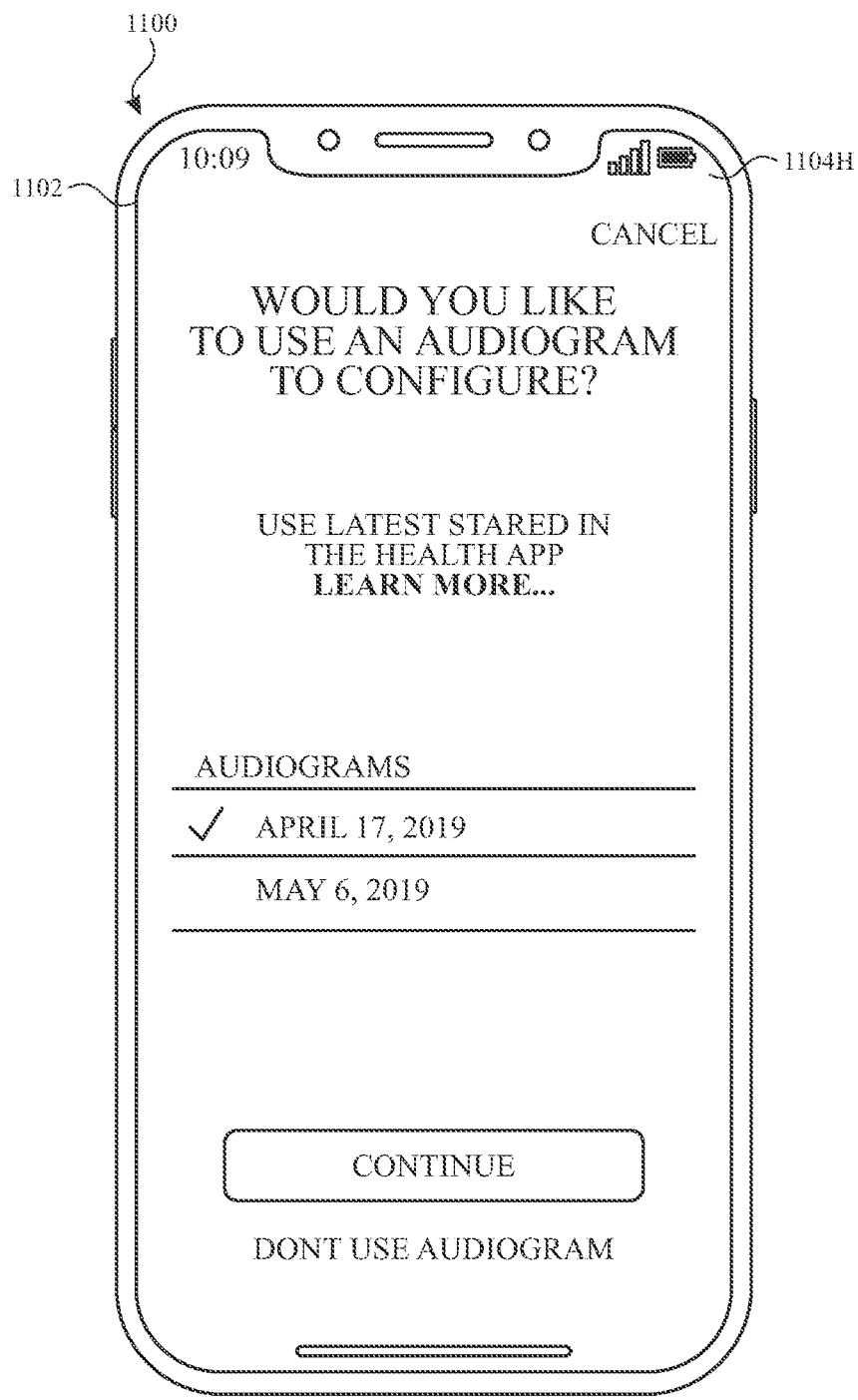
Figure 111:
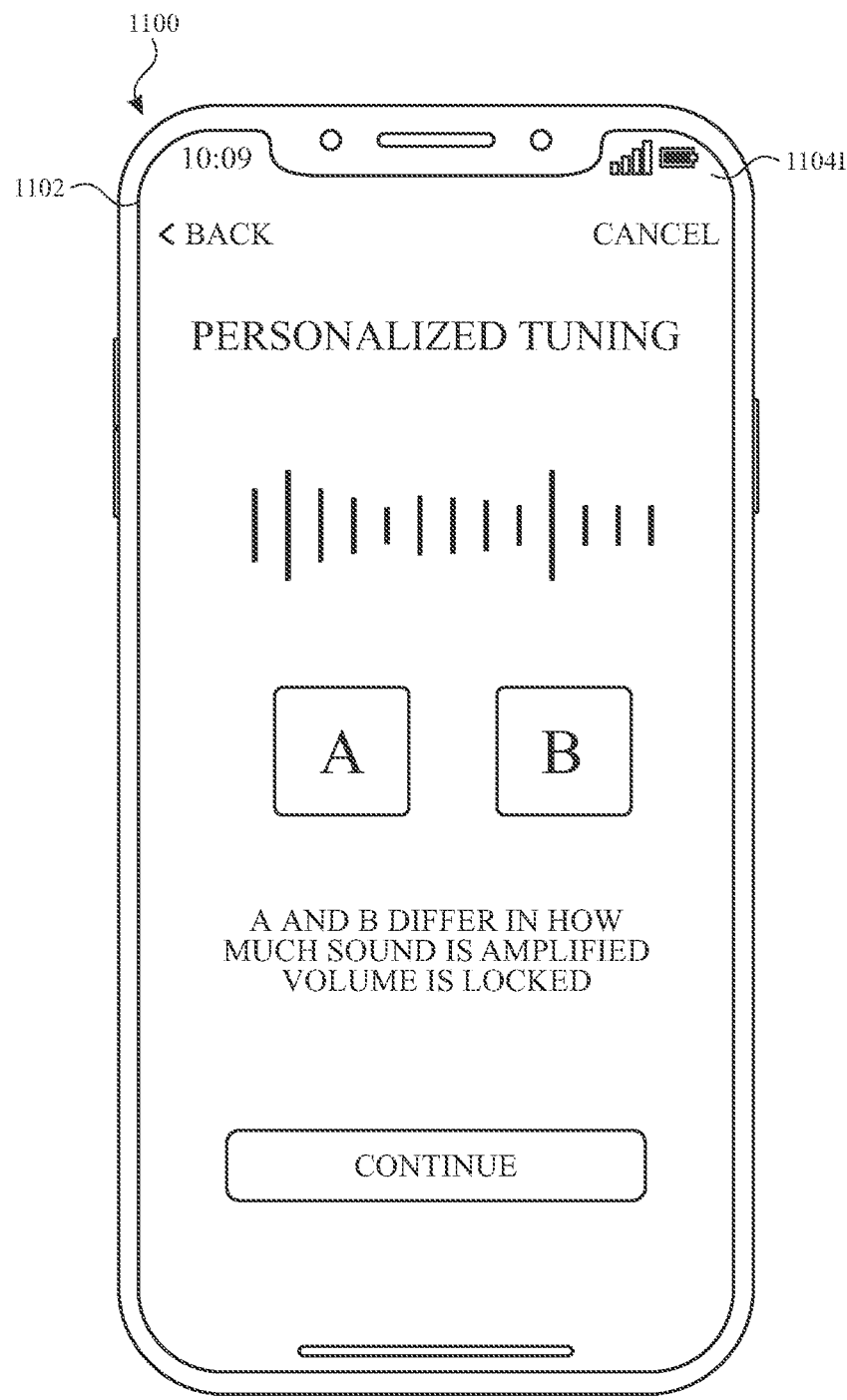
Figure 11J:
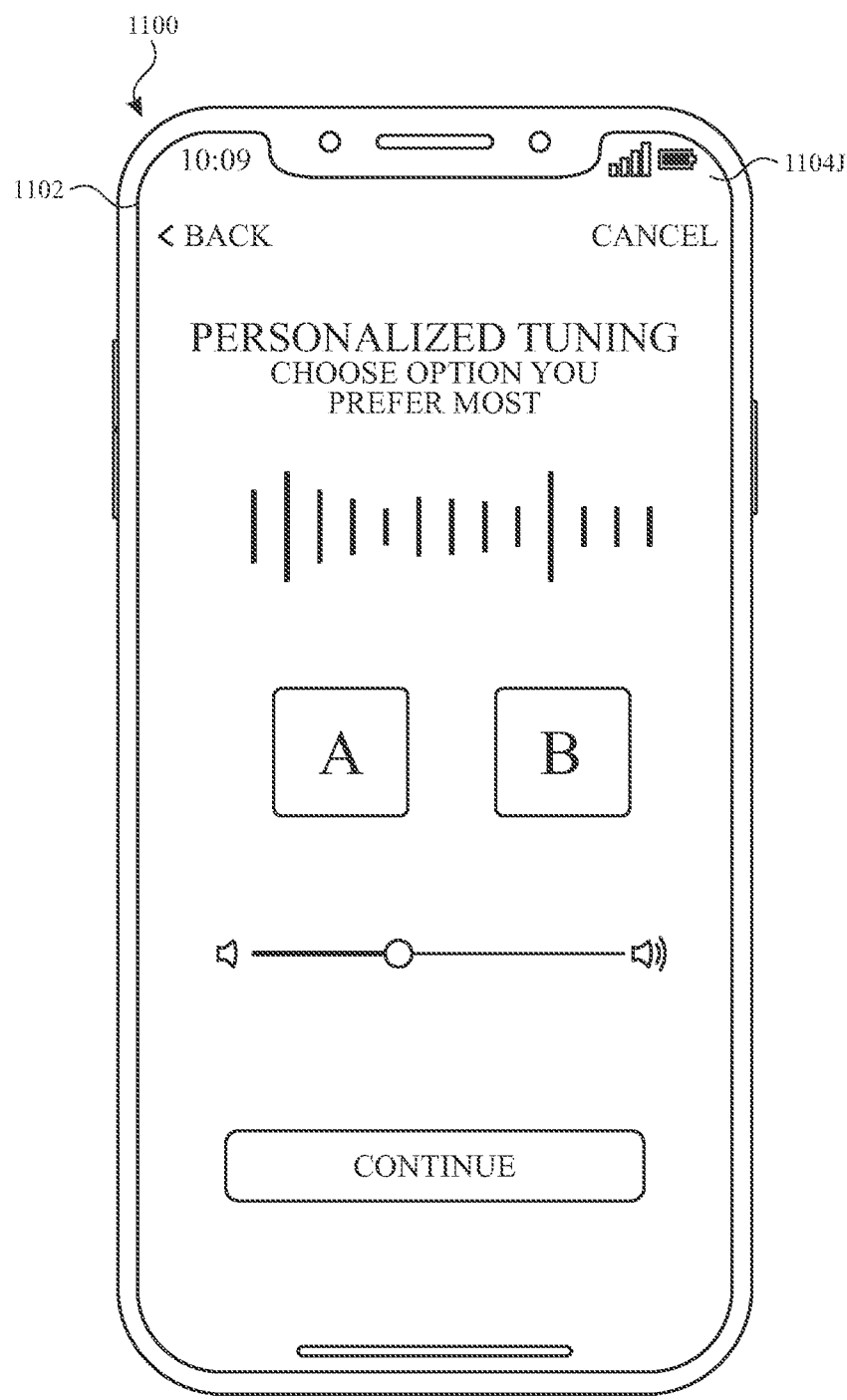
Figure 11K:
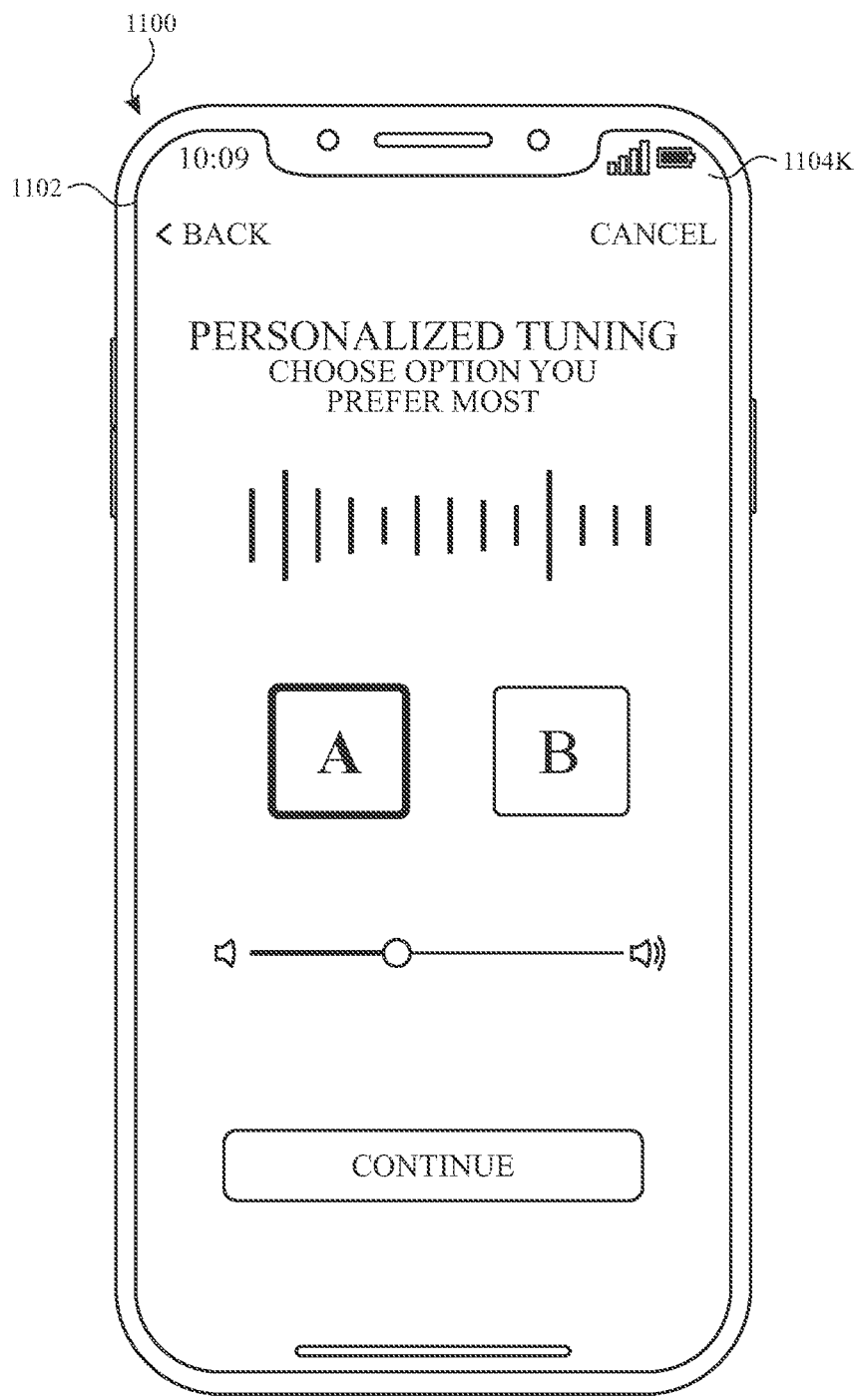
Figure 11L:
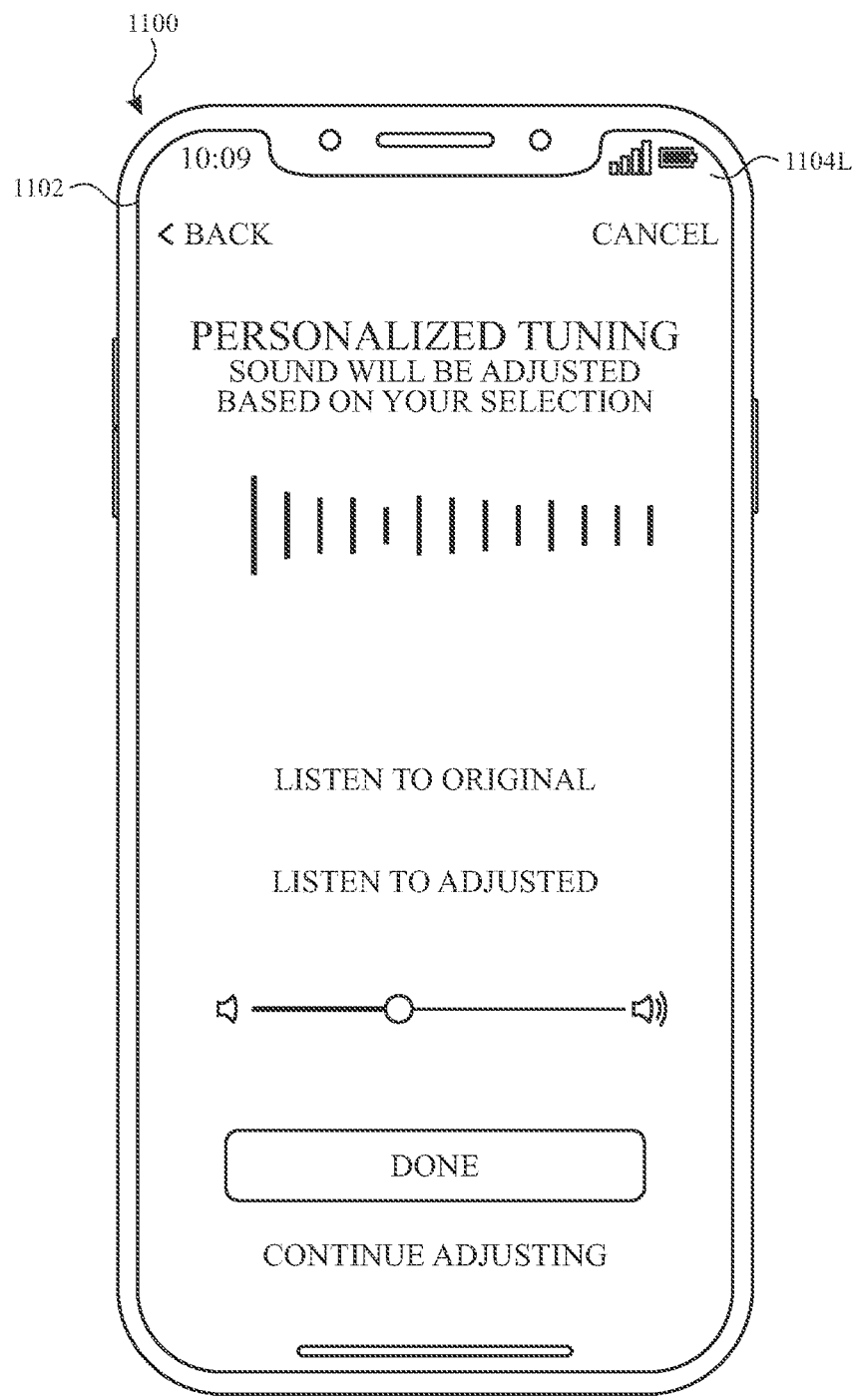

FIGS. 11G-11L depict a series of user interfaces (e.g., 1104G-1104L) for using audiograms to personalize the audio output of device 1100 (e.g., output via devices associated with device 1100 such as connected headphones, integrated headsets or speakers, external speaker, and other media playback devices). For example, FIG. 11H depicts a technique for creating a hearing profile via an A-B testing process hearing test that is supplemented by stored audiogram data. In some embodiments, utilizing audiogram data shortens the process of creating a hearing profile or improves the accuracy the profile compared to a tuning process which does not leverage audiogram data.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

As described above, one aspect of the present technology is the gathering and use of data (e.g., sound recordings, audiograms, etc.) available from various sources to more effectively monitor personal sound exposure levels. The present disclosure contemplates that in some instances, this gathered data may include personal information data that uniquely identifies or can be used to contact or locate a specific person. Such personal information data can include demographic data, location-based data, telephone numbers, email addresses, twitter IDs, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to provide a user with an accurate assessment of personal noise exposure throughout the day. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of monitoring noise exposure levels, the present technology can be configured to allow users to select to "opt in" or "opt out" of participation in the collection of personal information data during registration for services or anytime thereafter. In another example, users can select not to provide sound recording data for monitoring noise exposure levels. In yet another example, users can select to limit the length of time sound recording data is maintained or entirely prohibit the development of a noise exposure profile. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, noise exposure data can be selected and delivered to users by inferring preferences based on non-personal information data or a bare minimum amount of personal information, such as the content being requested by the device associated with a user, other non-personal or publicly available information.

What is claimed is:

1. An electronic device comprising:
a display device;
one or more processors; and
memory storing one or more programs configured to be executed by the one or more processors, the one or more programs including instructions for:
displaying, via the display device, a first user interface including a first graphical object that varies in appearance based on a noise level over a first time period and a second graphical object that varies in appearance based on the noise level over a second time period, different from the first time period, wherein the first time period and the second time period at least partially overlap with one another;
receiving first noise level data over the first time period corresponding to a first noise level, the first noise level below a threshold noise level;
in response to receiving the first noise level data, displaying the first graphical object with an active portion of a first size based on the first noise level and in a first color;
while maintaining display of the first user interface, receiving second noise level data over the first time period corresponding to a second noise level different from the first noise level; and
in response to receiving the second noise level data:
displaying the active portion in a second size based on the second noise level that is different from the first size;
in accordance with a determination that the second noise level exceeds the threshold noise level, displaying the active portion in a second color different from the first color; and
in accordance with a determination that the second noise level does not exceed the threshold noise level, maintaining display of the first graphical object in the first color.

2. The electronic device of claim 1, the one or more programs further including instructions for:
while displaying the first graphical object with the active portion at the second size and in the second color, receiving third noise level data corresponding to a third noise level that is below the threshold noise level; and
in response to receiving the third noise level data, displaying the active portion at a third size based on the third noise level data that is smaller than the second size and in the first color.

3. The electronic device of claim 1, wherein displaying the first user interface includes:
in accordance with a determination that a current noise level is below a second threshold noise level, displaying a first affordance that, when selected, displays a second user interface; and
in accordance with a determination that a current noise level is above the second threshold noise level, displaying a second affordance, different from the first affordance, that, when selected, displays a third user interface.

4. The electronic device of claim 1, wherein the electronic device includes one or more noise sensors, and wherein the first noise level data and the second noise level data are received from the one or more noise sensors.

5. The electronic device of claim 1, wherein the first noise level data and the second noise level data are received from a second electronic device that is different from the electronic device.

6. The electronic device of claim 1, the one or more programs further including instructions for:
prior to displaying the first user interface and in accordance with a determination that a set of noise notification criteria are met, the noise notification criteria including a criterion that is met when a current noise level over a third period of time exceeds a third threshold noise level, displaying a noise level notification that includes:
    an indication of the current noise level over the third period of time; and
    a third affordance;
while displaying the third affordance, receiving a user input corresponding to the third affordance; and
in response to receiving the user input corresponding to the third affordance, displaying the first user interface.

7. The electronic device of claim 6, wherein the set of noise notification criteria are not satisfied when a second noise notification level was displayed within a predetermined time before displaying the noise level notification that includes the indication of the current noise level over the third period of time.

8. The electronic device of claim 6, wherein the noise level notification further includes a fourth affordance associated with a second predetermined time period, and wherein the one or more programs further include instructions for:
    receiving an input corresponding to the fourth affordance; and
    in response to receiving the input corresponding to the fourth affordance, forgoing display of further instances of noise level notifications for the second predetermined time period.

9. The electronic device of claim 1, the one or more programs further including instructions for:
    while the first user interface is displayed, sampling noise level data at a first sampling rate; and
    while the first user interface is not displayed, sampling noise level data at a second sampling rate different from the first sampling rate.

10. The electronic device of claim 1, the one or more programs further including instructions for:
    displaying a third graphical object that varies in appearance based on the noise level over a third time period, different from the first time period and the second time period.

11. A non-transitory computer-readable storage medium storing one or more programs configured to be executed by one or more processors of an electronic device including a display device, the one or more programs including instructions for:
    displaying, via the display device, a first user interface including a first graphical object that varies in appearance based on a noise level over a first time period and a second graphical object that varies in appearance based on the noise level over a second time period, different from the first time period, wherein the first time period and the second time period at least partially overlap with one another;
    receiving first noise level data over the first time period corresponding to a first noise level, the first noise level below a threshold noise level;
    in response to receiving the first noise level data, displaying the first graphical object with an active portion of a first size based on the first noise data and in a first color;
    while maintaining display of the first user interface, receiving second noise level data over the first time period corresponding to a second noise level different from the first noise level; and
    in response to receiving the second noise level data:
        displaying the active portion in a second size based on the second noise level that that is different from the first size;
        in accordance with a determination that the second noise level exceeds the threshold noise level, displaying the active portion in a second color different from the first color; and
        in accordance with a determination that the second noise level does not exceed the threshold noise level, maintaining display of the first graphical object in the first color.

12. The non-transitory computer-readable storage medium of claim 11, the one or more programs further including instructions for:
    while displaying the first graphical object with the active portion at the second size and in the second color, receiving third noise level data corresponding to a third noise level that is below the threshold noise level; and
    in response to receiving the third noise level data, displaying the active portion at a third size based on the third noise level data that is smaller than the second size and in the first color.

13. The non-transitory computer-readable storage medium of claim 11, wherein displaying the first user interface includes:
    in accordance with a determination that a current noise level is below a second threshold noise level, displaying a first affordance that, when selected, displays a second user interface; and
    in accordance with a determination that a current noise level is above the second threshold noise level, displaying a second affordance, different from the first affordance, that, when selected, displays a third user interface.

14. The non-transitory computer-readable storage medium of claim 11, wherein the first noise level data and the second noise level data are received from one or more noise sensors of the electronic device.

15. The non-transitory computer-readable storage medium of claim 11, wherein the first noise level data and the second noise level data are received from a second electronic device that is different from the electronic device.

16. The non-transitory computer-readable storage medium of claim 11, the one or more programs further including instructions for:
    prior to displaying the first user interface and in accordance with a determination that a set of noise notification criteria are met, the noise notification criteria including a criterion that is met when a current noise level over a third period of time exceeds a third threshold noise level, displaying a noise level notification that includes:
        an indication of the current noise level over the third period of time; and
        a third affordance;
    while displaying the third affordance, receiving a user input corresponding to the third affordance; and
    in response to receiving the user input corresponding to the third affordance, displaying the first user interface.

17. The non-transitory computer-readable storage medium of claim 16, wherein the set of noise notification criteria are not satisfied when a second noise notification level was displayed within a predetermined time before displaying the noise level notification that includes the indication of the current noise level over the third period of time.

18. The non-transitory computer-readable storage medium of claim 16, wherein the noise level notification further includes a fourth affordance associated with a second predetermined time period, and wherein the one or more programs further include instructions for:
   receiving an input corresponding to the fourth affordance; and
   in response to receiving the input corresponding to the fourth affordance, forgoing display of further instances of noise level notifications for the second predetermined time period.

19. The non-transitory computer-readable storage medium of claim 11, the one or more programs further including instructions for:
   while the first user interface is displayed, sampling noise level data at a first sampling rate; and
   while the first user interface is not displayed, sampling noise level data at a second sampling rate different from the first sampling rate.

20. The non-transitory computer-readable storage medium of claim 11, the one or more programs further including instructions for:
   displaying a third graphical object that varies in appearance based on the noise level over a third time period, different from the first time period and the second time period.

21. A method comprising:
   at a first electronic device including a display device:
      displaying, via the display device, a first user interface including a first graphical object that varies in appearance based on a noise level over a first time period and a second graphical object that varies in appearance based on the noise level over a second time period, different from the first time period, wherein the first time period and the second time period at least partially overlap with one another;
      receiving first noise level data over the first time period corresponding to a first noise level, the first noise level below a threshold noise level;
      in response to receiving the first noise level data, displaying the first graphical object with an active portion of a first size based on the first noise data and in a first color;
      while maintaining display of the first user interface, receiving second noise level data over the first time period corresponding to a second noise level different from the first noise level; and
      in response to receiving the second noise level data:
         displaying the active portion in a second size based on the second noise level that that is different from the first size;
         in accordance with a determination that the second noise level exceeds the threshold noise level, displaying the active portion in a second color different from the first color; and
         in accordance with a determination that the second noise level does not exceed the threshold noise level, maintaining display of the first graphical object in the first color.

22. The method of claim 21, further comprising:
   while displaying the first graphical object with the active portion at the second size and in the second color, receiving third noise level data corresponding to a third noise level that is below the threshold noise level; and
   in response to receiving the third noise level data, displaying the active portion at a third size based on the third noise level data that is smaller than the second size and in the first color.

23. The method of claim 21, wherein displaying the first user interface includes:
   in accordance with a determination that a current noise level is below a second threshold noise level, displaying a first affordance that, when selected, displays a second user interface; and
   in accordance with a determination that a current noise level is above the second threshold noise level, displaying a second affordance, different from the first affordance, that, when selected, displays a third user interface.

24. The method of claim 21, wherein the electronic device includes one or more noise sensors, and wherein the first noise level data and the second noise level data are received from the one or more noise sensors.

25. The method of claim 21, wherein the first noise level data and the second noise level data are received from a second electronic device that is different from the electronic device.

26. The method of claim 21, further comprising:
   prior to displaying the first user interface and in accordance with a determination that a set of noise notification criteria are met, the noise notification criteria including a criterion that is met when a current noise level over a third period of time exceeds a third threshold noise level, displaying a noise level notification that includes:
      an indication of the current noise level over the third period of time; and
      a third affordance;
   while displaying the third affordance, receiving a user input corresponding to the third affordance; and
   in response to receiving the user input corresponding to the third affordance, displaying the first user interface.

27. The method of claim 26, wherein the set of noise notification criteria are not satisfied when a second noise notification level was displayed within a predetermined time before displaying the noise level notification that includes the indication of the current noise level over the third period of time.

28. The method of claim 26, wherein the noise level notification further includes a fourth affordance associated with a second predetermined time period, and further comprising:
   receiving an input corresponding to the fourth affordance; and
   in response to receiving the input corresponding to the fourth affordance, forgoing display of further instances of noise level notifications for the second predetermined time period.

29. The method of claim 21, further comprising:
   while the first user interface is displayed, sampling noise level data at a first sampling rate; and
   while the first user interface is not displayed, sampling noise level data at a second sampling rate different from the first sampling rate.

30. The method of claim 21, further comprising:
   displaying a third graphical object that varies in appearance based on the noise level over a third time period, different from the first time period and the second time period.

* * * * *

UNITED STATES PATENT AND TRADEMARK OFFICE
CERTIFICATE OF CORRECTION

PATENT NO. : 10,764,700 B1
APPLICATION NO. : 16/584186
DATED : September 1, 2020
INVENTOR(S) : Nicholas Felton Page 1 of 1

It is certified that error appears in the above-identified patent and that said Letters Patent is hereby corrected as shown below:

In the Claims

Column 54, Line 2, Claim 11, delete "that that" and insert -- that --, therefor.
Column 55, Line 51, Claim 21, delete "that that" and insert -- that --, therefor.

Signed and Sealed this
Ninth Day of March, 2021

Drew Hirshfeld
*Performing the Functions and Duties of the*
*Under Secretary of Commerce for Intellectual Property and*
*Director of the United States Patent and Trademark Office*